(12) United States Patent
Marchisio et al.

(10) Patent No.: US 7,398,201 B2
(45) Date of Patent: Jul. 8, 2008

(54) METHOD AND SYSTEM FOR ENHANCED DATA SEARCHING

(75) Inventors: Giovanni B. Marchisio, Kirkland, WA (US); Krzysztof Koperski, Seattle, WA (US); Jisheng Liang, Bellevue, WA (US); Alejandro Murua, Seattle, WA (US); Thien Nguyen, Edmonds, WA (US); Carsten Tusk, Seattle, WA (US); Navdeep S. Dhillon, Seattle, WA (US); Lubos Pochman, Breckenridge, CO (US)

(73) Assignee: Evri Inc., Seattle, WA (US)

( * ) Notice: Subject to any disclaimer, the term of this patent is extended or adjusted under 35 U.S.C. 154(b) by 819 days.

(21) Appl. No.: 10/371,399

(22) Filed: Feb. 19, 2003

(65) Prior Publication Data

US 2003/0233224 A1 Dec. 18, 2003

Related U.S. Application Data

(63) Continuation-in-part of application No. 10/007,299, filed on Nov. 8, 2001.

(60) Provisional application No. 60/312,385, filed on Aug. 14, 2001.

(51) Int. Cl.
*G06F 17/27* (2006.01)
*G06F 7/00* (2006.01)
*G06F 17/30* (2006.01)

(52) U.S. Cl. .................... 704/9; 707/102; 707/3
(58) Field of Classification Search ............... None
See application file for complete search history.

(56) References Cited

U.S. PATENT DOCUMENTS 4,839,853 A 6/1989 Deerwester et al. ......... 364/900

(Continued)

FOREIGN PATENT DOCUMENTS

EP 0 280 866 9/1988

(Continued)

OTHER PUBLICATIONS

Pohlmann et al., "The Effect of Syntactic Phrase Indexing on Retrieval Performance for Dutch Texts," Proceedings of RIAO, pp. 176-187, Jun. 1997.

(Continued)

*Primary Examiner*—David R. Hudspeth
*Assistant Examiner*—Matthew J. Sked
(74) *Attorney, Agent, or Firm*—Seed IP Law Group PLLC

(57) ABSTRACT

Methods and systems for syntactically indexing and searching data sets to achieve more accurate search results and for indexing and searching data sets using entity tags alone or in combination therewith are provided. Example embodiments provide a Syntactic Query Engine ("SQE") that parses, indexes, and stores a data set, as well as processes natural language queries subsequently submitted against the data set. The SQE comprises a Query Preprocessor, a Data Set Preprocessor, a Query Builder, a Data Set Indexer, an Enhanced Natural Language Parser ("ENLP"), a data set repository, and, in some embodiments, a user interface. After preprocessing the data set, the SQE parses the data set according to a variety of levels of parsing and determines as appropriate the entity tags and syntactic and grammatical roles of each term to generate enhanced data representations for each object in the data set. The SQE indexes and stores these enhanced data representations in the data set repository. Upon subsequently receiving a query, the SQE parses the query also using a variety of parsing levels and searches the indexed stored data set to locate data that contains similar terms used in similar grammatical roles and/or with similar entity tag types as indicated by the query. In this manner, the SQE is able to achieve more contextually accurate search results more frequently than using traditional search engines.

94 Claims, 46 Drawing Sheets

| | Subject | Entity Tag Type | Verb | Object | Entity Tag Type | Preposition | Verb Modifier | Entity Tag Type | Noun Modifier | Entity Tag Type |
|---|---|---|---|---|---|---|---|---|---|---|
| 2001 | Argentina | country | | | | | | | YPF | organization |
| 2002 | YPF | organization | | natural gas | | | | | | |
| 2003 | YPF | organization | | gas | | | | | | |
| 2004 | Argentina | country | | natural gas | | | | | | |
| 2005 | Argentina | country | | gas | | | | | | |
| 2006 | YPF | organization | export | | | | | | | |
| 2007 | Argentina | country | export | | | | | | | |
| 2008 | | | export | natural gas | | | | | | |
| 2009 | | | export | gas | | | | | | |

U.S. PATENT DOCUMENTS

| | | | |
|---|---|---|---|
| 5,301,109 A | 4/1994 | Landauer et al. | 364/419.19 |
| 5,317,507 A | 5/1994 | Gallant | 364/419.13 |
| 5,325,298 A | 6/1994 | Gallant | 364/419.19 |
| 5,331,556 A | 7/1994 | Black, Jr. et al. | 364/419.08 |
| 5,377,103 A | 12/1994 | Lamberti et al. | 364/419.08 |
| 5,619,709 A | 4/1997 | Caid et al. | 395/794 |
| 5,778,362 A | 7/1998 | Deerwester | 707/5 |
| 5,794,050 A | 8/1998 | Dahlgren et al. | 395/708 |
| 5,794,178 A | 8/1998 | Caid et al. | 704/9 |
| 5,799,268 A | 8/1998 | Boguraev | 704/9 |
| 5,857,179 A | 1/1999 | Vaithyanathan et al. | 707/2 |
| 5,884,302 A | 3/1999 | Ho | 707/3 |
| 5,933,822 A | 8/1999 | Braden-Harder et al. | 707/5 |
| 5,950,189 A | 9/1999 | Cohen et al. | 707/3 |
| 6,006,221 A | 12/1999 | Liddy et al. | 707/5 |
| 6,006,225 A | 12/1999 | Bowman et al. | 707/5 |
| 6,026,388 A | 2/2000 | Liddy et al. | 707/1 |
| 6,061,675 A | 5/2000 | Wical | |
| 6,064,951 A | 5/2000 | Park et al. | 704/8 |
| 6,122,647 A | 9/2000 | Horowitz et al. | 707/513 |
| 6,192,360 B1 | 2/2001 | Dumais et al. | 707/6 |
| 6,202,064 B1 | 3/2001 | Julliard | 707/5 |
| 6,363,373 B1* | 3/2002 | Steinkraus | 707/3 |
| 6,460,029 B1 | 10/2002 | Fries et al. | 707/3 |
| 6,584,464 B1 | 6/2003 | Warthen | 707/4 |
| 6,601,026 B2 | 7/2003 | Appelt et al. | 704/9 |
| 6,728,707 B1 | 4/2004 | Wakefield et al. | 707/5 |
| 6,732,097 B1 | 5/2004 | Wakefield et al. | 707/5 |
| 6,732,098 B1 | 5/2004 | Wakefield et al. | 707/5 |
| 6,738,765 B1 | 5/2004 | Wakefield et al. | 707/5 |
| 6,741,988 B1 | 5/2004 | Wakefield et al. | 707/7 |
| 6,745,161 B1 | 6/2004 | Arnold et al. | 704/7 |
| 6,910,003 B1 | 6/2005 | Arnold et al. | 704/4 |
| 7,051,017 B2 | 5/2006 | Marchisio | 707/3 |
| 7,054,854 B1* | 5/2006 | Hattori et al. | 707/3 |
| 7,171,349 B1* | 1/2007 | Wakefield et al. | 704/9 |
| 2002/0007267 A1 | 1/2002 | Batchilo et al. | |
| 2002/0010574 A1 | 1/2002 | Tsourikov et al. | 704/9 |
| 2002/0059161 A1 | 5/2002 | Li | 707/1 |
| 2002/0091671 A1 | 7/2002 | Prokoph | 707/1 |
| 2003/0101182 A1 | 5/2003 | Govrin et al. | 707/7 |
| 2003/0115191 A1 | 6/2003 | Copperman et al. | 707/3 |
| 2004/0125877 A1 | 7/2004 | Chang et al. | 375/240.28 |
| 2004/0167870 A1 | 8/2004 | Wakefield et al. | 707/1 |
| 2004/0167883 A1 | 8/2004 | Wakefield et al. | 707/3 |
| 2004/0167884 A1 | 8/2004 | Wakefield et al. | 707/3 |
| 2004/0167885 A1 | 8/2004 | Wakefield et al. | 707/3 |
| 2004/0167886 A1 | 8/2004 | Wakefield et al. | 707/3 |
| 2004/0167887 A1 | 8/2004 | Wakefield et al. | 707/3 |
| 2004/0167907 A1 | 8/2004 | Wakefield et al. | 707/100 |
| 2004/0167908 A1 | 8/2004 | Wakefield et al. | 707/100 |
| 2004/0167909 A1 | 8/2004 | Wakefield et al. | 707/100 |
| 2004/0167910 A1 | 8/2004 | Wakefield et al. | 707/100 |
| 2004/0167911 A1 | 8/2004 | Wakefield et al. | 707/100 |
| 2004/0221235 A1 | 11/2004 | Marchisio et al. | 715/534 |
| 2004/0243388 A1 | 12/2004 | Corman et al. | 704/1 |
| 2005/0177805 A1 | 8/2005 | Lynch et al. | 715/968 |
| 2005/0267871 A1 | 12/2005 | Marchisio et al. | 707/3 |

FOREIGN PATENT DOCUMENTS

| | | |
|---|---|---|
| EP | 0 597 630 | 7/2002 |
| WO | WO 00/14651 | 3/2000 |
| WO | WO 01/22280 | 3/2001 |
| WO | WO 02/27536 | 4/2002 |
| WO | WO 02/33583 | 4/2002 |
| WO | WO 2004/053645 | 6/2004 |

OTHER PUBLICATIONS

Cass, "A Fountain of Knowledge," IEEE Spectrum Online, URL: http://www.spectrum.ieee.org/WEBONLY/publicfeature/jan04/0104comp1.html, download date Feb. 4, 2004, 8 pages.

Nagao et al., "Semantic Annotation and Transcoding: Making Web Content More Accessible," *IEEE Multimedia, IEEE Computer Society*, US. 8(2):69-81, Apr. 2001.

U.S. Appl. No. 09/532,605, filed Mar. 22, 2000, Marchisio.

U.S. Appl. No. 09/533,884, filed Mar. 22, 2000, Marchisio.

U.S. Appl. No. 09/962,798, filed Sep. 25, 2001, Marchisio.

Feldman et al., "Text Mining at the Term Level," *Proc. of the 2nd European Symposium on Principles of Data Mining and Knowledge Discover*, Nantes, France, 1998.

Littman et al., "Automatic Cross-Language Information Retrieval using Latent Semantic Indexing," In Grefenstette, G., editor, Cross Language Information Retrieval. Kluwer, 1998.

* cited by examiner

Insightful

*LightFinder* | Does Argentina import or export gas

---

Results [1 - 10 of 10]  Page: 1

1 Mining & semi-processing Bolivia  [ 23-DEC-1997 ]
Previously, Argentina has been the main customer for Bolivia's natural gas [ Similar documents ]
[Directory: Country Profile Bolivia 1997 / 1998 > Production > Mining & semi-processing

2 Mining and semi-processing Bolivia  [ 01-NOV-1998 ]
Until now, Argentina has been the main customer for Bolivia's natural gas [ Similar documents ]
[Directory: Country Profile Bolivia 1998 / 1999 > Production > Mining and semi-processing

3 Natural resources & the environment Argentina  [ 01-DEC-1997 ]
Natural gas reserves are large and Argentina should become a major gas supplier to neighbouring markets, particularly Chile and Brazil [ Similar documents ]
[Directory: Country Profile Argentina 1997 / 1998 > Resources > Natural resources & the environment

4 Energy provision Argentina  [ 01-DEC-1997 ]
Argentina has become an important natural gas supplier to neighbouring countries, especially Brazil and Chile [ Similar documents ]
[Directory: Country Profile Argentina 1997 / 1998 > Economic infrastructure > Energy provision

5 Gasoducto del Pacifico is inaugurated Chile  [ 04-JAN-2000 ]
Energy co-operation between Argentina and Chile deepened further on November 9th with the inauguration of Gasoducto del Pacifico, a 543-km gas pipeline carrying natural gas from Argentina's Neuquen province to the Biobio region, about 500 km south of Santiago [ Similar documents ]
[Directory: Country Report Chile 1st quarter 2000 > Sectoral trends > Gasoducto del Pacifico is inaugurated

Insightful

*LightFinder*

Document: Foreign reserves & the exchange rate   5B01

Directory: Country Profile Somalia 1997/1998 > External sector > Foreign reserves & the exchange rate Search Similar:   5B04
- Sentences
- Paragraphs
- Documents Advanced Search
Help The now defunct Central Bank of Somalia suffered a setback after the fall of Mr Siad Barre in 1991 when a reported $70m in foreign exchange disappeared. There are no current data on foreign reserves.

Although the official exchange rate for the Somaliland shilling has stood at SoISh80:$1 since July 1995, its value on the parallel market has fallen. It was trading at SoISh5,000:$1 in the last months of 1996 but gained some ground to SoISh3,000:$1 through most of 1997 until a downturn to SoISh4,000:$1 in October 1997. In the south, the rate for the Somali shilling is variable from town to town and the situation  5B06
is complicated by Mr Aideed's import of his own banknotes in June 1997 (see Economic policy above), but the rate in Mogadishu has fallen from SoSh3,000:$1 in 1993 to SoSh7,500:$1 in November 1997. (See Reference table 11 for historical data on average exchange rates.)

*Fig. 5B*

Insightful *LightFinder*

[In the south, the rate for the Somali shilling is variable from town to town and the situati] [Search]

Advanced Search
Help
Preferences

Results [1-10 of 13]                                                                                          Page: 1 2

1  Controversial new bank notes arrive -- Somalia                                                    [ 05-JUL-1999 ]
   In fact, many of these traders openly support Mr Aideed's rivals, which may also account for the armed stand-offs, which are reported to have occurred at the airports upon the actual arrival of the bank-notes [ Similar documents ]
   [Directory: Country Report Somalia 3rd quarter, 1999 > Economy > Controversial new bank notes arrive -- ]

2  Foreign reserves & the exchange rate Somalia                                                      [ 28-DEC-1997 ]
   In the south, the rate for the Somali shilling is variable from town to town and the situation is complicated by Mr Aideed's import of his own banknotes in June 1997 (see Economic policy above), but the rate in Mogadishu has fallen from SoSh3,000:$1 in 1993 to SoSh7,500:$1 in November 1997 [ Similar documents ]
   [Directory: Country Profile Somalia 1997 / 1998 > External sector > Foreign reserves & the exchange rate ]

3  Controversial new bank notes arrive -- Somalia                                                    [ 05-JUL-1999 ]
   Another delivery of new shillings was reportedly received by Mr Aideed at the Baidoa airport in late May, although a second delivery there was apparently cancelled following that city's fall to anti-Aideed forces in early June (see Political scene) [ Similar documents ]
   [Directory: Country Report Somalia 3rd quarter, 1999 > Economy > Controversial new bank notes arrive -- ]

4  Economic outlook Somalia                                                                          [ 01-MAR-2001 ]
   However, until the government attains control of the country and is able to stop other economic agents shipping over banknotes, the prospect of the Central Bank -- if it is re-established -- performing a useful service during the forecast period is remote [ Similar documents ]
   [Directory: Country Report Somalia March 2001 Main report > Outlook for 2001-02 > Economic outlook ]

*Fig. 5C*

Insightful

*LightFinder* | Show me a map of recent conflict areas of Angola | Search

Advanced Search
Help
Preferences

Results [1 - 5 of 5]    Page: 1

1 New FAA offensive in central highlands successful -- Angola    [ 19-NOV-1999 ]
This map presents the Angola... (Please See Map/Chart) [ Similar documents ]
[Directory: Country Report Angola 4th quarter 1999 > Political scene > New FAA offensive in central highlands successful -- ]

2 First deepwater production is imminent Angola    [ 19-NOV-1999 ]
This map presents the Angola... (Please See Map/Chart) [ Similar documents ]
[Directory: Country Report Angola 4th quarter 1999 > Oil & gas > First deepwater production is imminent ]

3 Military situation is relatively quiet Angola    [ 01-JUN-2000 ]
The area between Lucapa and Saurimo, which contains concessions held by Diamondworks and Southern Era, is also reported to have been unstable (see map, above) [ Similar documents ]

*Fig. 6*

Insightful

LightFinder

[show me a chart of the GDP of China] [Search]

Advanced Search
Help
Preferences

Results [1 - 10 of 18]        Page: 1 2

1  Related countries GDP China — 808        [ 03-NOV-2000 ]
   Related countries GDP of China is ... Please see the Table/Chart [ Similar documents ]
   [Directory: Related countries GDP >]

2  Related countries GDP per head China        [ 03-NOV-2000 ]
   Related countries GDP per head of China is ... Please see the Table/Chart [ Similar documents ]
   [Directory: Related countries GDP per head >]

Fig. 8

| Relationship: BILL CLINTON ▲ | | | |
|---|---|---|---|
| be[33] | sign[19] | visit[16] | make[12] | say[9] |
| renew[6] | agree[4] | announce[4] | approve[4] | fly[4] |
| issue[4] | lead[4] | pay[4] | seek[4] | apologise[3] |
| appear[3] | ask[3] | call on[3] | confirm[3] | force[3] |
| form[3] | go[3] | have[3] | hold[3] | lead to[3] |
| mark[3] | meet[3] | propose[3] | reward[3] | take[3] |
| appoint[2] | block[2] | choose[2] | continue[2] | decide[2] |
| end[2] | follow[2] | give[2] | halt[2] | hope[2] |
| indicate[2] | invite[2] | praise[2] | raise[2] | recognise[2] |
| refer to[2] | reiterate[2] | respond[2] | see[2] | tell[2] |
| thank[2] | urge[2] | veto[2] | want[2] | aid[1] |
| allege[1] | appeal to[1] | apply[1] | arrive[1] | associate[1] |
| attend[1] | authorise[1] | award[1] | back[1] | become[1] |
| begin[1] | believe[1] | bin[1] | blame[1] | bolster[1] |
| break[1] | bring about[1] | call for[1] | cap[1] | cite[1] |
| claim[1] | come out[1] | commit[1] | convince[1] | declare[1] |
| decline[1] | delay[1] | deny[1] | devote[1] | dispatch[1] |
| divert[1] | draw[1] | echo[1] | embark[1] | emphasise[1] |
| encourage[1] | enhance[1] | enter[1] | express[1] | extend[1] |
| fail[1] | fight[1] | gain[1] | help[1] | hint[1] |

Insightful

*LightFinder*

[bill clinton visit] [Search]

Advanced Search
Help
Preferences

Results [1 - 10 of 16]    Page: 1 2 — 1205

1 President Clinton visits Guatemala -- Guatemala    [ 23-APR-1999 ]
On March 10th and 11th the US president, Bill Clinton, visited Guatemala, as part of his four-day visit to Central America [ Similar documents ]
[Directory: Country Report Guatemala 2nd quarter, 1999 > Political scene > President Clinton visits Guatemala -- ]

2 Pres Clinton apologises for not stopping genocide -- Rwanda    [ 09-MAY-1998 ]
President Bill Clinton of the US visited Rwanda for three hours on March 25th during his African tour [ Similar documents ]
[Directory: Country Report Rwanda 2nd Quarter 1998 > Political scene > Pres Clinton apologises for not stopping genocide -- ]

3 International relations and defence Ghana    [ 08-JUN-2000 ]
The PNDC's socialist contacts caused tension with the US, but since the beginning of the 1990s relations have improved dramatically and the US president, Bill Clinton, visited Ghana in March 1998 on the first leg of his six-country tour of Africa [ Similar documents ]
[Directory: Country Profile Ghana 2000/2001 > Political background > International relations and defence ]

4 International relations and defence Ghana    [ 12-JUL-1999 ]
The PNDC's socialist contacts caused tension with the US, but since the beginning of the 1990s relations have improved dramatically and the US president, Bill Clinton, visited Ghana in March 1998, on the first leg of his six-country tour of Africa [ Similar documents ]
[Directory: Country Profile Ghana 1999/2000 > Political background > International relations and defence ]

5 At a glance--2001-02--North Korea November 2000 North Korea    [ 09-NOV-2000 ]
The US president, Bill Clinton, may visit North Korea in return for a missile deal [ Similar documents ]
[Directory: Country Report North Korea November 2000 Main report > At a glance--2001-02--North Korea November 2000 ]

6 US troops may stay longer Bosnia and Hercegovina    [ 30-JAN-1998 ]
The US president, Bill Clinton, visited American troops in Bosnia in December [ Similar documents ]

*Fig. 12*

| | Subject | Entity Tag Type | Verb | Object | Entity Tag Type | Preposition | Verb Modifier | Entity Tag Type | Noun Modifier | Entity Tag Type |
|---|---|---|---|---|---|---|---|---|---|---|
| 2001 | Argentina | country | | | | | | | | |
| 2002 | YPF | organization | | natural gas | | | | | YPF | organization |
| 2003 | YPF | organization | | gas | | | | | | |
| 2004 | Argentina | country | | natural gas | | | | | | |
| 2005 | Argentina | country | | gas | | | | | | |
| 2006 | YPF | organization | export | | | | | | | |
| 2007 | Argentina | country | export | | | | | | | |
| 2008 | | | export | natural gas | | | | | | |
| 2009 | | | export | gas | | | | | | |

Fig 20

| "Subject" | Entity Tag Type |
|---|---|
| 2010~ Argentina | country |
| 2011~ YPF | organization |

Fig 20A

| "Subject" | Entity Tag Type | Verb |
|---|---|---|
| 2020~ Argentina | country | export |
| 2021~ YPF | organization | export |

Fig 20B

Does Argentina import or export natural gas from the south of Patagonia?

| Row Number | Subject | Verb | Object | Preposition | Modifier |
|---|---|---|---|---|---|
| 1 | Argentina | import | | | |
| 2 | Argentina | export | | | |
| 3 | | import | natural gas | | |
| 4 | | import | gas | | |
| 5 | | export | natural gas | | |
| 6 | | export | gas | | |
| 7 | | import | | from | south |
| 8 | | import | | from | Patagonia |
| 9 | | export | | from | south |
| 10 | | export | | from | Patagonia |
| 11 | Argentina | | natural gas | | |
| 12 | Argentina | | gas | | |
| 13 | Argentina | | Patagonia | | |
| 14 | Argentina | | south | | |
| 15 | Patagonia | | | | south |
| 16 | natural gas | | south | | |
| 17 | gas | | south | | |
| 18 | natural gas | | Patagonia | | |
| 19 | gas | | Patagonia | | |
| 20 | south | | Patagonia | | |
| 21 | natural gas | | | | Argentina |
| 22 | gas | | | | Argentina |
| 23 | Patagonia | | | | Argentina |
| 24 | south | | | | Argentina |
| 25 | south | | | | natural gas |
| 26 | south | | | | gas |
| 27 | Patagonia | | | | natural gas |
| 28 | Patagonia | | | | gas |

*Fig. 36B*

METHOD AND SYSTEM FOR ENHANCED DATA SEARCHING

STATEMENT REGARDING FEDERALLY SPONSORED RESEARCH OR DEVELOPMENT

This invention was made with government support under Contract No. DAAH01-00-C-R168 awarded by Defense Advanced Research Project Agency and Grant Number 2 R44 LM06520-02 from the National Institutes of Health. The government has or may have certain rights in this invention.

BACKGROUND OF THE INVENTION

1. Field of the Invention

The present invention relates to a method and system for searching for information in a data set, and, in particular, to methods and systems for syntactically indexing and searching data sets to achieve greater search result accuracy.

2. Background

Often times it is desirable to search large sets of data, such as collections of millions of documents, only some of which may pertain to the information being sought. In such instances it is difficult to either identify a subset of data to search or to search all data yet return only meaningful results. Several search techniques have been used to support searching large sets of data, none of which have been able to attain a high degree of accuracy of search results due to their inherent limitations.

One common technique is that implemented by traditional keyword search engines. Data is searched and results are generated based on matching one or more words or terms designated as a query. The results are returned because they contain a word or term that matches all or a portion of one or more keywords that were submitted to the search engine as the query. Some keyword search engines additionally support the use of modifiers, operators, or a control language that specifies how the keywords should be combined in a search. For example, a query might specify a date filter to be used to filter the returned results. In many traditional keyword search engines, the results are returned ordered, based on the number of matches found within the data. For example, a keyword search against Internet websites typically returns a list of sites that contain one or more of the submitted keywords, with the sites with the most matches appearing at the top of the list. Accuracy of search results in these systems is thus presumed to be associated with frequency of occurrence.

One drawback to traditional search engines is that they don't return data that doesn't match the submitted keywords, even though it may be relevant. For example, if a user is searching for information on what products a particular country imports, data that refers to the country as a "customer" instead of using the term "import" would be missed if the submitted query specifies "import" as one of the keywords, but doesn't specify the term "customer." (e.g., The sentence "Argentina is a customer of the Acme Company" would be missed.) Ideally, a user would be able to submit a query in the form of a question and receive back a set of results that were accurate based on the meaning of the query—not just on the specific terms used to phrase the question.

Natural language parsing provides technology that attempts to understand and identify the syntactical structure of a language. Natural language parsers have been used to identify the parts of speech of each term in a submitted sentence to support the use of sentences as natural language queries. They have been used also to identify text sentences in a document that follow a particular part of speech pattern; however, these techniques fall short of being able to produce meaningful results when the documents do not follow such patterns. The probability of a sentence falling into a class of predefined sentence templates or the probability of a phrase occurring literally is too low to provide meaningful results. Failure to account for semantic and syntactic variations across a data set, especially heterogeneous data sets, has led to disappointing results.

BRIEF SUMMARY OF THE INVENTION

Embodiments of the present invention provide methods and systems for syntactically indexing and searching data sets to achieve more accurate search results. Example embodiments provide a Syntactic Query Engine ("SQE") that parses, indexes, and stores a data set, as well as processes queries subsequently submitted against the data set. The SQE parses each object in the data set and transforms it into a canonical form that can be searched efficiently using techniques of the present invention. To perform this transformation, the SQE determines the syntactic structure of the data by parsing (or decomposing) each data object into syntactic units, determines the grammatical roles and relationships of the syntactic units, associates recognized entity types, and represents these relationships in a normalized data structure. A set of heuristics is used to determine which relationships among the syntactic units are important for yielding greater accuracy in the results subsequently returned in response to queries. The normalized data structures are then stored and indexed. The SQE processes queries in a similar fashion by parsing them and transforming them into the same canonical form, which is then used to generate and execute queries against the data set.

In one embodiment, the parsing of each data object into syntactic units is performed by a natural language parser, which generates a hierarchical data structure (e.g., a tree) of syntactic units. In other embodiments, the parser is a module that generates a syntactic structure (or lexical structure) that relates specifically to the objects of the data set. In yet another embodiment, the parser is an existing, off-the-shelf parser, that is modified to perform the SQE transformations of the data set or of queries.

In another embodiment, the level of parsing of each data object into units is configurable. Many levels, all the way from shallow parsing to deep parsing, are configurable. Each level is associated with the recognition by the parser of certain kinds of tags. Tags include parts-of-speech tags, grammatical role tags, entity tags, and other tags as desired and programmed into the parser or post-processor. For example, shallow parsing, may recognize tags at only an "entity tag" level. Such entity tags may be system defined, such as "name" or "date" and associated with a particular granularity (e.g., sentence versus clause) or may be configured by a user, in embodiments that allow entity tag definitions to be supplied to the parser. The SQE transforms the object into the appropriate syntactic unit for that level. For example, in a shallow parse, a sentence is transformed into its entity tag types and their associated entity tag values. Parsing levels and indexing based upon those levels brings searching efficiencies to the SQE.

In some embodiments, the canonical form is an enhanced data representation, such as an enhanced sentence representation. In some other embodiments, the canonical form applies to one or more clauses within a sentence and is an enhanced clause representation. In one embodiment, the enhanced representation comprises a set of tables, which represent grammatical roles of and/or relationships between various syntactic units. In some embodiments, tables are created for the subject, object, preposition, subject/object, noun/noun modifier roles and/or relationships of the syntactic units. In other embodiments, entity tags are stored in tables and associated with syntactic units.

In one embodiment, use of the normalized data structure allows data that appears in multiple and different languages and in different forms to be processed in a similar manner and at the same time. For example, a single query can be submitted against a corpus of documents written in different languages without first translating all of the documents to one language. In another embodiment, the data set may include parts that themselves contain multiple language elements. For example, a single document, like a tutorial on a foreign language, may be written in several languages. In another embodiment, the data set may include objects containing computer language. In yet another embodiment, the data set may include graphical images, with or without surrounding text, bitmaps, film, or other visual data. In yet another embodiment, the data set may include audio data such as music. In summary, the data set may include any data that can be represented in syntactical units and follows a grammar that associates roles to the syntactical units when they appear in a specified manner, even if the data may not traditionally be thought of in that fashion.

In one embodiment, the processed queries are natural language queries. In other embodiments, the queries are specific representations with form and/or meaning that is specifically related to the objects of the data set.

In one embodiment, the SQE comprises a Query Preprocessor, a Data Set Preprocessor, a Query Builder, a Data Set Indexer, an Enhanced Natural Language Parser ("ENLP"), a data set repository, and, in some embodiments, a user interface. After preprocessing the data set, the SQE parses the data set and determines the tags associated with each term, including the syntactic parts-of-speech and grammatical roles of each term and the presence of any entity tags, to generate enhanced data representations for each object (e.g., sentence) in the data set. The SQE indexes and stores these enhanced data representations in the data set repository. Upon subsequently receiving a query, such as a natural language query, the SQE parses the query similarly and searches the stored indexed data set to locate data that contains similar terms used in similar grammatical roles. Where entity tag types are designated in the query, either directly or indirectly, these tag types are also used to match the indexed data. In a shallow parsing context, it is possible for only the tag types to be used to locate data that contains similar terms associated with similar tag types.

In some embodiments, the SQE provides search operators based upon the grammatical roles and relationships of syntactic units of objects of data. For example, some embodiments provide a search that allows designation of the grammatical role of a unit of the query. For example, a term may be designated as a subject or an object of a sentence before it is used to search the data set for similar terms used in similar grammatical roles. In one embodiment, the SQE returns a list of related units (terms) based upon a grammatical role. For example, in response to a query that designates a term as a "subject" of a textual phrase, the SQE returns a list of verbs that appear in phrases that contain the term used as the subject of those phrases. Other embodiments return different parts of speech or terms that appear in particular grammatical roles.

In some embodiments, search operators are provided that bypass the SQE's standard query evaluation process. These operators allow a user to associate specific terms and/or entity tag types with specific grammatical roles and the matching process is simplified. In some cases, no syntactic parsing is required to match objects of the indexed data set because sufficient information is known a priori to perform the match. There is none if little ambiguity in the query as a search request. In some of these embodiments, a subject and/or an object is designated. Also, some of these embodiments restrict the subject and/or object to correlate to a designated entity tag type without designating a specific subject and/or object. Various combinations of these designations, such as a specific subject with any object restricted by an entity tag type, are provided.

In yet other embodiments, the SQE provides an ability to search for similar sentences in a data set of documents or similar objects, where similar means that the matching sentence contains similar words used in similar grammatical roles or syntactic relationships. In some embodiments, this ability is invoked by selection of a sentence in data that is returned as a result of another query. In yet other embodiments, the SQE provides an ability to search for similar paragraphs and similar documents. In other embodiments, the SQE provides an ability to search for similar objects. In some of these embodiments, the SQE uses an improved latent semantic indexing technique, herein referred to as latent semantic regression, which is based upon inverse inference techniques to index the units of the corpus and to resolve the search query.

In some embodiments, the SQE returns results to a query in an order that indicates responsiveness to the query. In some embodiments, the order is based upon the polysemy of terms in the query. In other embodiments, the order is based upon the inverse document frequency of terms in the query. In yet other embodiments, the ordering of results is based upon weightings of the matched results from the data set. In some of these embodiments, the weightings are based upon the degree of matching of a particular part of speech. For example, the weighting may be based upon whether matching sentences contain identical verbs, entailed verbs, or verbs that are defined as close by some other metric, such as frequency or distribution in the data set.

BRIEF DESCRIPTION OF THE DRAWINGS

FIG. 1 shows a natural language query and the results returned by an example embodiment of a Syntactic Query Engine.

Figure 4:
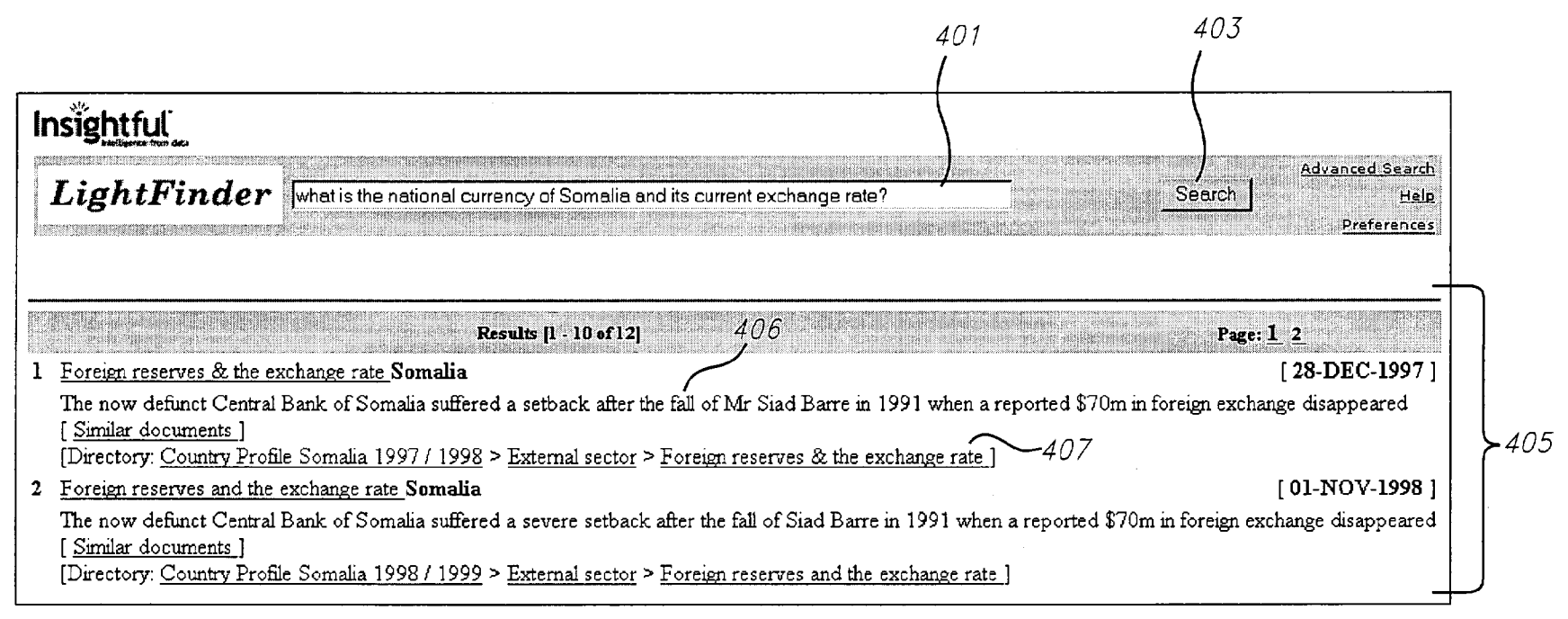

FIG. 4 is an example screen display illustrating general search functionality of an example Syntactic Query Engine user interface.

FIG. 5B is an example screen display illustrating a search similar sentence operation.

FIG. 5C is an example screen display illustrating results that correspond to the search similar sentence operation initiated in FIG. 5B.

FIG. 6 is an example screen display illustrating Syntactic Query Engine results from a natural language query that requests a map.

FIG. 8 is an example screen display illustrating Syntactic Query Engine results from a natural language query that requests a chart.

FIG. 11 is an example screen display illustrating advanced search results from a query that contains a subject.

FIG. 12 is an example screen display illustrating a portion of resulting sentences returned by a Syntactic Query Engine when a particular verb is selected from the verb list.

FIG. 20 is a table illustrating an example enhanced data representation generated by the postprocessor component of an Enhanced Natural Language Parser.

FIG. 20A is an example table illustrating an example enhanced data representation generated by the postprocessor component of an Enhanced Natural Language Parser for entity tag-based representation.

FIG. 20B is an example table illustrating an example enhanced data representation generated by the postprocessor component of an Enhanced Natural Language Parser for a parsing level in which entity tags are combined with governing verb tags.

FIG. 36B is an illustration of an enhanced data representation of an example natural language query generated by an Enhanced Natural Language Parser.

DETAILED DESCRIPTION OF THE INVENTION

Figure 2:
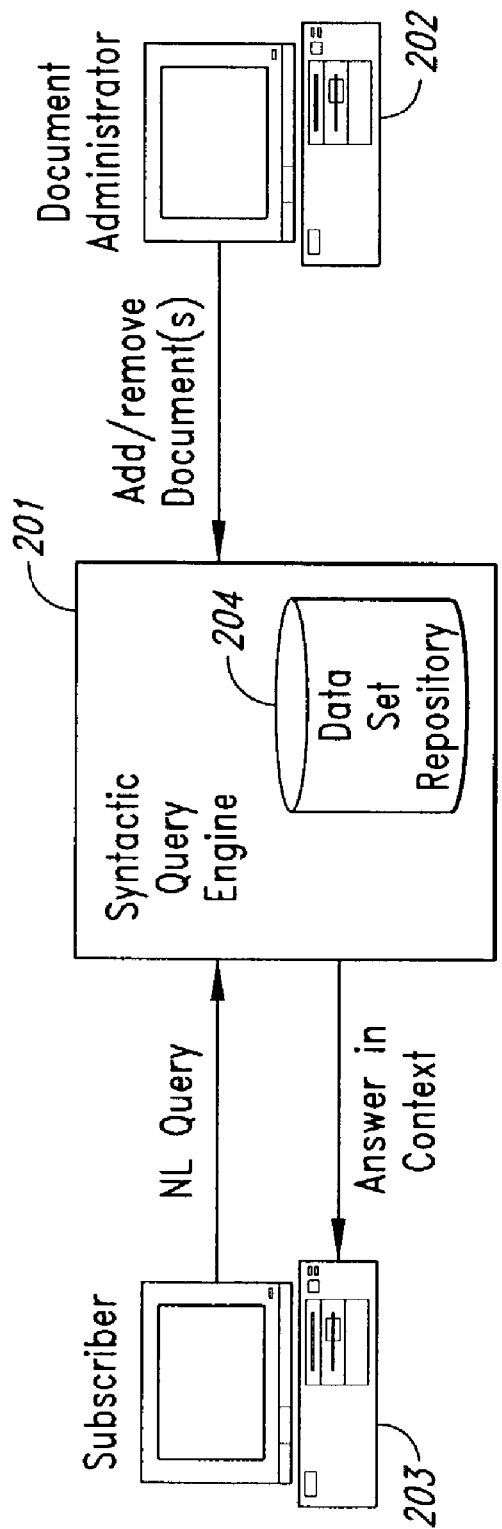
FIG. 2 is an example block diagram of a Syntactic Query Engine.

Embodiments of the present invention provide methods and systems for syntactically indexing and searching data sets to achieve more accurate search results. Example embodiments provide a Syntactic Query Engine ("SQE") that parses, indexes, and stores a data set, as well as processes queries subsequently submitted against the data set. The SQE parses each object in the data set and transforms it into a canonical form that can be searched efficiently using techniques of the present invention. To perform this transformation, the SQE determines the syntactic structure of the data by parsing (or decomposing) each data object into syntactic units, determines the grammatical roles and relationships of the syntactic units, associates recognized entity types, and represents these relationships in a normalized data structure. A set of heuristics is used to determine which relationships among the syntactic units are important for yielding greater accuracy in the results subsequently returned in response to queries. The normalized data structures are then stored and indexed. The SQE processes queries in a similar fashion by parsing them and transforming them into a similar canonical form, which is then used to generate and execute queries against the data set.

In one embodiment, the SQE includes, among other components, a data set repository and an Enhanced Natural Language Parser ("ENLP"). The ENLP parses the initial data set and the natural language queries and determines the syntactic and grammatical roles of terms in the data set/query. In addition, when the parser is configured to recognize particular "entity tags", the ENLP determines whether any of the identified terms correspond to such entity tags, such as a person's name, location, date, organization_name, etc. Then, instead of matching terms found in the query with identical terms found in the data set (as is done in typical keyword search engines), the SQE locates terms in objects of the data set that have similar grammatical roles to the grammatical roles of similar terms in the original query. In addition, when entity tags are recognized by the parser, the SQE utilizes such entity tags to speed up the search or to generate greater accuracy when an entity tag type is applicable to the query being posed. For example, in response to a user query that poses a question beginning with "When did . . . ?," the SQE may only examine objects of the data set that include an entity tag type that indicates that a "date" is present (directly specified or indirectly specified through the use of an object level date attribute). Using such techniques, the SQE is able to achieve more contextually accurate search results more frequently than using traditional search engines.

One skilled in the art will recognize that, although the techniques are described primarily with reference to text-based languages and collections of documents, the same techniques may be applied to any collection of terms, phrases, units, images, or other objects that can be represented in syntactical units and that follow a grammar that defines and assigns roles to the syntactical units, even if the data object may not traditionally be thought of in that fashion. Examples include written or spoken languages, for example, English or French, computer programming languages, graphical images, bitmaps, music, video data, and audio data. Sentences that comprise multiple words are only one example of a phrase or collection of terms that can be analyzed, indexed, and searched using the techniques described herein.

In addition, the term "natural language query" is used to differentiate the initial query from subsequent data queries created by an SQE in the process of transforming the initial query into a set of data-set-specific queries (e.g., database queries) that are executed against the indexed data set. One skilled in the art will recognize, however, that the form and content of the initial query will relate to and depend upon the form of objects in the data set—i.e., the language of the data set.

The Syntactic Query Engine is useful in a multitude of scenarios that require indexing, storage, and/or searching of, especially large, data sets, because it yields results to data set queries that are more contextually accurate than other search engines. In a text-based, document environment, the SQE identifies the syntax of a submitted natural language query or sentence within a data set (e.g., which terms are nouns, adjectives, verbs, and other parts of speech, and the relationships between the terms), determines which terms are less likely to produce meaningful results (e.g., words like "the", "a", and "who"), and ignores these terms. For example, given the natural language query, What types of scientific research does the Department of Defense fund?

the SQE identifies "scientific" as an adjective, "research" as a noun, "Department of Defense" as a noun phrase, and "fund" as a verb. The other terms in the sentence are ignored as being less meaningful. Based on the identified syntax, the SQE determines the grammatical role of each meaningful term (e.g., whether the term is a subject, object, or governing verb). Based upon a set of heuristics, the SQE uses the determined roles to generate one or more data queries from the natural language query to execute against the data set, which has been indexed and stored previously using a similar set of heuristics. For example, in the query above, "Department of Defense" is determined to be a subject of the sentence, "fund" is determined to be the governing verb of the sentence, and "scientific" and "research" are both determined to be objects of the sentence. Based on the determined grammatical roles, the SQE is able to generate an enhanced data representation and, hence, data queries that tend to return more contextually accurate results because the data set has been transformed to a similar enhanced data representation. In addition, the enhanced data representation of the query is constructed to take advantage of ambiguities in the posing of the query or in the language itself by automatically adding relationships to the data representation that potentially result in greater contextually relevant matches. Specifically, rather than identifying data in the data set that matches terms or parts of terms in the query (like traditional keyword search engines), the SQE executes the data queries to return data that contains similar terms used in similar grammatical roles to those terms and grammatical roles in the submitted natural language query. In summary, the SQE uses its determination of the grammatical roles of terms to transform a syntactic representation of data in the data set and in queries submitted against the data to a canonical representation that can be efficiently and intelligently compared.

FIG. 1 shows a natural language query and the results returned by an example embodiment of a Syntactic Query Engine. The example natural language query, Does Argentina import or export gas?

shown in query box 102, when executed against a previously indexed data set, returns results in results area 103 that relate to Argentina's importation and exportation of gas, even though the terms "import" and "export" do not appear in all of the records of the results. Thus, the SQE is able to make what one would consider greater contextual associations between the designated natural language query and the data set than a traditional keyword search would provide. This capability is due to the SQE's ability to index data sets and perform syntactical searches based on determined grammatical roles of and relationships between terms in the query and terms within sentences in the data set, as opposed to keyword searches, yielding a more effective search tool. The SQE is thus able to "recognize" that certain terms in a data set may be relevant in relation to a submitted query simply because of their grammatical roles in the sentence. For example, the first sentence returned 104 refers to Argentina as a "customer" as opposed to an "importer." This sentence may not have been returned as a result of the shown natural language query had a traditional keyword search been performed instead, because "customer" is not identical or a part of the term "importer."

In addition, in another example embodiment, the SQE is able to both index and search a data set using a range of parsing levels, from "deep" parsing to "shallow" parsing, which potentially increases searching efficiency when used with a very large corpus of documents. Deep parsing decomposes a data object into syntactic and grammatical tag units using sophisticated syntactic and grammatical roles and heuristics as described above. Shallow parsing decomposes a data object to recognize "attributes" of a portion or all of a data object (e.g., a sentence, clause, etc), such as a country, name, date, location, content identifier, gene name, compound, chemical, etc. These "attributes" are referred to as "entity tags" of the data object in the sense that they tag the data object (or a portion of the data object, such as a term)

with associated information. For example, the entity tag type "country" may be associated with a particular term such as "Bangladesh," which has also been tagged as a "noun" (part-of-speech tag) and as a "subject" (grammatical role tag). Using exclusively shallow parsing techniques, the only information indexed for a sentence may be its entity tags. Preferably, the entity tags to be recognized by the SQE parser are configurable and can be indicated dynamically. Indexing a data object using entity tags instead of all of the syntactic and grammatical role tags allows for more efficient searches; indexing a data object using entity tags in addition to the syntactic and grammatical role tags (or subset of them) allows for more accurate searches. Moreover, an administrator configuring the SQE can optimize (minimize) the search time over result interpretation time as desired. Also, by being able to represent a phrase/sentence, etc. as a simplified to complex set of tags, a very large amount of documents or other objects can be automatically indexed at a finer granularity, for example, at the sentence level, instead of at the gross document level.

For example, a sentence may contain information that indicates a date, such as a year, month, day, or other date description. When such information is detected by the SQE, an appropriate entity tag type, such as a "date" entity tag type, is then associated with the enhanced data representation for that sentence. When configured for shallow parsing, the SQE may only store the entity tag type and entity tag value (the term) along with a reference to the original sentence as the canonical representation of the entire sentence and may not store any syntactic tags or grammatical role information at all. Alternatively, when configured for deeper parsing, the SQE may store one or more grammatical tags and entity tag type information as associated with the terms. This process of decomposing a sentence into tags (syntactic, grammatical, entity, or otherwise) results in "sentence level indexing" as one or more tags are stored to represent the entire sentence.

As another example, if the parsing level indicates "entity tags only," and further indicates that only entity tags of type "country" are one of the recognized entity tag types, then any sentence containing a country name like "Argentina," for example, YPF of Argentina exports natural gas, or Tango is a popular dance form in Argentina will be represented by the entity tag type "country" with a value equal to the term "Argentina." Later, when a search is conducted, a match between a query and the corpus of data objects is detected when the same entity tag type with the same entity tag value is present in both the query and the object. Thus, in this example where the data objects are parsed at a shallow parsing level, any reference in a query to anything having to do with "Argentina" will return both of these sentences.

At a next level of depth of parsing, the SQE may index an object using both entity tags and certain (configurable) grammatical role information, such as a subset of grammatical role tags. A match is then detected using the entity tags and the grammatical role tags indicated by the indexing level. For example, if certain entity tags are designated to be recognized as well as governing verbs, then each clause of a sentence is indexed and represented by its governing verb grammatical role tag and any designated entity tags present within the clause. A "clause," as used herein, is a unit that is defined by the presence of a single governing verb; however, one skilled in the art will recognize that alternate definitions exist and that the SQE can be modified accordingly. When the SQE used to index a document according to this parsing level, the indexing may be considered to operate on the clause level, as opposed to the sentence level.

At the next level of parsing in depth, the SQE may index certain entity tags, governing verbs, and noun-phrases, yielding an enhanced representation of a sentence that is yet one level "deeper" in the amount of information used to index the sentence. Thus, as one skilled in the art will recognize, different levels of parsing and indexing can be accommodated all the way to indexing using as many grammatical roles as desired. Also, one skilled in the art will recognize that the data objects may be parsed hence indexed at one level, yet a query be parsed at another level. Preferably, some amount of dynamic control of the parsing levels is available.

Tag detection and tag storage as part of an enhanced representation is different from a traditional keyword mechanism. Typically, a keyword mechanism necessitates associating a specific word with a document and, in some cases, is even explicitly stored as additional data with the document. In contrast, the SQE parser's tag mechanism can simply "detect" the presence of certain type of tag and, in the case of some natural language parsers, can extrapolate the presence of a tag from the grammatical structure of the sentence. For example, in one embodiment of a natural language parser used by the SQE, the parser can extrapolate from the sentence:

Argentina has imported gas for over 20 years?

that "20 years" is an entity value of a "date" entity tag type, because of the presence of the temporal adverb "over" (or "for over") preceding the "20 years" clause. The SQE can also recognize entity tags from the presence of particular words in a sentence. For example, a query containing the words "how many" may imply the presence of a "quantity" entity tag type. Different techniques may be used to enable automatic detection by the SQE parser of the desired entity tags, such as probabilistic rules, dictionaries, look-up tables, synonym tables, knowledge bases, hierarchical dependency charts, and the like. One skilled in the art will recognize that these capabilities are determined by the functionality of the particular parser incorporated or parsing technique used, and that some parsers enable administrators to add to or modify the data structures or rules used to parse an object.

FIG. 2 is an example block diagram of a Syntactic Query Engine. A document administrator 202 adds and removes data sets (for example, sets of documents), which are indexed and stored within a data set repository 204 of the SQE 201. A subscriber 203 to a document service submits natural language queries to the SQE 201, typically using a visual interface. The queries are then processed by the SQE 201 against the data sets stored in the data set repository 204. The query results are then returned to the subscriber 203. In this example, the SQE 201 is shown implemented as part of a subscription document service, although one skilled in the art will recognize that the SQE may be made available in many other forms, including as a separate application/tool, integrated into other software or hardware, for example, cell phones, personal digital assistants ("PDA"), or handheld computers, or associated with other types of services. Additionally, although the example embodiment is shown and described as processing data sets and natural language queries that are in the English language, as discussed earlier, one skilled in the art will recognize that the SQE can be implemented to process data sets and queries of any language, or any combination of languages.

Figure 3:
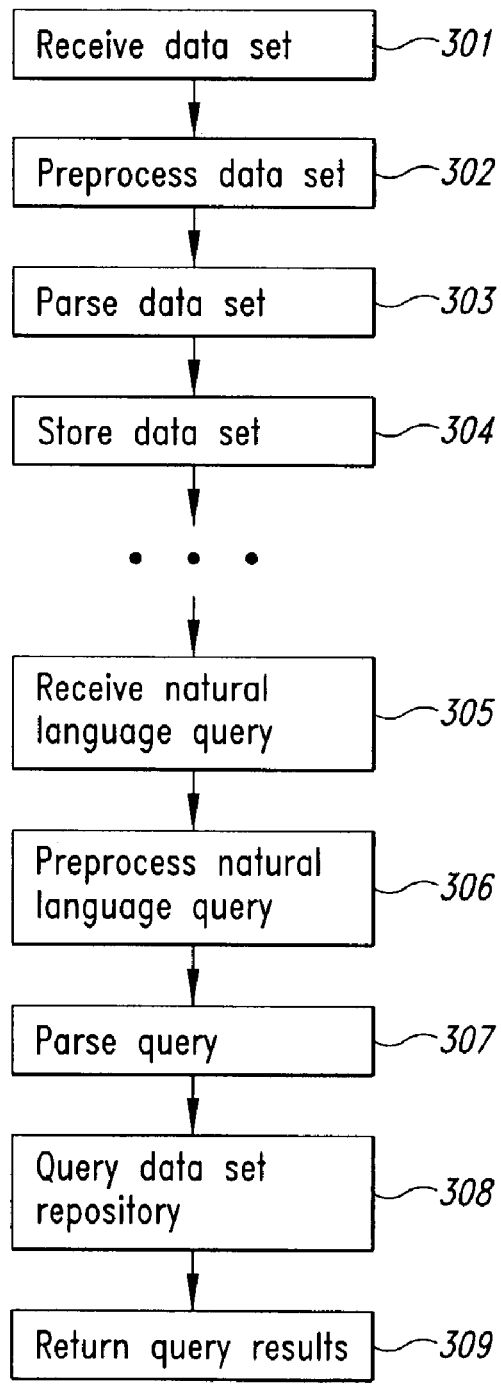
FIG. 3 is an example flow diagram of the steps performed by a Syntactic Query Engine to process data sets and natural language queries.

FIG. 3 is an example flow diagram of the steps performed by a Syntactic Query Engine to process data sets and natural language queries. In step 301, the SQE receives a data set, for example, a set of documents. In step 302, the SQE preprocesses the data set to ensure a consistent data format. In step 303, the SQE parses the data set, identifying entity tags and the syntax and grammatical roles of terms within the data set as appropriate to the configured parsing level and transforming the data to a normalized data structure. In step 304, the SQE stores the parsed and transformed data set in a data set repository. After a data set is stored, the SQE can process natural language queries against the data set. In step 305, the SQE receives a natural language query, for example, through a user interface. In step 306, the SQE preprocesses the received natural language query, formatting the query as appropriate to be parsed. In step 307, the SQE parses the formatted query, identifying the syntactic and grammatical roles of terms in the query and transforming the query into a normalized data structure. In some cases, for example using search operators where specific terms or entity tag types are used in specific grammatical roles, the step of parsing the query may be bypassed (and the normalized data structure assumed from the components of the query). Using the parsed query, in step 308, the SQE generates and submits data queries (e.g., SQL statements) against the data set stored in the data set repository. Finally, in step 309, the SQE returns the results of the natural language query, for example, by displaying them through a user interface.

FIGS. 4 through 15 are example screen displays of an example Syntactic Query Engine user interface for submitting natural language queries and viewing query results. FIG. 4 is an example screen display illustrating general search functionality of an example Syntactic Query Engine user interface. The general search functionality allows a user, for example, to submit a natural language query in the form of a sentence, which may be a statement or a question. The user enters a query in query box 401 and, using the search button 403, submits the query to the SQE, for example, the SQE of FIG. 2. The SQE displays the query results in results area 405. Each result that is returned by the SQE after performing a general search is a sentence extracted from the data set. Depending on the data set, other information may also be displayed with each result. For example, additional information displayed with the results shown in FIG. 4 include the document title (e.g., "Foreign reserves & the exchange rate"), the name of the country the document relates to (e.g., "Somalia"), the date associated with the document (e.g., "[28-DEC-1997]"), and the location (e.g., directory) where the original source document is stored. One skilled in the art will recognize that depending on the type of data that comprises the data set, different types of related information may be displayed as part of a result in a result set. Each displayed result is also a link that, when selected, causes the SQE user interface to display a larger portion of the data set from which the selected result was extracted. For example, if the sentence 406 shown as, > The now defunct Central Bank of Somalia suffered a setback after the fall of Mr. Siad Barre in 1991 when a reported $70 m in foreign exchange disappeared, is selected, the SQE will display a portion of the source document 407, labeled, > Foreign reserves & the exchange rate, from which that sentence was retrieved. Although this example refers to a "user" submitting natural language queries, one skilled in the art will recognize that natural language queries may be submitted to an SQE through means other than user input. For example, an SQE may receive input from another program executing on the same computer or, for example, across a network or from a wireless PDA device.

Figure 5A:
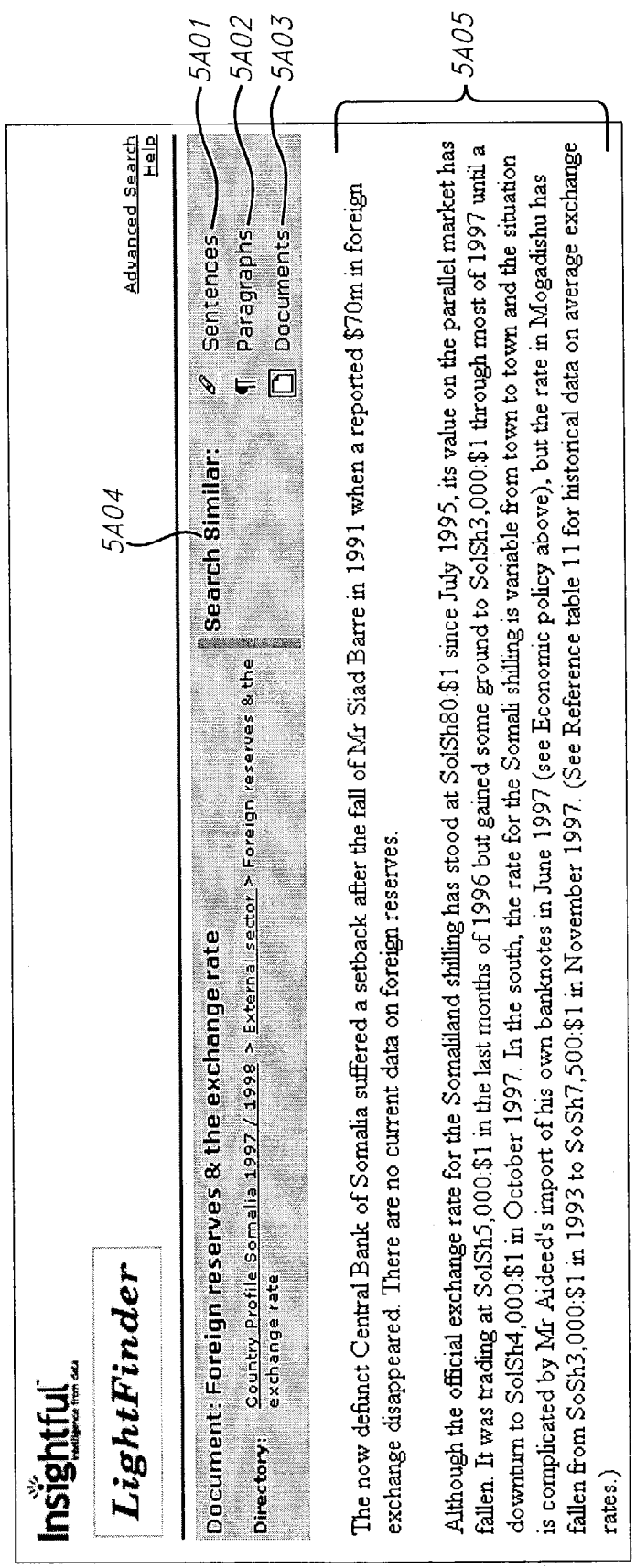
FIG. 5A is an example screen display illustrating a portion of a data set from which a natural language query result was extracted.

FIG. 5A is an example screen display illustrating a portion of a data set from which a natural language query result was extracted. The portion displayed in text area 5A05 typically reflects the selected sentence that resulted from the query as well as a number of surrounding sentences in the document.

Additional options are also available while viewing portions of the data set. For example, the user may select a sentence in text area 5A05 and select option "Sentences" 5A01 from the Search Similar Menu 5A04, causing the SQE to perform a syntactic search (using the search and indexing techniques described herein) against the data set using the selected sentence as a new natural language query. The search similar sentence functionality is described in detail with reference to FIGS. 5B and 5C. Alternatively, a user may select an entire paragraph and select option "Paragraphs" 5A02 from the Search Similar Menu 5A04. Selecting the Search Similar Paragraphs option causes the SQE to perform a search against the data set to return other documents (or other paragraphs or other object entity) within the data set that contain content similar to the selected paragraph. For example, when the user selects a paragraph, the SQE may return a list of documents that contain paragraphs similar to the one or more sentences within the selected paragraph. A judgment of "similarity" is dependent upon the method used by the SQE to compare the query with the corpus of objects. The user may also select option "Documents" 5A03 from the Search Similar Menu 5A04, causing the SQE to perform a search against the data set to return other documents within the data set that contain content similar to the selected document.

In an exemplary embodiment of an SQE, the paragraph and document similarity searches are preferably performed using latent semantic regression techniques as described in U.S. patent application Ser. No. 09/962,798, filed on Sep. 25, 2001, and entitled "Extended Functionality for an Inverse Inference Engine Based Web Search," which is a continuation-in-part of U.S. application Ser. No. 09/532,605 filed Mar. 22, 2000, and claims priority from U.S. Provisional Application No. 60/235,255, filed on Sep. 25, 2000, all of which are incorporated herein by reference in their entirety. Latent semantic regression is a type of latent semantic indexing that uses a different mathematical basis than other types of latent semantic indexing. Latent semantic indexing ("LSI") when used for information retrieval assumes that there is structure to the usage and frequency of terms in a document corpus. Traditional LSI techniques use a mathematical approach referred to as "singular value decomposition" to transform the document space (documents in the corpus) so as to better approximate the difference between a source query and target result documents by taking advantage of the clustering of terms within a document corpus. Latent semantic regression, on the other hand, incorporates a Backus-Gilbert inverse inference method to transform the document space in order to solve/approximate the difference between a source query and target result documents, bypassing the intermediate (and potentially less accurate) step of transforming the document space using singular value decomposition. The patent applications incorporated describe in detail how latent semantic regression operates.

Part of latent semantic regression ("LSR") involves the generation of a "term-document" matrix (or matrix of whatever units are applicable) so that the SQE can analyze a designated query against the data set. In one embodiment, the generation of a term-document matrix occurs when a data object (e.g., a document) is indexed into its constituent parts (e.g., sentences). Then, when the SQE responds to a request to Search Similar Paragraphs or Search Similar Documents, the SQE uses latent semantic regression to determine which documents (or portions of document, such as paragraphs or sentences) "match" the selected paragraph(s) or document(s). The composition of the term-document matrix may be influenced by the level of parsing/indexing; thus, deep parsing may result in a very rich matrix with grammatical role tags used to add combinations of terms (such as noun phrases) to the matrix, whereas shallow parsing may store a few context-based "entity tags" in addition to every term as rows of the term-document matrix. If one desires to match to the paragraph or even sentence level, then terms within a sentence or paragraph may be characterized in the matrix, for example, in a term-sentence matrix or a term-paragraph matrix, instead of a term-document matrix. One skilled in the art will recognize that the definition of a document could include a single sentence or a single clause.

One skilled in the art will recognize that the Search Similar functionality can also be used independently of any syntactic searching. That is, a user interface (although not shown in FIG. 5A) could be supported that allows a user to input or select one or more paragraphs or one or more documents and choose the Search Similar Paragraph/Document function to match similar paragraphs or documents. This technique may directly employ the LSR methodology above without any syntactic parsing of the query. Also, one skilled in the art will recognize that other types of searches, including syntactic searches as described herein, may be implemented as well for the "Sentences," "Documents," and "Paragraphs" options. For example, a keyword search or one or more syntactic searches may be used at different times or may be selectable.

FIG. 5B is an example screen display illustrating a search similar sentence operation. In FIG. 5B, a sentence is selected within a portion of a data set from which a natural language query result was extracted. Selecting the sentence 5B06 and then selecting option "Sentences" 5B01 from the Search Similar Menu 5B04 causes the SQE to perform a syntactic search against the data set, returning results that are similar to the selected sentence 5B06. FIG. 5C is an example screen display illustrating results that correspond to the search similar sentence operation initiated in FIG. 5B. From the results displayed, one can see that the resulting sentences relate in a manner that goes beyond word or pattern matching.

Although discussed herein primarily with respect to documents, the SQE supports data sets comprising a variety of objects and data formats and is not limited to textual documents. For example, a data set may comprise text documents of various formats, with or without embedded non-textual entities (e.g., images, charts, graphs, maps, etc.), as well as documents that are in and of themselves non-textual entities. FIGS. 6 through 9 illustrate support of natural language queries that request specific non-textual data. One skilled in the art will recognize that support for other format combinations of stored and requested data are contemplated.

Figure 7:
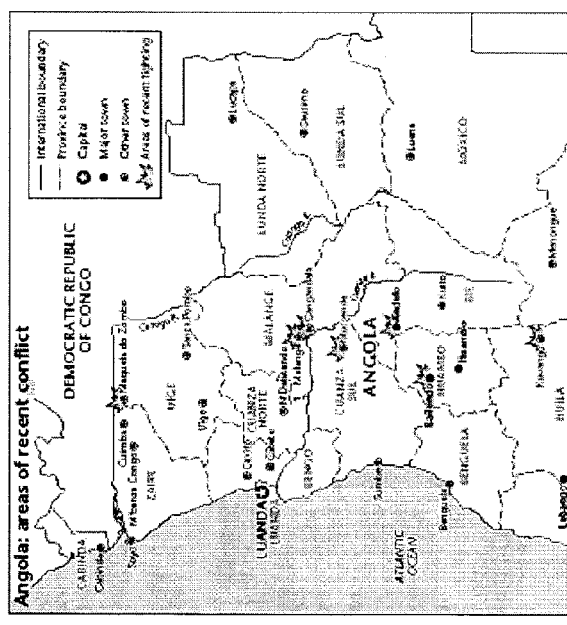
FIG. 7 is an example screen display illustrating a map that corresponds to the query result selected in FIG. 6.

FIG. 6 is an example screen display illustrating Syntactic Query Engine results from a natural language query that requests a map. When the user selects one of the returned results, for example, the "Angola [icon]" 608, the requested map is displayed. FIG. 7 is an example screen display illustrating a map that corresponds to the query result selected in FIG. 6.

Figure 9:
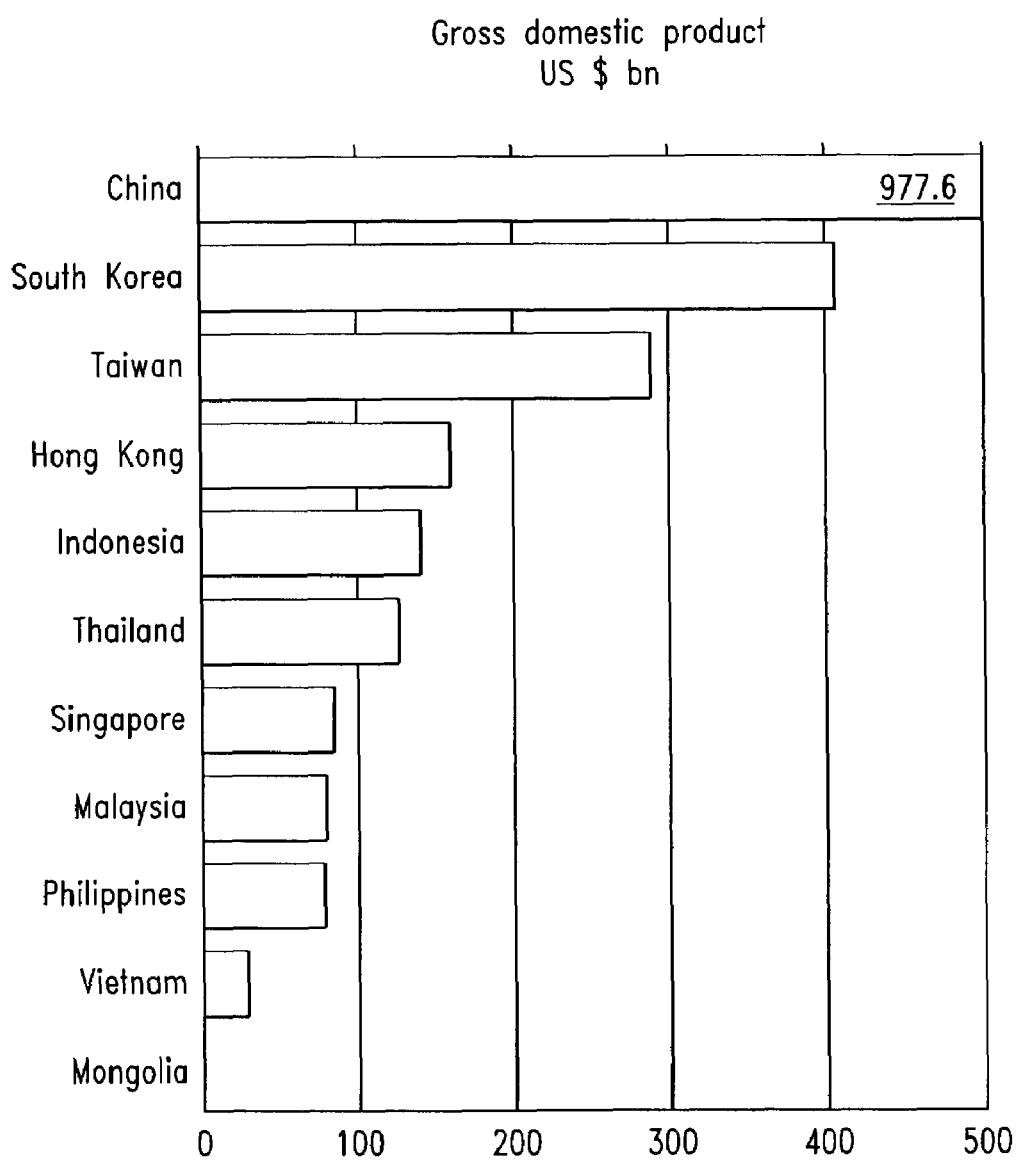
FIG. 9 is an example screen display illustrating a chart that corresponds to the query result selected in FIG. 8.

FIG. 8 is an example screen display illustrating Syntactic Query Engine results from a natural language query that requests a chart. When the user selects one of the returned results, for example, the "China [icon]" 808, the requested chart is displayed. FIG. 9 is an example screen display illustrating a chart that corresponds to the query result selected in FIG. 8.

In addition to queries that are formulated as one or more sentences, the SQE supports searching based upon designated syntactic tags and/or grammatical role tags. The SQE advanced search functionality supports natural language queries that specify one or more terms, each associated with a grammatical role or a part of speech as a search "operator."

Figure 10:
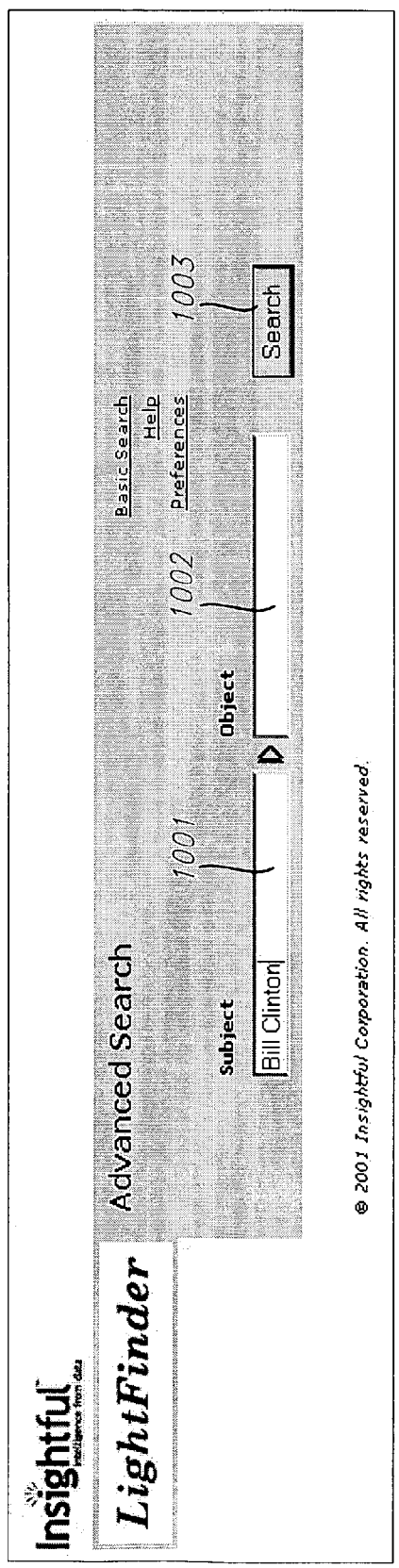
FIG. 10 is an example screen display of an advanced search using a natural language query that contains a subject.

FIG. 10 is an example screen display of an advanced search using a natural language query that contains a subject. From this screen display, a user may enter a word or phrase as a subject 1001 and/or as an object 1002, the "subject" and "object" each being a grammatical role. Selecting the Search button 1003 submits the query to the SQE. In the example shown, a user enters "Bill Clinton" as the subject. When the user selects the Search button 1003, the SQE performs a syntactic search, returning a list of verbs from sentences within the data set which contain "Bill Clinton" as a subject. This result shows what "actions" (verbs) are associated with a specific entity named "Bill Clinton" in the documents present in the data set, so that the user can then select the action in which the user is most interested. The search operator may be thought of as "retrieve all relations (actions) involving one specified entity (subject or object)" or the reverse.

FIG. 11 is an example screen display illustrating advanced search results from a query that contains a subject. The results are displayed as a list of the verbs found in sentences within the stored data set in which the designated subject occurs as an identified subject of the sentence. The number in brackets after each listed verb indicates the number of times the designated subject and listed verb are found together in a sentence within the stored data set. For example, the top entry of the middle column 1101 of the verb list indicates that the SQE identified 16 sentences within the data set which contain "Bill Clinton" as a subject and "visit" (or some form of the verb "visit") as the verb. The SQE determines the order in which the verb list is displayed. As illustrated in FIG. 11, the verb list may be displayed according to decreasing frequency of occurrence of the designated subject and/or object in the data set. In an alternate embodiment, the verbs may be displayed in alphabetical order. In another embodiment, the verbs may be grouped and/or ordered based on the similarity of meanings among the displayed verbs (e.g., categories of verbs). The similarity of meanings among multiple verbs can be determined using an electronic dictionary, for example, WordNet. The WordNet dictionary is described in detail in Christiane Fellbaum (Editor) and George Miller (Preface), *WordNet (Language, Speech, and Communication)*, MIT Press, May 15, 1998, which is herein incorporated by reference in its entirety.

When the user selects a verb from the returned list, the SQE returns a set of resulting sentences with the designated subject and selected verb. FIG. 12 is an example screen display illustrating a portion of resulting sentences returned by a Syntactic Query Engine when a particular verb is selected from the verb list. In the example shown, the verb "visit" has been selected from the verb list shown in FIG. 11, causing the SQE to display the 16 sentences within the data set where "Bill Clinton" is found as a subject and "visit" is found as the verb. The SQE identifies verbs without regard to specific tense, which enhances the contextual accuracy of the search. For example, if the user selects "visit" as the verb, the SQE returns sentences that contain the verb "visited" (e.g., results 1-4 and 6), and sentences that contain the verb "may visit" (e.g., result 5). The results displayed in the results area 1205 are displayed in the same format as the results displayed in the results area 405 of FIG. 4. Accordingly, selecting one of the displayed results causes the SQE to display a larger portion of the data set from which the selected result was extracted, as described with reference to FIG. 5A.

Figure 13:
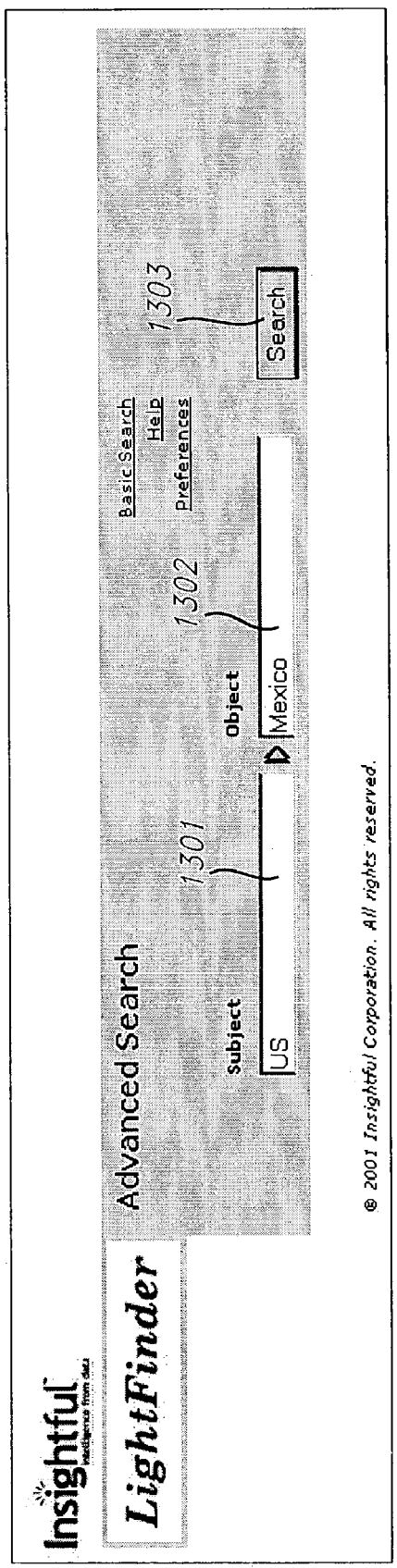
FIG. 13 is an example screen display of advanced search functionality using a natural language query that contains a subject and an object.

As described, with reference to FIG. 10, a user may designate a subject and/or an object when using the advanced search functionality. FIG. 13 is an example screen display of advanced search functionality using a natural language query that contains a subject and an object. In FIG. 13, the user designates "US" as a subject in subject field 1301 and "Mexico" as an object in object field 1302. When the user selects the Search button 1303, the SQE performs a syntactic search against the data set for sentences in which "US" appears as an identified subject and "Mexico" appears as an identified object. Note that, typically, the SQE can perform this syntactic search without parsing the query to heuristically guess at what the user intended as the subject and/or objects of the query since the user has explicitly (or indirectly) indicated a subject and/or an object. This search operator may be thought of as "retrieve all relations (actions) between two specific entities (subject and object)" or the reverse.

Figure 14:
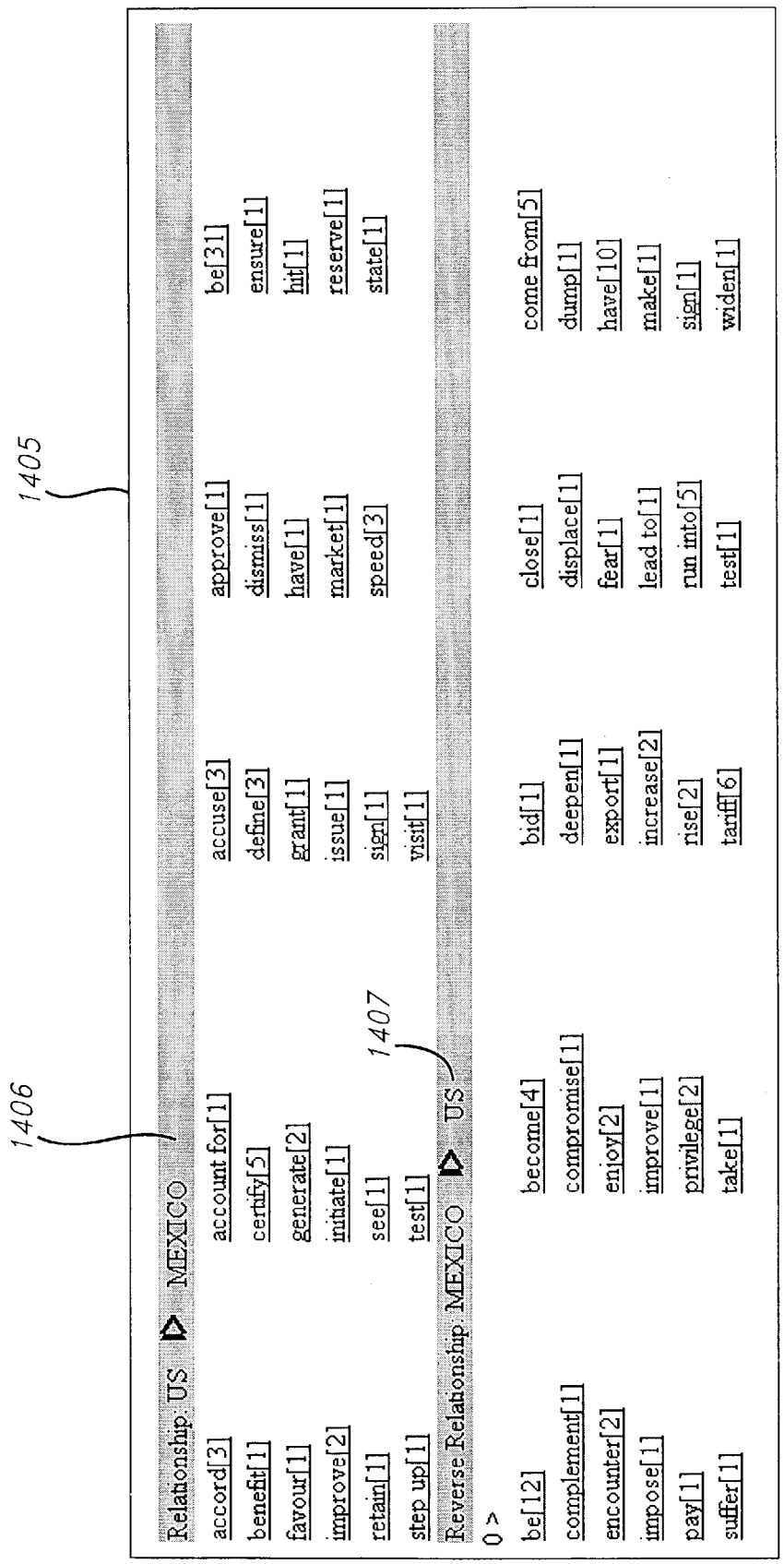
FIG. 14 is an example screen display illustrating advanced search results from a query that contains a subject and an object.

FIG. 14 is an example screen display illustrating advanced search results from a query that contains a subject and an object. The top half 1406 of results area 1405 lists verbs returned where the designated subject appears as a subject of the sentence and the designated object appears as an object of the sentence. The lower half 1407 of results area 1405 lists verbs returned where the designated object appears as a subject of the sentence and the designated subject appears as an object of the sentence. Thus, the lower half 1407 displays results of a query using the inverse relationship between the subject and object. In this specific example, the top half 1406 of results area 1405 lists verbs found in sentences which contain "US" as a subject and "Mexico" as an object. The bottom half 1406 of results area 1408 lists verbs found in sentences which contain "Mexico" as a subject and "US" as an object. Returning results related to the inverse relationship can be useful because sentences within the data set that are contextually accurate results to the natural language query may be overlooked if the inverse relationship is not examined. As similarly described with reference to FIGS. 11 and 12, when the user selects a verb from the returned list, the SQE returns a set of resulting sentences with the designated subject, designated object, and selected verb. The resulting sentences are displayed in the same format as the results displayed in the results area 405 of FIG. 4 and the results displayed in the results area 1205 of FIG. 12. Accordingly, selecting one of the displayed sentences causes the SQE to display a larger portion of the data set from which the selected sentence was extracted, as described with reference to FIG. 5A.

Although FIGS. 10-14 illustrate advanced search functionality with reference to natural language queries that specify a subject and/or an object, one skilled in the art will recognize that a multitude of syntactic and grammatical roles, and combinations of syntactic and grammatical roles may be supported as search operators. For example, some of the combinations contemplated for support by the advanced search functionality of the SQE are:

subject/object;
subject/verb/object;
subject/verb;
verb/object;
preposition/verb modifier/object;
verb/verb modifier/object;
verb/preposition/object;
verb/preposition/verb modifier/object;
subject/preposition/verb modifier;
subject/preposition/verb modifier/object;
subject/verb/verb modifier/object;
subject/verb/preposition;
subject/verb/preposition/object;
subject/verb/preposition/verb modifier;
subject/verb/preposition/verb modifier/object; and
noun/noun modifier.

Such support includes locating sentences in which the designated terms appear in the associated designated syntactic or grammatical role, as well as locating, when contextually appropriate, sentences in which the designated terms appear but where the designated roles are interchanged. For example, as described above, it is contextually appropriate to interchange the grammatical roles of a designated subject and a designated object. Also, as used herein an "argument of a preposition" is referred to as a "verb modifier," and both terms are used synonymously.

In addition, the SQE supports search operators that are based upon entity tags and/or combinations of designated syntactic tags and/or grammatical role tags with entity tags. For example, the following additional search operators may be supported in SQE implementations that include entity tag matching support:

(1) retrieve all entities of any entity tag type that relate two specific entities (subject and object)
(2) retrieve all entities of a specific entity tag type that relate two specific entities (subject and object)
(3) retrieve all relations (actions) involving one specified entity (subject or object) relative to the another entity of a specific entity tag type
(4) retrieve specified relation (specified verb or verb synonyms) involving one specified entity (subject or object)
(5) retrieve specified relation (specified verb or synonyms) involving one specified entity (subject or object) relative to the another entity of a specific entity tag type
(6) retrieve all relations (actions) involving one entity (subject or object) of a specific entity tag type to another entity (object or subject, accordingly) of a specific entity type
(7) retrieve specified relation (specified verb or synonyms) involving one entity (subject or object) of a specific entity tag type to another entity (object or subject, accordingly) of a specific entity type Operator (1) can be thought of as matching all occurrences in an object of the data set where the specified subject and object occur (e.g., in a sentence) with another entity of any (recognized) entity tag type, like a location, organization, date etc. Operator (2) can be thought of as matching all occurrences where the specified subject and object occur with an entity of the specified entity tag type, for instance a "country" entity tag type. Operator (3) can be thought of as matching all occurrences where the specified subject (or specified object) is related to any object (or subject if the object is specified) whose entity tag type matches the specified entity tag type. Operator (4) represents the subject/verb and verb/object operators mentioned earlier expanded to include synonyms of verbs and will match all occurrences where the specified subject or object is related to some other entity (object or subject) using the specified verb or a synonym of that verb. One skilled in the art will recognize that such synonyms can be determined via an electronic dictionary or look-up mechanism. Operator (5) can be thought of as matching all occurrences where the specified subject (or specified object) is related to any object (or subject if the object is specified)

whose entity tag type matches the specified entity tag type using the specified verb or a synonym of that verb. Operator (6) can be thought of as matching all occurrences where a subject whose entity tag type matches the specified entity tag type is related via any action to an object whose entity tag type matches the specified entity tag type. Similarly, operation (7) can be thought of as matching all occurrences where a subject whose entity tag type matches the specified entity tag type is related via a specified verb or a synonym of the specified verb to an object whose entity tag type matches the specified entity tag type. In addition, any of the described operators (or others) may be extended to match by "N" degrees of separation: that is 2 or more sentences may be required to satisfy the intended match and the relationship specified by the operator is then inferred as if the match had occurred all in one sentence.

Additional examples that illustrate user interface screens that use these various search operators and their results are included in Appendix D, which is herein incorporated by reference in its entirety. In these examples, the specification of an entity value may not be labeled explicitly as a "subject" or "object," but the appropriate grammatical role may be inferred from the layout. Also, these examples demonstrate that alternative user interfaces, such as those that are more graphically based, may be used with the techniques of the present invention. Some of these user interfaces include additional features such as entity tag type icons that graphically display the entity tag type of matching and specified entities. Also, additional constraints can be supplied by a user to further narrow the query. For example, document level attributes or specific values that correspond to specified part-of-speech tags, grammatical role tags, or entity tags may be indicated. One use of such constraints is, for example, to specify a value for an adverb or a prepositional phrase.

Figure 15:
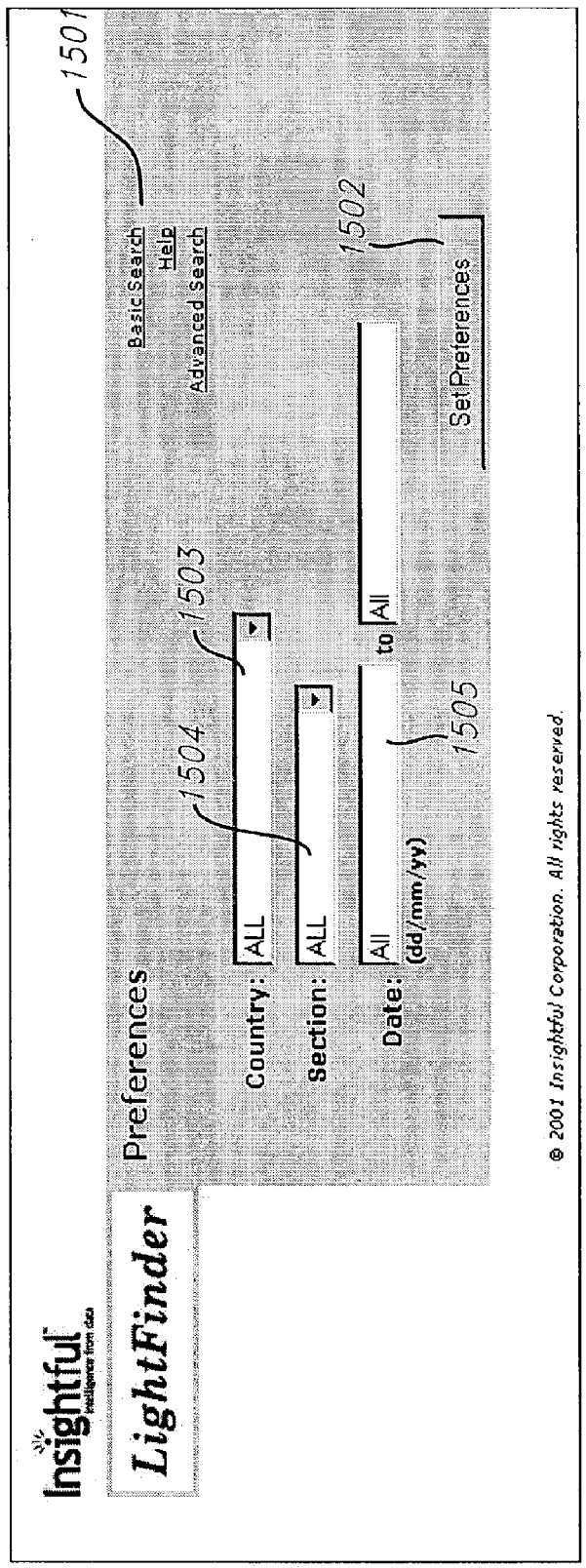
FIG. 15 is an example screen display illustrating the designation of programmable object level attributes in a Syntactic Query Engine.

In addition to indexing and searching based on grammatical roles, the Syntactic Query Engine may be implemented to recognize any number of programmable object (e.g., document) level attributes in natural language queries and data sets (described in detail as "preferences" with reference to FIG. 15). In one embodiment, these object level attributes are used to filter the results of a syntactic search. When the objects in the data set are documents, these attributes are document level attributes. Example attributes include the names of countries, states, or regions, dates, and document sections. For example, the publication date of a document may be a designated document level attribute. One skilled in the art will recognize that an unlimited number of these attributes may be defined and may vary across multiple data sets. For example, one data set may consist of text from a set of encyclopedias. For such a data set, a "volume" attribute may be defined, where there is one volume for each letter of the alphabet. A second data set may be a single book with multiple chapters. A "chapter" attribute may be defined, for the data set, allowing a user to search specific chapters. Once a syntactic search is performed, it may make sense for a user to limit the search to a specific subset of the objects in the data set, for example, only documents that were published after a specified date. FIG. 15 is an example screen display illustrating the designation of programmable object level attributes in a Syntactic Query Engine. A user designates various attributes on the preferences window 1501. The SQE stores these attributes (preferences) when the user selects the Set Preferences button 1502. The attribute values are used by the SQE as filters when performing subsequent queries. For example, the user may select a specific country as (a document level) country attribute 1503. When the SQE performs a subsequent natural language query, the results returned are only those sentences found in documents within the data set that relate to the country value specified as country attribute 1503.

One skilled in the art will recognize that the entity tags associated with syntactic units may appear similar to particular attribute types defined at the document level. For example, there may be recognized a sentence with an entity tag type "Country" and a document level attribute of "Country," even though they may or may not have any correlation. (They may indeed have completely distinct values.) In addition, a document level attribute may be defined with an attribute value that isn't found anywhere in any sentence within the document. For example, the publication entity for a document may indicate a "Country" value such as "United States," even though no sentence with the document contains an entity tag with a "Country" type or entity tag value of "United States." Also, one skilled in the art will recognize that, in some embodiments, the entity tags present in sentences can be extrapolated up to the document level as "meta" document level attributes and used to enrich the document level attributes. In such designs, the preferences menu could then allow a user to specify them as preferences to filter search results. Conversely, document level attributes may be implicitly inferred to be present at the sentence level during a matching process. This capability is useful when, for example, a search indicates that a specific entity tag type is desirable to qualify the search, but no such entity tag type occurs in an otherwise matching sentence. For example, a query may imply a "date" entity tag type along with other terms in specific grammatical roles, yet the "date" that corresponds to the context of a sentence in the indexed document may occur in a different sentence. That is, the query "When did Clint visit Afghanistan?" typically causes the SQE to look for a matching sentence that contains "Clinton" as the subject; "visit" as the governing verb; "Afghanistan" as the object; with some other term associated with a date entity tag type. However, the date relevant to this event in a particular article may be discussed earlier in the related paragraph. The ability to infer a document level date attribute thus into the context of the sentence (which in turn might have been bubbled up from a prior sentence) might prevent this match from otherwise being missed.

A more detailed description of an example SQE illustrating additional user interface screens and example natural language queries and results is included in Appendix A, which is herein incorporated by reference in its entirety.

Figure 16:
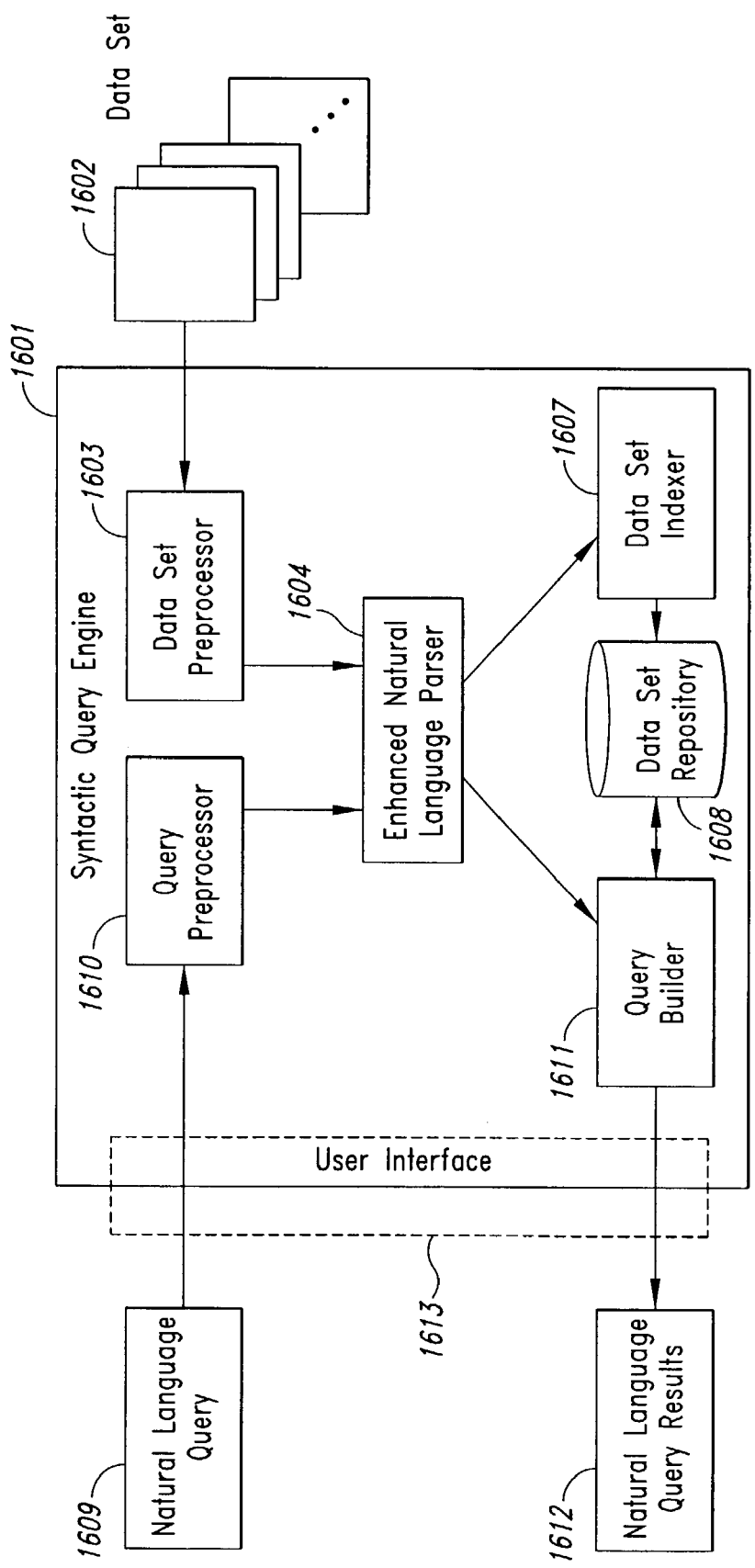
FIG. 16 is a block diagram of the components of an example embodiment of a Syntactic Query Engine.

An SQE as described may perform multiple functions (e.g., data set parsing, data set storage, natural language query parsing, and data query processing) and typically comprises a plurality of components. FIG. 16 is a block diagram of the components of an example embodiment of a Syntactic Query Engine. A Syntactic Query Engine comprises a Query Preprocessor, a Data Set Preprocessor, a Query Builder, a Data Set Indexer, an Enhanced Natural Language Parser ("ENLP"), a data set repository, and, in some embodiments, a user interface. The Data Set Preprocessor 1603 converts received data sets to a format that the Enhanced Natural Language Parser 1604 recognizes. The Query Preprocessor 1610 converts received natural language queries to a format that the Enhanced Natural Language Parser 1604 recognizes. The Enhanced Natural Language Parser ("ENLP") 1604, parses sentences, identifying the syntax and grammatical role of each meaningful term in the sentence and the ways in which the terms are related to one another and/or identifies designated entity tag types and their associated values, and transforms the sentences into a canonical form—an enhanced data representation. The Data Set Indexer 1607 indexes the parsed data set and stores it in the data set repository 1608. The Query Builder 1611 generates and executes formatted queries (e.g., SQL statements) against the data set indexed and stored in the data set repository 1608.

In operation, the SQE 1601 receives as input a data set 1602 to be indexed and stored. The Data Set Preprocessor 1603 prepares the data set for parsing by assigning a Document ID to each document that is part of the received data set, performing OCR processing on any non-textual entities that are part of the received data set, and formatting each sentence according to the ENLP format requirements. The Enhanced Natural Language Parser ("ENLP") 1604 parses the data set, identifying for each sentence, a set of terms, each term's tags, including potentially part of speech and associated grammatical role tags and any associated entity tags, and transforms this data into an enhanced data representation. The Data Set Indexer 1607 formats the output from the ENLP and sends it to the data set repository 1608 to be indexed and stored. After a data set is indexed, a natural language query 1609 may be submitted to the SQE 1601 for processing. The Query Preprocessor 1610 prepares the natural language query for parsing. The preprocessing may include, for example, spell checking, verifying that there is only one space between each word in the query, and identifying the individual sentences if the query is made up of more than one sentence. One skilled in the art will recognize that the steps performed by the Data Set Preprocessor or the Query Preprocessor may be modified based on the requirements of the natural language parser. Any preprocessing steps necessary to prepare a data set or a natural language query to be parsed are contemplated for use with techniques of the present invention. The ENLP 1604 then parses the preprocessed natural language query transforming the query into the canonical form and sends its output to the Query Builder. The Query Builder 1611 uses the ENLP 1604 output to generate one or more data queries. Data queries differ from natural language queries in that they are in a format specified by the data set repository, for example, SQL. The Query Builder 1611 may generate one or more data queries associated with a single natural language query. The Query Builder 1611 executes the generated data queries against the data set repository 1608 using well-known database query techniques and returns the data query results as Natural Language Query Results 1612. Note that when the SQE is used within a system that interfaces with a user, the SQE also typically contains a user interface component 1613. The user interface component 1613 may interface to a user in a manner similar to that shown in the display screens of FIGS. 4-15.

Figure 17:
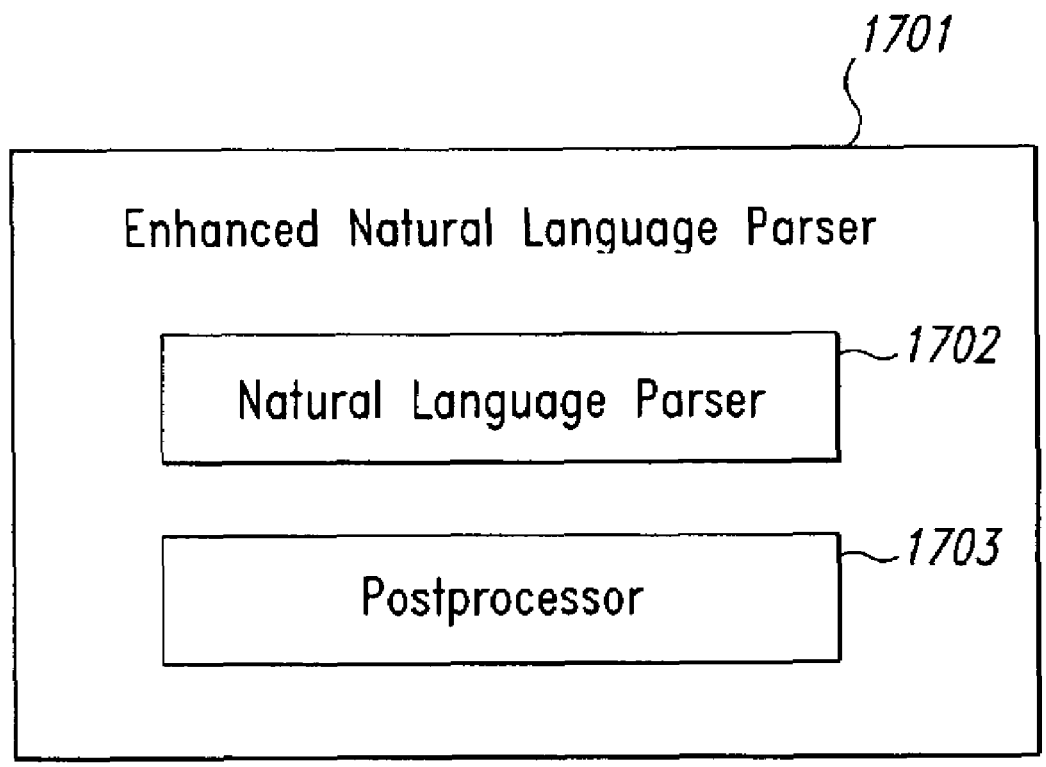
FIG. 17 is a block diagram of the components of an Enhanced Natural Language Parser of an example embodiment of a Syntactic Query Engine.

FIG. 17 is a block diagram of the components of an Enhanced Natural Language Parser of an example embodiment of a Syntactic Query Engine. The Enhanced Natural Language Parser ("ENLP") 1701 comprises a natural language parser 1702 and a postprocessor 1703. The natural language parser 1702 identifies, for each sentence it receives as input, the part of speech for each term in the sentence and syntactic relationships between the terms within the sentence. An SQE may be implemented by integrating a proprietary natural language parser into the ENLP, or by integrating an existing off-the-shelf natural language parser, for example, Minipar, available from Nalante, Inc., 245 Falconer End, Edmonton, Alberta, T6R 2V6. The postprocessor 1703 examines the natural language parser 1702 output and, from the identified parts of speech and syntactic relationships, determines the grammatical role played by each term in the sentence and the grammatical relationships between those terms. When entity tags are used in addition to or in lieu of the grammatical relationships, the postprocessor 1703 (or the natural language parser 1702 if capable of recognizing entity tags) identifies, for each sentence (or clause where relevant), each entity tag type and its value. The postprocessor 1703 then generates an enhanced data representation from the determined tags, including the entity tags, grammatical roles, and syntactic and grammatical relationships.

Figure 18:
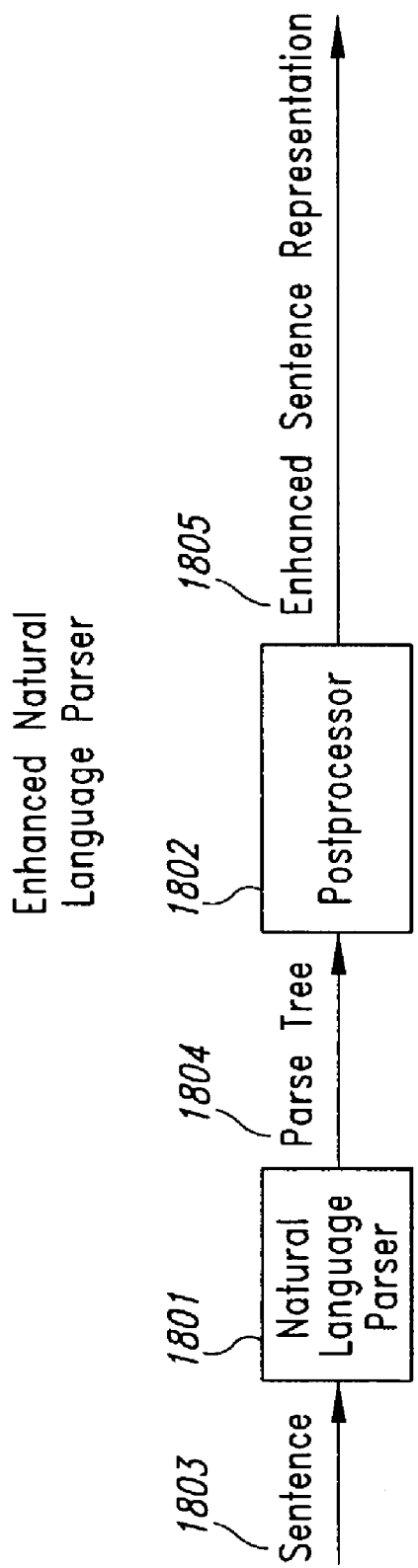
FIG. 18 is a block diagram of the processing performed by an example Enhanced Natural Language Parser.

FIG. 18 is a block diagram of the processing performed by an example Enhanced Natural Language Parser. The natural language parser 1801 receives a sentence 1803 (or portion thereof) as input, and generates a syntactic structure, such as parse tree 1804. The generated parse tree identifies the part of speech for each term in the sentence and describes the relative positions of the terms within the sentence. In embodiments that support the recognition of entity tags, the parser 1801 (or postprocessor 1802 if the parser is not capable) also identifies in the parse tree (not shown) the entity tag type for any applicable term in the sentence. (The term is the value of that entity tag type.) The postprocessor 1802 receives the generated parse tree 1804 as input and determines the grammatical role of each term in the sentence and relationships between terms in the sentence, generating an enhanced data representation, such as enhanced sentence representation 1805.

Figure 19:
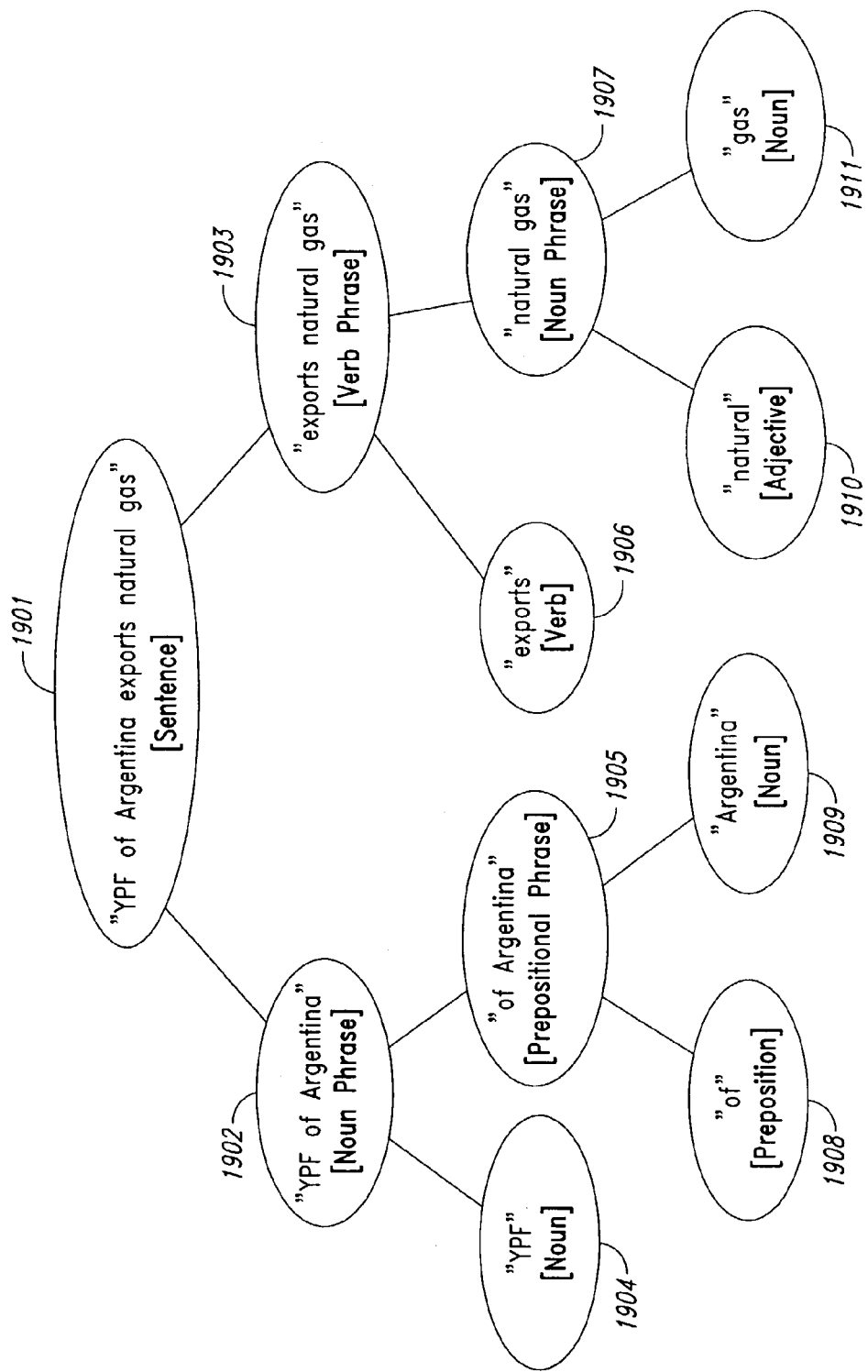
FIG. 19 is a block diagram illustrating a graphical representation of an example syntactic structure generated by the natural language parser component of an Enhanced Natural Language Parser.

FIG. 19 is a block diagram illustrating a graphical representation of an example syntactic structure generated by the natural language parser component of an Enhanced Natural Language Parser. The parse tree shown is one example of a representation that may be generated by a natural language parser. The techniques of the methods and systems of the present invention, implemented in this example in the postprocessor component of the ENLP, enhance the representation generated by the natural language processor by determining the grammatical role of each meaningful term, associating these terms with their determined roles and determining relationships between terms. In embodiments in which the natural language parser cannot support the recognition of entity tags, one skilled in the art will recognize that the postprocessor component can be programmed to enhance the representation with such tags. In FIG. 19, the top node 1901 represents the entire sentence, "YPF of Argentina exports natural gas" Nodes 1902 and 1903 identify the noun phrase of the sentence, "YPF of Argentina," and the verb phrase of the sentence, "exports natural gas," respectively. The branches of nodes or leaves in the parse tree represent the parts of the sentence further divided until, at the leaf level, each term is singled out and associated with a part of speech. A configurable list of words are ignored by the parser as "stopwords." The stopword list comprises words that are deemed not indicative of the information being sought. Example stopwords are "a," "the," "and," "or," and "but." In one embodiment, question words (e.g., "who," "what," "where," "when," "why," "how," and "does") are also ignored by the parser. In this example, nodes 1904 and 1905 identify the noun phrase 1902 as a noun, "YPF" and a prepositional phrase, "of Argentina." Nodes 1908 and 1909 divide the prepositional phrase 1905 into a preposition, "of," and a noun, "Argentina." Nodes 1906 and 1907 divide the verb phrase 1903 into a verb, "exports;" and a noun phrase, "natural gas." Nodes 1910 and 1911 divide the noun phrase 1907 into an adjective, "natural," and a noun, "gas."

FIG. 20 is a table illustrating an example enhanced data representation generated by the postprocessor component of an Enhanced Natural Language Parser. This example enhanced data representation comprises nine different ways of relating terms within the sentence that was illustrated in the parse tree of FIG. 19. The ways chosen and the number of ways used is based upon a set of heuristics, which may change as more knowledge is acquired regarding syntactic searching. In addition, one skilled in the art will recognize that the selected roles and relationships to be stored may be programmatically determined. In the example shown, row 2001 represents the relationship between "Argentina" as the subject of the sentence and "YPF" as a modifier of that subject. The SQE determines this relationship based on the location of the preposition, "of" between the two related terms in the sentence. Rows 2002 and 2003 represent the relationship between "YPF" as the subject of the sentence and "natural gas" and "gas," respectively, as objects of the sentence. Similarly, rows 2004 and 2005 represent the relationship between "Argentina" as the subject of the sentence and "natural gas" and "gas," respectively, as objects of the sentence. Rows 2006 and 2007, respectively, represent the relationship between the two nouns, "YPF" and "Argentina," each used as a subject and the verb "export." Rows 2008 and 2009 represent the relationship between the verb, "export" and the noun phrase, "natural gas" and the noun, "gas," each used as an object, respectively.

Also, other linguistic heuristics can be used to generate information for the enhanced data representation. In some implementations, the ENLP provides "co-referencing" analysis, which allows the ENLP to replace pronouns with nouns. This capability allows greater search accuracy, especially when searching for specific entity names.

In addition, when entity tags are used to create the enhanced data representation, then the table is expanded or modified to associate the identified entity tag types with their values. In an embodiment in which the parsing level includes full grammatical role tags and entity tags, then one skilled in the art will recognize that the enhanced data representation is accordingly modified. For example, the representation shown in FIG. 20 may include an additional "column" that corresponds to entity tag type with indications in rows 2001-2007 that the terms "Argentina" and "YPF" are associated with the entity tag types "country" and "organization," respectively.

FIG. 20A is an example table illustrating an example enhanced data representation generated by the postprocessor component of an Enhanced Natural Language Parser for entity tag-based representation. One skilled in the art will recognize that the selected entity tags may be programmatically determined. For example, in an embodiment with a dictionary, knowledge base, or table-driven natural language parser, the parser's native mechanism for enhancing the dictionary, knowledge-base, or table may be used to specify additional entity tags to recognize. The example shown in FIG. 20A corresponds to shallow parsing in which a sentence is completely represented in an enhanced data representation by its entity tags, in this case, the entity tags "country" and "organization." In the example shown, row 2010 represents the relationship between the term "Argentina" (a noun) and the entity tag type "country." The SQE may determine this relationship based on an internal table accessible to the parser having a list of country names. Row 2011 represents the relationship between the term "YPF" (another noun) and the entity tag type "organization." The SQE may also determine this relationship based upon an internal table. Although there are many ways to indicate the associations between the various entities and their entity tag types, one skilled in the art will recognize that one way is to simply extend the columns of the enhanced data representation to include a field that indicates entity tag type (as an identifier or description). In this manner, entity tags can be integrated with the use of grammatical roles without requiring new data structures. However, when only used with shallow parsing, the entity names appear as "subjects" even though this information may be deemed superfluous. One skilled in the art will recognize that many other implementations for indicating entity tag relationships exist including tracking in a separate table each use of an entity value and its associated entity tag type.

When a parsing level is designated that recognizes entity tags and grammatical role tags, then the enhanced data representation is changed accordingly. FIG. 20B is an example table illustrating an example enhanced data representation generated by the postprocessor component of an Enhanced Natural Language Parser for a parsing level in which entity tags are recognized as well as governing verbs. In this case, it is possible for the sentence to have multiple clauses, each with a governing verb. Thus, each clause of the sentence is indexed separately. The sentence "YPF of Argentina exports natural gas" contains only one clause with the noun phrase "YPF of Argentina" and the verb phrase "exports natural gas" with the governing verb "exports." In FIG. 20B, row 2020, the enhanced data representation thus includes the "country" entity tag type associated with the value "Argentina" in relation to the governing verb "exports." In row 2021, the enhanced data representation also includes the "organization" entity tag type associated with the value "YPF" in relation to the governing verb "exports." Other entity tag types can be similarly handled. Also, similar to FIG. 20A, the entity names appear as "subjects" even though this information may be deemed superfluous.

The enhanced data representation shown in FIGS. 20, 20A, or 20B is indexed and stored to support the syntactic search functionality of the SQE. The original sentence "YPF of Argentina exports natural gas," will be returned by the SQE as a query result in response to any submitted query that can be similarly represented. For example, "What countries export gas?," "Does Argentina import gas?," and "Is Argentina an importer or exporter of gas?" will all cause the SQE to return to the represented sentence as a result. In addition, when shallow parsing is used, a query that can be reduced to an entity named "Argentina" having a "country" entity tag type or a search for any entity having a "country" entity tag type (assuming all the other specified operands are matched) will result in returning this sentence as a part of the query result.

The structure shown in FIG. 20B is particularly efficient for processing advanced searches such as those shown in FIGS. 10-14 where a subject or object (in either order) is associated with a single verb selected by a user. In that case, representing each sentence clause by its governing verb and (noun) entity tags provides a quicker response to the query. So, for example, an Advanced Search with "Bill Clinton" as the subject and "visits" as the governing verb will quickly return all articles where Bill Clinton has visited or will visit some unspecified entity, such as a location. Or, for example, if a user is interested in any interaction Bill Clinton may have had with any country, then, by specifying the entity tag type "country" as a restriction on the object having an unknown value" and by specifying the subject as the value "Bill Clinton," all sentences which contain any governing verb that links Bill Clinton with any concept that has been tagged as a "country" are returned in a query result. In a similar fashion, it becomes very efficient to find all articles that relate to a "phosphorylated" protein, or a particular chemical used in a specified fashion. In general, the search operators, for example operators (6) and (7) that use entity tags to specify a subject and object entity in combination with a verb (specified or not) are readily evaluated using the structure of FIG. 20B. The query "what <person type> visited what other <person type>" reflects such an operator.

Similarly, the structure of FIG. 20A, which only represents the data set objects using entity tags, is very efficient for both indexing a very large data set quickly and using less storage space and for finding quick "summary" answers to directed questions. For example, queries that can be composed using the search operators that offer the ability to specify known and unknown entities potentially restricted, however, by their entity tag types, are easily matched when the data set is only indexed by entity tags. For example, search operators (1) and (2) which retrieve data objects that involve a third entity (of a specific entity tag type or not) relating two other entities are readily evaluated by look at all sentences that have at least three entities (entity tag type fields non-empty), where, two of the entities match the specified entities (as subject or object) and, in the case of operator (2), one of the entities is of the specified entity tag type. This operator is reflected, for example, in the query "what entities (e.g., institutions, organizations, locations, etc.) are involved with Bill Clinton and James Baker?" Sentences that relate Bill Clinton and James Baker through, for example, treaties, people, locations, etc. would match this query. For example, "James Baker and Bill Clinton had many talks about NAFTA." Or, for variations on these operators that do not specify any specific entities for the subject or object, the sentence "James Baker and Brian Mulroney met in Ottawa" would match. Other search operators are also evaluated similarly and matched using only stored entities and entity tag types.

One skilled in the art will note that the data set could be parsed and indexed using deep parsing (thus, resulting in an enhanced data representation more similar to FIG. 20) and still support queries that are entity-tag based only. The other information in the enhanced data representation such as governing verb or what entity is the subject and which entity is the object are simply ignored by the Query Builder when determining a match.

The Syntactic Query Engine performs two functions to accomplish effective syntactic query processing. The first is the parsing, indexing, and storage of a data set. The second is the parsing and subsequent execution of natural language queries. These two functions are outlined below with reference to FIGS. 21 and 22.

Figure 21:
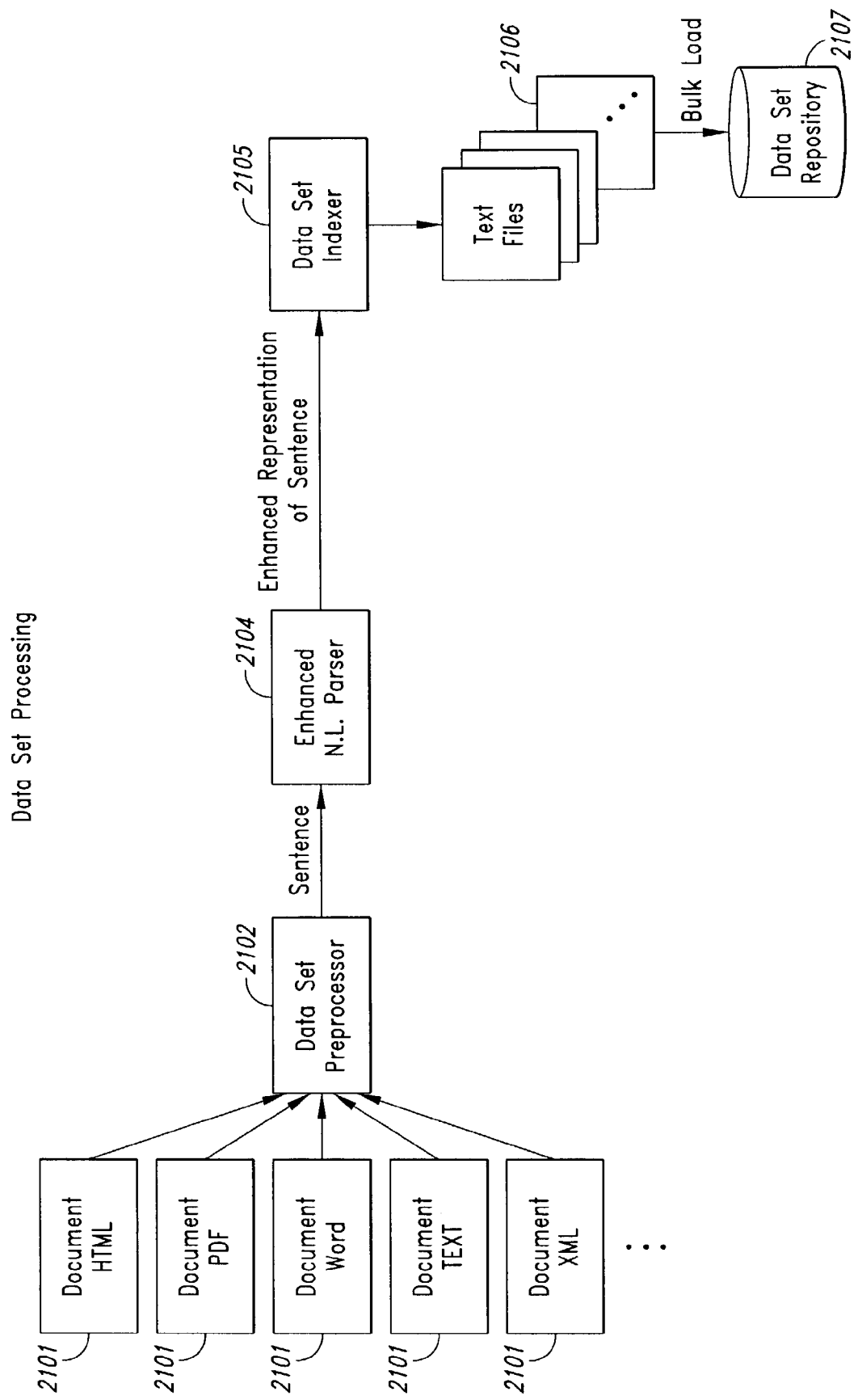
FIG. 21 is an example block diagram of data set processing performed by a Syntactic Query Engine.

FIG. 21 is an example block diagram of data set processing performed by a Syntactic Query Engine. As an example, documents that make up a data set 2101 are submitted to the Data Set Preprocessor 2102 (e.g., component 1603 in FIG. 16). If the data set comprises multiple files, as shown in FIG. 21, the Data Set Preprocessor 2102 creates one tagged file containing the document set. The Data Set Preprocessor 2102 then dissects that file into individual sentences and sends each sentence to the ENLP 2104 (e.g., component 1604 in FIG. 16). After the ENLP 2104 parses each received sentence, it sends the generated enhanced data representation of each sentence to the Data Set Indexer 2105 (e.g., component 1607 in FIG. 16). The Data Set Indexer 2105 processes and formats the ENLP output, distributing the data to formatted text files. The text files are typically bulk loaded into the data set repository 2107 (e.g., component 1608 in FIG. 16). One skilled in the art will recognize that other methods of data set preprocessing, indexing, and storing may be implemented in place of the methods described herein, and that such modifications are contemplated by the methods and systems of the present invention. For example, the Data Set Indexer may insert data directly into the data set repository instead of generating text files to be bulk loaded. Also, intermediate representation steps of the enhanced data representation as output parameters may be eliminated if the Data Set Indexer 2105 is so programmed to take and enhanced data representation and issue data base commands to index and store the data.

Figure 22:
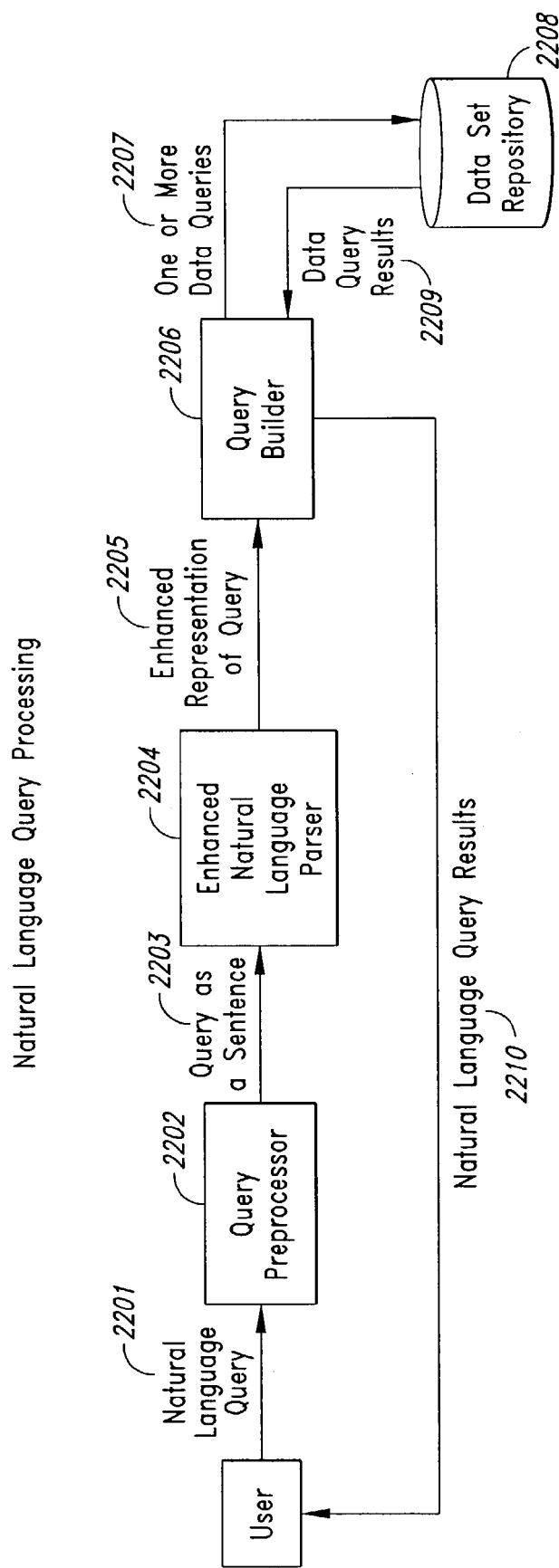
FIG. 22 is an example block diagram of natural language query processing performed by a Syntactic Query Engine.

After indexing and storing a data set, the SQE may perform its second function, processing natural language queries against the stored data set. FIG. 22 is an example block diagram of natural language query processing performed by a Syntactic Query Engine. As an example, a natural language query 2201 is submitted to the Query Preprocessor 2202 of the SQE. The Query Preprocessor 2202 (e.g., component 1610 in FIG. 16) prepares the natural language query for parsing. The preprocessing step may comprise several functions, examples of which may be spell checking, text case verification and/or alteration, and excessive white-space reduction. The specific preprocessing steps performed by the Query Preprocessor 2202 are typically based on the format requirements of the natural language parser component of the ENLP. The SQE sends the preprocessed query to the ENLP 2204 (e.g., component 1604 in FIG. 16). The ENLP parses the query, generating an enhanced data representation of the query 2205, which is sent to the Query Builder 2206 (e.g., component 1611 in FIG. 16). This enhanced data representation identifies grammatical roles of and relationships between terms in the query. Using the enhanced data representation 2205, the Query Builder 2206 generates one or more data queries 2207 and executes them against the data set repository 2208. The data query results 2209 are returned to the Query Builder to be returned to the user as natural language query results 2210.

The process steps shown in FIG. 22 illustrate a typical path when a natural language query is posed, for example, in an input text field. One skilled in the art will recognize that alternative interfaces, such as those which involve search operators where a user specifies an entity (or entity tag type) associated with a grammatical role (explicitly or implicitly) may bypass one or more processing steps. For example, using the Advanced Search type of user interface (see FIGS. 10-15) the syntactic parsing of the parser is not needed when the parts-of-speech, grammatical roles, and/or entity tag types are already known.

Figure 23:
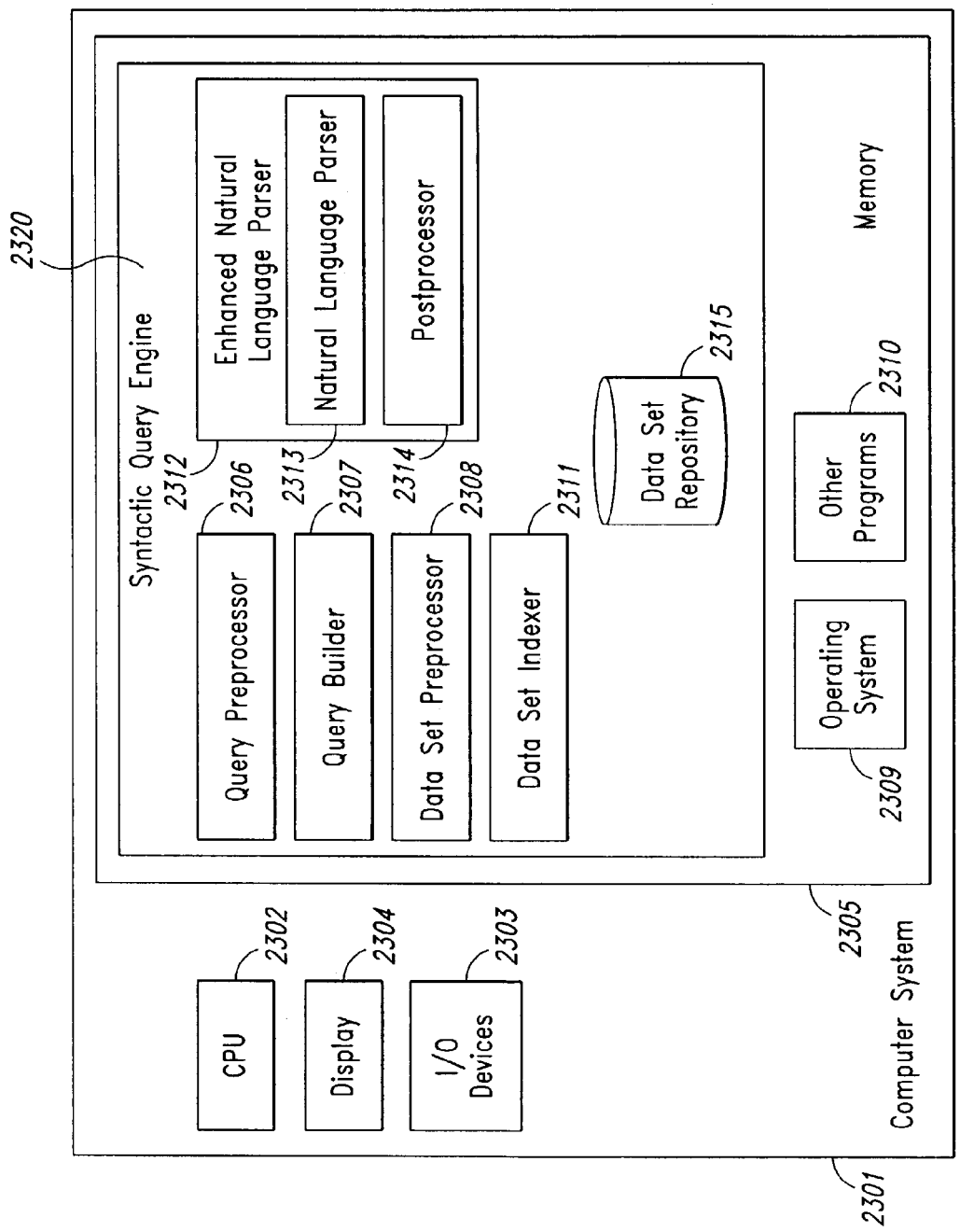
FIG. 23 is an example block diagram of a general purpose computer system for practicing embodiments of a Syntactic Query Engine.

FIG. 23 is an example block diagram of a general purpose computer system for practicing embodiments of a Syntactic Query Engine. The computer system 2301 contains a central processing unit (CPU) 2302, Input/Output devices 2303, a display device 2304, and a computer memory (memory) 2305. The Syntactic Query Engine 2320 including the Query Preprocessor 2306, Query Builder 2307, Data Set Preprocessor 2308, Data Set Indexer 2311, Enhanced Natural Language Parser 2312, and data set repository 2315, preferably resides in memory 2305, with the operating system 2309 and other programs 2310 and executes on CPU 2302. One skilled in the art will recognize that the SQE may be implemented using various configurations. For example, the data set repository may be implemented as one or more data repositories stored on one or more local or remote data storage devices. Furthermore, the various components comprising the SQE may be distributed across one or more computer systems including handheld devices, for example, cell phones or PDAs. Additionally, the components of the SQE may be combined differently in one or more different modules. The SQE may also be implemented across a network, for example, the Internet or may be embedded in another device.

Figure 24:
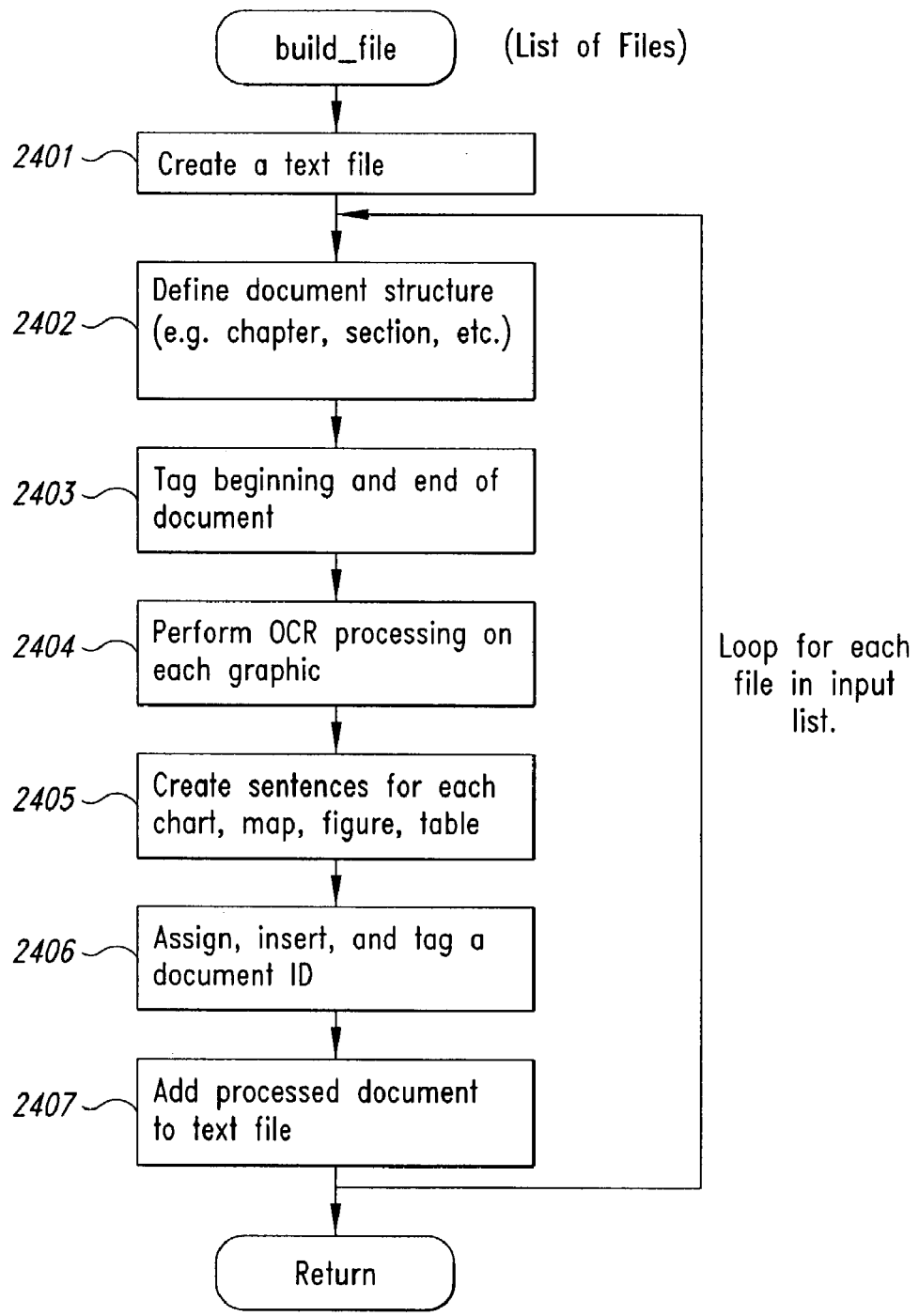
FIG. 24 is an example flow diagram of the steps performed by a build_file routine within the Data Set Preprocessor component of a Syntactic Query Engine.
Figure 25:
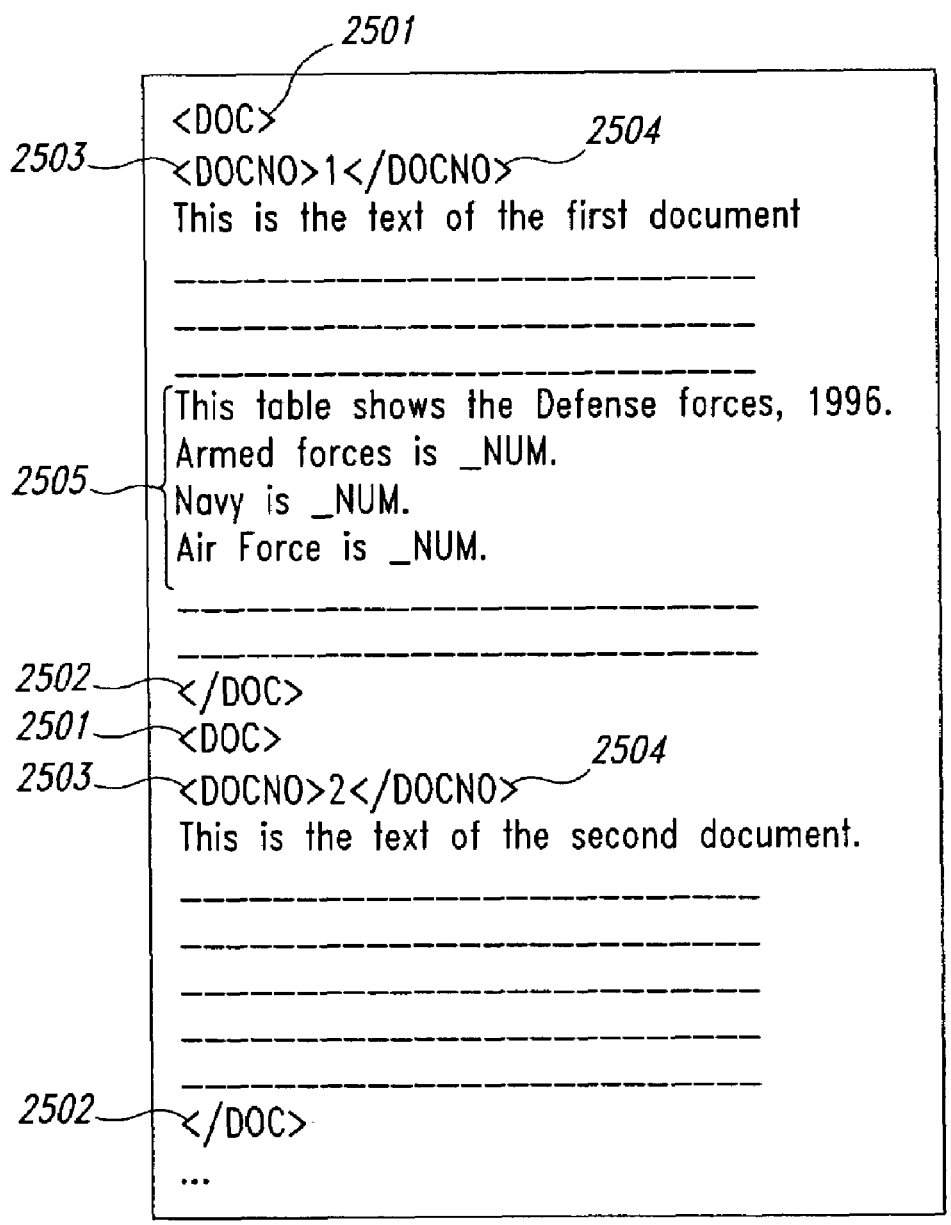
FIG. 25 illustrates an example format of a tagged file built by the build_file routine of the Data Set Preprocessor component of a Syntactic Query Engine.
Figure 26:
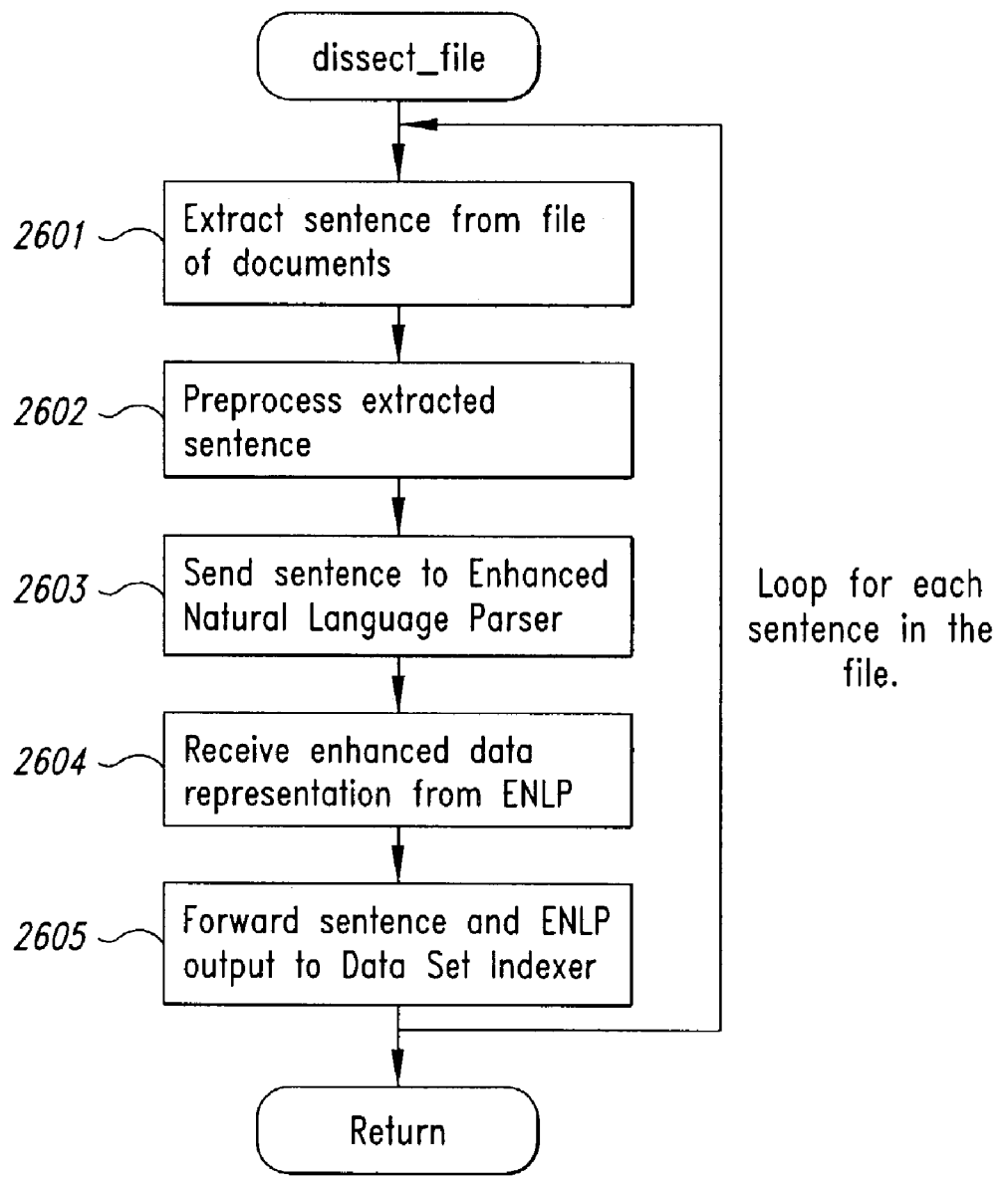
FIG. 26 is an example flow diagram of the steps performed by the dissect_file routine of the Data Set Preprocessor component of a Syntactic Query Engine.

As described with reference to FIG. 21, the Data Set Preprocessor 2102 performs two overall functions—building one or more tagged files from the received data set files and dissecting the data set into individual objects, for example, sentences. These functions are described in detail below with respect to FIGS. 24-26. Although FIGS. 24-26 present a particular ordering of steps and are oriented to a data set of objects comprising documents and queries comprising sentences, one skilled in the art will recognize that these flow diagrams, as well as all others described herein, are examples of one embodiment. Other sequences, orderings and groupings of steps, and other steps that achieve similar functions, are equivalent to and contemplated by the methods and systems of the present invention. These include steps and ordering modifications oriented toward non-textual objects in a data set, such as audio or video objects.

FIG. 24 is an example flow diagram of the steps performed by a build_file routine within the Data Set Preprocessor component of a Syntactic Query Engine. The build_file routine generates text for any non-textual entities within the dataset, identifies document structures (e.g., chapters or sections in a book), and generates one or more tagged files for the data set. In one embodiment, the build_file routine generates one tagged file containing the entire data set. In alternate embodiments, multiple files may be generated, for example, one file for each object (e.g., document) in the data set. In step 2401, the build_file routine creates a text file. In step 2402, the build_file routine determines the structure of the individual elements that make up the data set. This structure can be previously determined, for example, by a system administrator and indicated within the data set using, for example, HTML tags. For example, if the data set is a book, the defined structure may identify each section or chapter of the book. These HTML tags can be used to define document level attributes for each document in the data set. In step 2403, the build_file routine tags the beginning and end of each document (or section, as defined by the structure of the data set). In step 2404, the routine performs OCR processing on any images so that it can create searchable text (lexical units) associated with each image. In step 2405, the build_file routine creates one or more sentences for each chart, map, figure, table, or other non-textual entity. For example, for a map of China, the routine may insert a sentence of the form, This is a map of China.

In step 2406, the build_file routine generates an object identifier (e.g., (a Document ID) and inserts a tag with the generated identifier. In step 2407, the build_file routine writes the processed document to the created text file. Steps 2402 through 2407 are repeated for each file that is submitted as part of the data set. When there are no more files to process, the build_file routine returns.

FIG. 25 illustrates an example format of a tagged file built by the build_file routine of the Data Set Preprocessor component of a Syntactic Query Engine. The beginning and end of each document in the file is marked, respectively, with a <DOC> tag 2501 and a </DOC> tag 2502. The build_file routine generates a Document ID for each document in the file. The Document ID is marked by and between a <DOCNO> tag 2503 and a </DOCNO> tag 2504. Table section 2505 shows example sentences created by the build_file routine to represent lexical units for a table embedded within the document. The first sentence for Table 2505, This table shows the Defense forces, 1996, is generated from the title of the actual table in the document. The remaining sentences shown in Table 2505, are generated from the rows in the actual table in the document. Appendix B, which is incorporated by reference in its entirety, is a portion of a sample file created by the build_file routine. One skilled in the art will recognize that various processes and techniques may be used to identify documents within the data set and to identify entities (e.g., tables) within each document. The use of equivalent and/or alternative processes and markup techniques and formats, including HTML, XML, and SGML and non-tagged techniques are contemplated and may be incorporated in methods and systems of the present invention.

The second function performed by the Data Set Preprocessor component of the SQE is dissecting the data set into individual objects (e.g., sentences) to be processed. FIG. 26 is an example flow diagram of the steps performed by the dissect_file routine of the Data Set Preprocessor component of a Syntactic Query Engine. In step 2601, the routine extracts a sentence from the tagged text file containing the data set. In step 2602, the dissect_file routine preprocesses the extracted sentence, preparing the sentence for parsing. The preprocessing step may comprise any functions necessary to prepare a sentence according to the requirements of the natural language parser component of the ENLP. These functions may include, for example, spell checking, removing excessive white space, removing extraneous punctuation, and/or converting terms to lowercase, uppercase, or proper case. One skilled in the art will recognize that any preprocessing performed to put a sentence into a form that is acceptable to the natural language parser can be used with techniques of the present invention. In step 2603, the routine sends the preprocessed sentence to the ENLP. In step 2604, the routine receives as output from the ENLP an enhanced data representation of the sentence. In step 2605, the dissect_file routine forwards the original sentence and the enhanced data representation to the Data Set Indexer for further processing. Steps 2601-2605 are repeated for each sentence in the file. When no more sentences remain, the dissect_file routine returns.

The Data Set Indexer (e.g., component 2105 in FIG. 21) prepares the enhanced data representations generated from the data set (e.g., the enhanced sentence representation illustrated in FIGS. 20, 20A, and 20B) to be stored in the data set repository. In one example embodiment, the Data Set Indexer initially stores the enhanced data representation data in generated text files before loading the enhanced data representations into the data set repository, for example, using a bulk loading function of the data set repository. One skilled in the art will recognize that any of a wide variety of well-known techniques may be implemented to load a data set (including loading the generated enhanced data representations directly) into the data set repository. For example, another technique for loading writes each record to the data set repository as a portion of the enhanced data representation (e.g., a row) is generated instead of writing the records to text files to be bulk loaded.

As described, the SQE uses the ENLP to parse data that is being stored and indexed, as well as to parse queries (e.g., natural language queries) that are submitted against a stored indexed data set. Similar to the preprocessing performed before parsing a data set, the SQE performs preprocessing on submitted queries.

Figure 27:
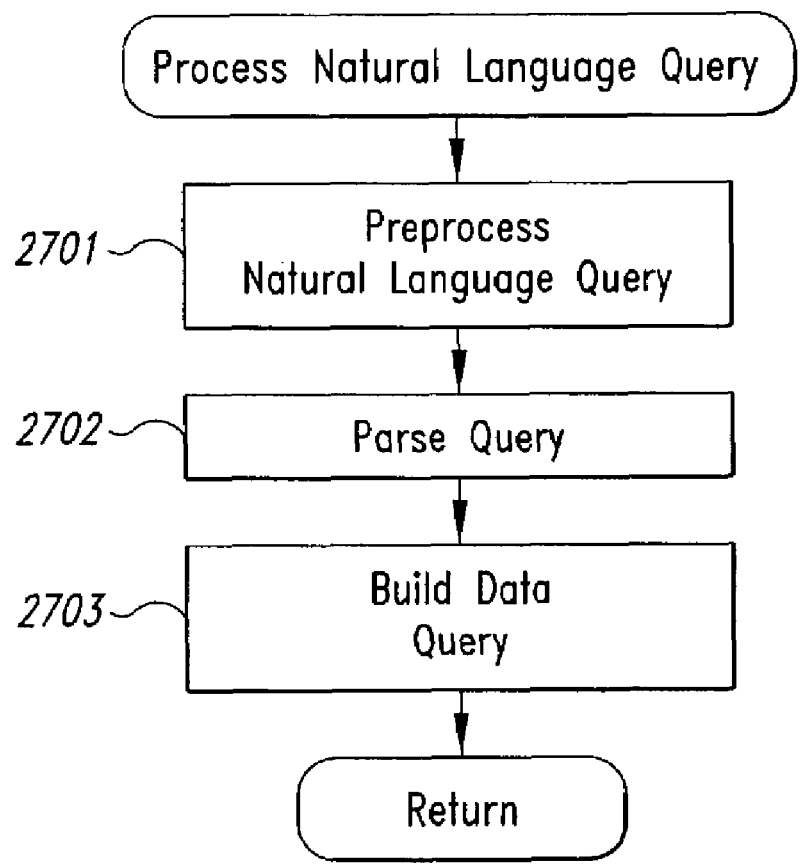
FIG. 27 is an example flow diagram of the steps performed by a Syntactic Query Engine to process a natural language query.

FIG. 27 is an example flow diagram of the steps performed by a Syntactic Query Engine to process a natural language query. In step 2701, the Query Preprocessor prepares the natural language query for the ENLP. In step 2702, the ENLP parses the preprocessed natural language query and generates an enhanced data representation of the query. In step 2703, the Query Builder, generates and executes data queries (e.g., SQL statements) based on the ENLP output (the enhanced data representation). One skilled in the art will recognize that, for processing operators with specific operands (such as through the Advanced Search dialogs), the user interface handler generates the equivalent of the ENLP output to forward onto the Query Builder.

Figure 28:
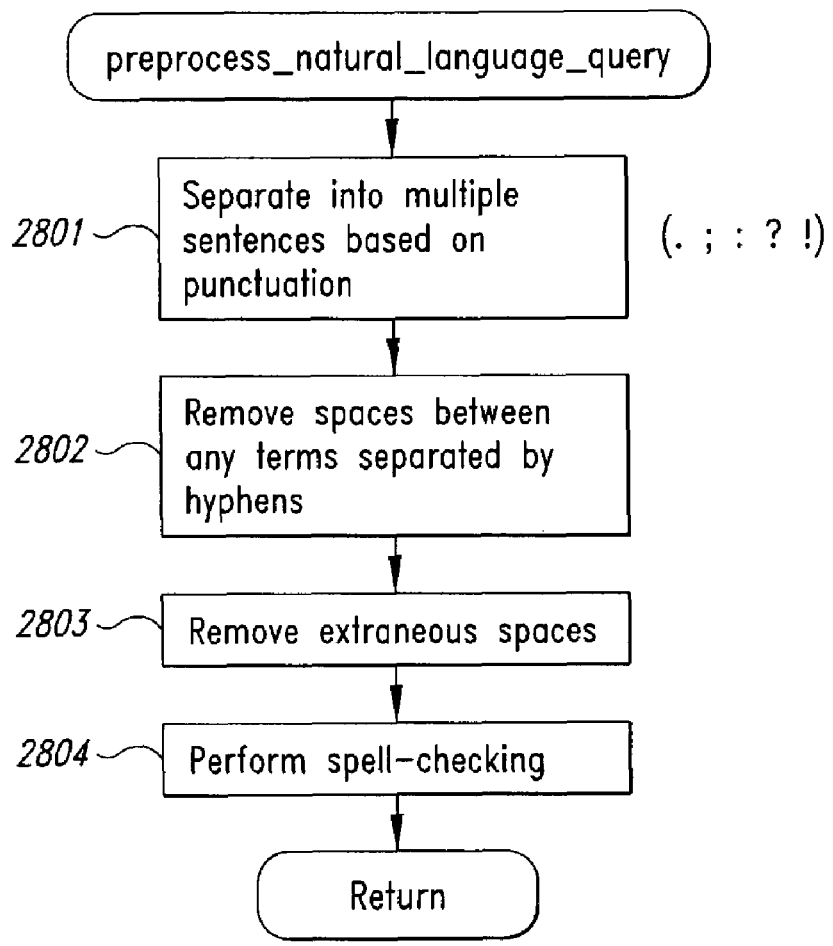
FIG. 28 is an example flow diagram of the steps performed by a preprocess_natural_language_query routine of the Query Preprocessor component of a Syntactic Query Engine.

FIG. 28 is an example flow diagram of the steps performed by a preprocess_natural_language_query routine of the Query Preprocessor component of a Syntactic Query Engine. This routine preprocesses the query according to the requirements of the ENLP. Although described with respect to certain modifications to the query, one skilled in the art will recognize that many other preprocessing steps are possible, yield equivalent results, and are contemplated by the methods and systems of the present invention. In step 2801, the routine separates the query into multiple sentences if necessary, based on punctuation (e.g., ";", ":", "?", "!" and "." where the "." is not part of an abbreviation). In step 2802, the routine removes spaces between any terms that are separated by hyphens. For example, "seventeen-year-old" is converted to "seventeen-year-old". In step 2803, the routine removes extraneous spaces from the query, leaving the words separated by one space. In step 2804, the routine spell-checks the routine. In one embodiment, the routine automatically corrects any detected spelling errors. In another embodiment, the routine requests an indication of whether and how each spelling error is to be corrected.

The enhanced data representations describe one or more ways in which the meaningful terms of an object (e.g., a sentence) may be related. (See description with reference to FIGS. 20, 20A, and 20B.) As described earlier, enhanced data representations of the data in the data set are stored in the data set repository, and enhanced data representations are used to generate data queries when the SQE processes a natural language query. The enhanced data representations describe the relationships between meaningful terms within each sentence, as determined by the ENLP or other components of the SQE. Each meaningful term may be associated with one or more syntactic or grammatical roles or entity tag types. Role redundancy for syntactic parsing is not discouraged, because it may yield additional results. For example, a term may be part of two described relationships that are associated with different grammatical roles, e.g., a term may appear as both an "object" and a "noun modifier." The relationships that are selected and represented are heuristically determined as those relationships that will tend to generate additional relevant results. A current embodiment uses the specific relationships described in FIG. 20 and shown as stored in the data repository in FIG. 29 and described by FIGS. 31-36. However, one skilled in the art will recognize that other relationships and grammatical roles may be described in the enhanced data representation, and the determination of these roles and relationships relates to the types of objects in the data set.

In addition, an enhanced data representation that is constructed to represent a natural language query (as a phrase, sentence, input fields or otherwise) may incorporate entity tag relationships that are implied by the query. In a current embodiment, several triggers are recognized in the query as implying the presence of entity tag types for a search:

| Query Trigger | Entity Tag Type |
| --- | --- |
| Who . . . ? | "person" or "organization" |
| When . . . ? | "date" |
| What <entity tag type> . . . ? | <entity tag type> |
| Which <entity tag type> . . . ? | <entity tag type> |
| How much . . . ? | "money_amount" |
| How many . . . ? | "quantity" |
| Where . . . ? | <geographical location tag types> |

One skilled in the art will recognize that the recognized set of query triggers can be modified and is typically related to the list of default entity tag types supported by the implementation. Currently, there are forty-one different entity tag types supported by the particular parser used in one embodiment; however, one skilled in the art will recognize that the number is dependent upon the capabilities of the parser or is unlimited if entity tag logic is provided by the SQE postprocessor. Examples of currently supported entity tag types include: person, organization, location, country, city, date, quantity, money_amount, gene_name, stock_symbol, title, address, phone number, pharmaceutical_name, and many others.

Figure 29:
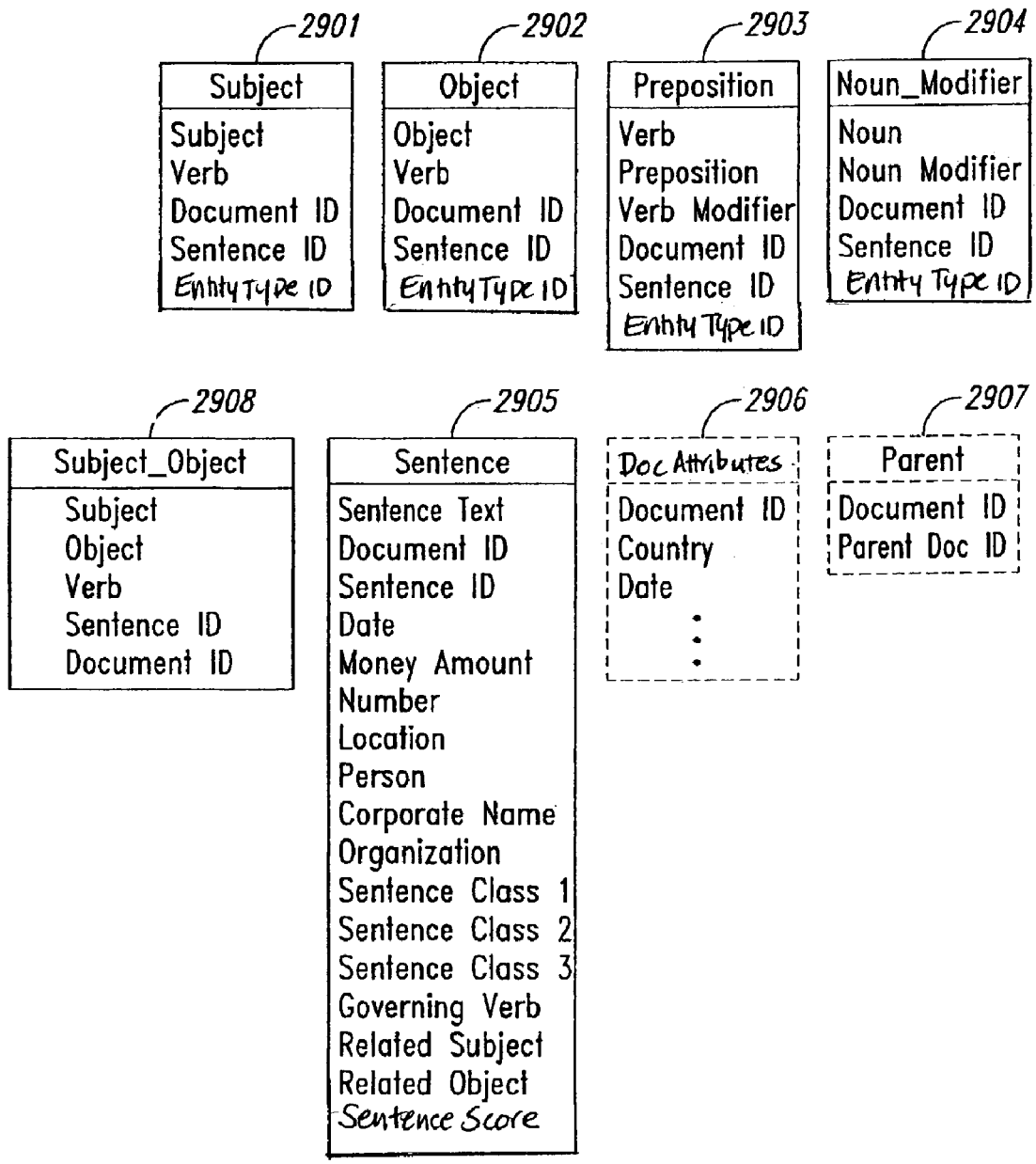
FIG. 29 is an example block diagram showing the structure of an example Data Set Repository of a Syntactic Query Engine.

FIG. 29 is an example block diagram showing the structure of an example Data Set Repository of a Syntactic Query Engine. The set of stored tables represent the roles and relationships between the determined meaningful terms for each parsed sentence of each document in the data set, as determined by the ENLP, and correspond to the enhanced data representations generated. The fields shown in these tables assume that deep parsing is being performed by the ENLP. The Subject Table 2901 stores one record for each determined subject/verb combination in each parsed sentence in each document. The Object Table 2902 stores each determined object/verb combination for each parsed sentence in each document. The Subject_Object table stores each identified subject/verb/object combination for each parsed sentence. In an alternate embodiment, the Subject_Object table is implemented as a view that is a dynamically maintained join between the subject and object tables, joined on the verb, Document ID, and Sentence ID fields. The Preposition table 2903 stores each verb/preposition/verb modifier combination for each parsed sentence in each document. The Noun_Modifier table 2904 stores each noun/noun modifier combination in each parsed sentence in each document. A noun modifier may be a noun, a noun phrase, or an adjective. The Sentence table 2905 stores the actual text for each sentence in each document. In addition, the Sentence table 2905 stores the Governing Verb, Related Subject, and Related Object of each sentence, as identified by the postprocessor component of the ENLP. The governing verb is the main verb in a sentence. The related subject and related object are the subject and object, respectively, related to the governing verb. For example, in the sentence The girl walks the dog.

"walks" is the governing verb, "girl" is the related subject, and "dog" is the related object. These fields may be left blank if the postprocessor is unable to determine the governing verb, related subject, or related object. In sentences with multiple clauses, each clause is represented in the Sentence table 2905. The Date, Money Amount, Number, Location, Person, Corporate Name, and Organization fields of the Sentence table 2905 store binary indicators of whether or not the sentence contains a term that the SQE recognizes as associated with an entity tag type indicated by the field name. In one embodiment these fields contain binary indicators of whether the particular entity tag type is present somewhere in the sentence (or clause). In another embodiment, these fields contain a count of the number of times the particular entity tag type is present somewhere in the sentence (or clause). The Sentence Table 2905 also contains "Sentence Class" information when applicable, which can be used to indicate certain relationships provided by the sentence. For example, the presence of the preposition "because" may be used to encode that the sentence specifies a causal relationship; similarly the presence of the adverb "when" may be used to encode that the sentence specifies a condition relationship. This information can then be used when the SQE encounters certain types of query triggers to determine how well a sentence matches a query. For example, a query trigger such as "Why . . . ?" may cause the SQE to search for (or rate higher) sentence results that indicate a causal relationship. The Document Attributes table 2906 is an optional table in the data repository that stores the values of specific data types potentially found within each document of the data set—it is preferably shared by each sentence within the document. As described above, document level attributes are settable parameters and may include, for example, names of countries, states, or regions, document sections, and publication dates. As described with respect to FIG. 15, these object attributes may be used by the SQE to filter data query results or may be used implicitly during a search to act as an entity tag for a sentence. The optional Parent table 2907 is used to indicate a hierarchical structure of objects in the data set. This allows a section, subsection, chapter, or other document portion to be identified by the Data Set Indexer component of a Syntactic Query Engine as a "document," while storing the relationships between multiple documents or document portions in a hierarchical fashion.

Figure 29A:
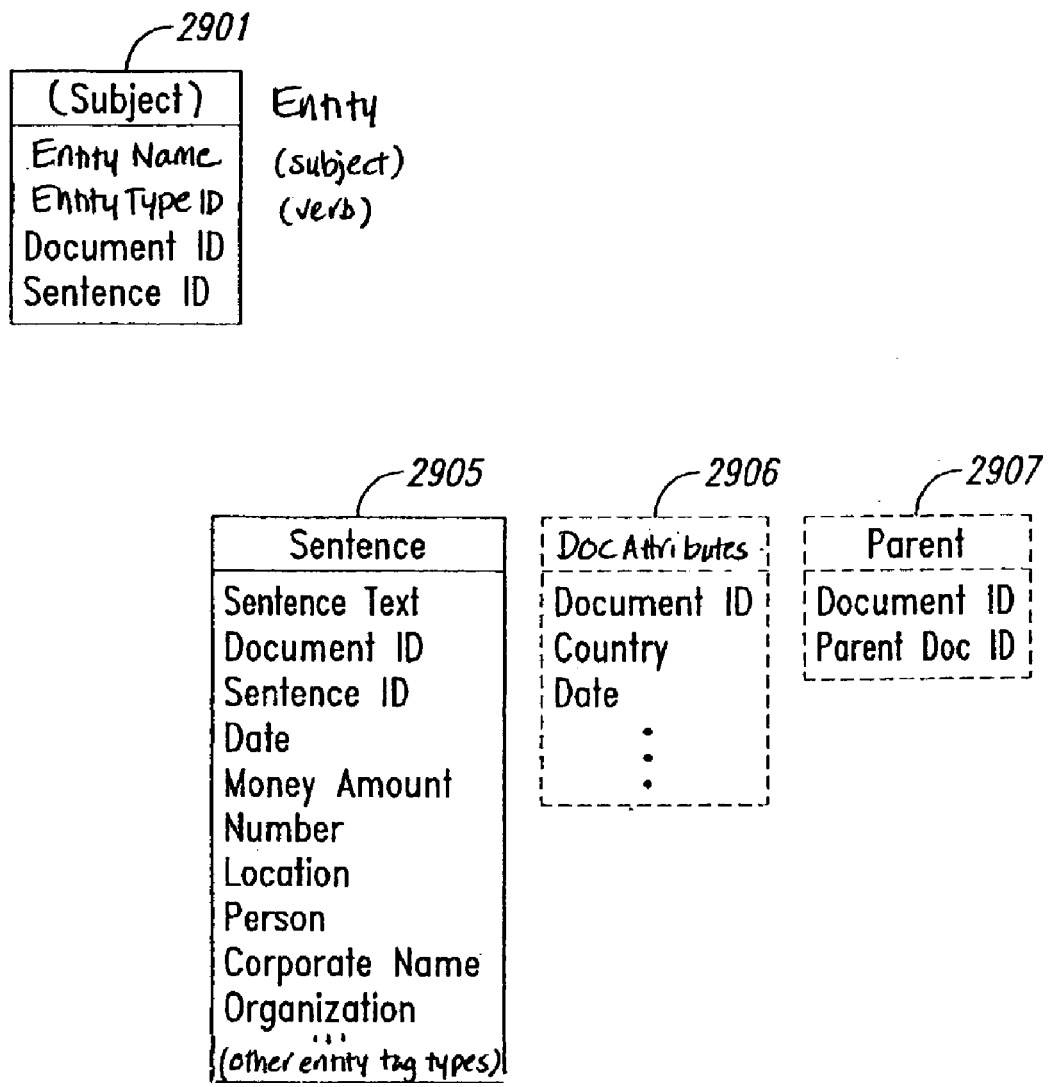
FIG. 29A is an example block diagram showing the structure of an example Data Set Repository of a Syntactic Query Engine used with shallow parsing techniques.

FIG. 29A is an example block diagram showing the structure of an example Data Set Repository of a Syntactic Query Engine used with shallow parsing techniques. The set of stored tables represent the relationships between the determined meaningful terms that are entities (are associated with one or more entity tag types) for each parsed sentence of each document in the data set, as determined by the ENLP, and correspond to the enhanced data representations generated. The fields shown in these tables assume that shallow parsing is being performed by the ENLP, and thus most of the tables are ignored. The Subject Table 2901 is substituted as an Entity Table stores one record for each determined entity in each parsed sentence in each document. In this case an entity name is a noun and the entity type ID is an identifier that indicates an entity tag type. For ease of abstraction, the entity tag type information associated with the entity is shown residing in the table. One skilled in the art will appreciate that there are many ways to store and indicate such information, including directly storing the descriptive name of an entity tag type in a field, to indirectly referencing such information through another table.

Figure 30:
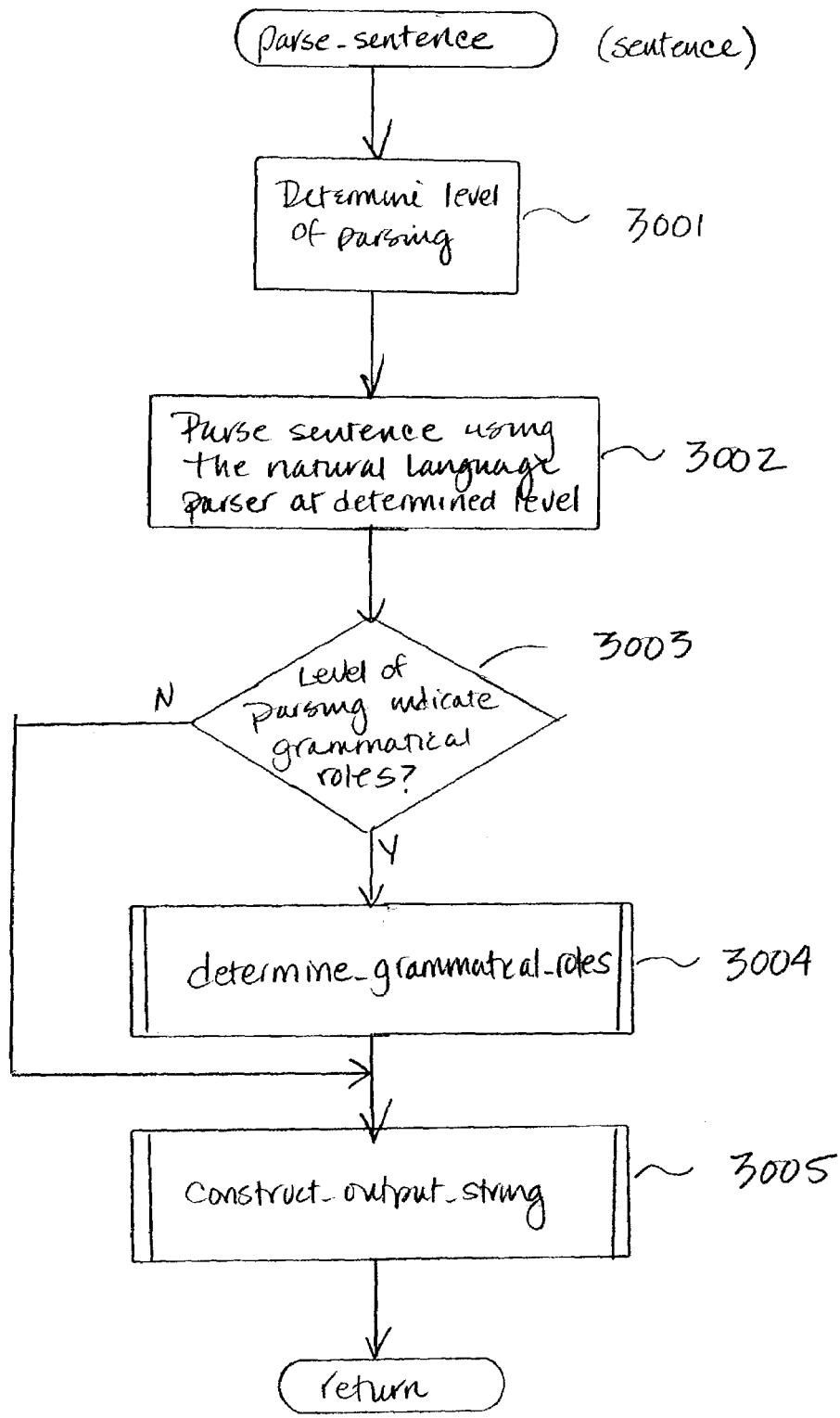
FIG. 30 is an example flow diagram of the steps performed by a parse_sentence routine of the Enhanced Natural Language Parser component of a Syntactic Query Engine.

FIG. 30 is an example flow diagram of the steps performed by a parse_sentence routine of the Enhanced Natural Language Parser component of a Syntactic Query Engine. In summary, the routine parses the designated sentence or phrase, identifies the grammatical roles of terms within the sentence and any associated entity tags if not performed by the parser, generates an enhanced data representation of the sentence, and constructs an output string. In step 3001, the routine determines the level of parsing (when it can be designated) and informs the natural language processor as needed. In step 3002, the natural language parser component of the ENLP parses the preprocessed sentence. In step 3003, the parse_sentence routine determines whether the level of parsing indicates that grammatical roles are to be determined and tagged, and, if so, continues in step 3004, else continues in step 3005. In step 3004, the parse_sentence routine calls the determine_grammatical_roles subroutine (discussed in detail with reference to FIG. 31) to determine the grammatical roles of and relationships between terms within the sentence. In step 3005, the routine calls the construct output_string routine (discussed in detail with reference to FIG. 37) to format the generated enhanced data representation for further processing.

Figure 31:
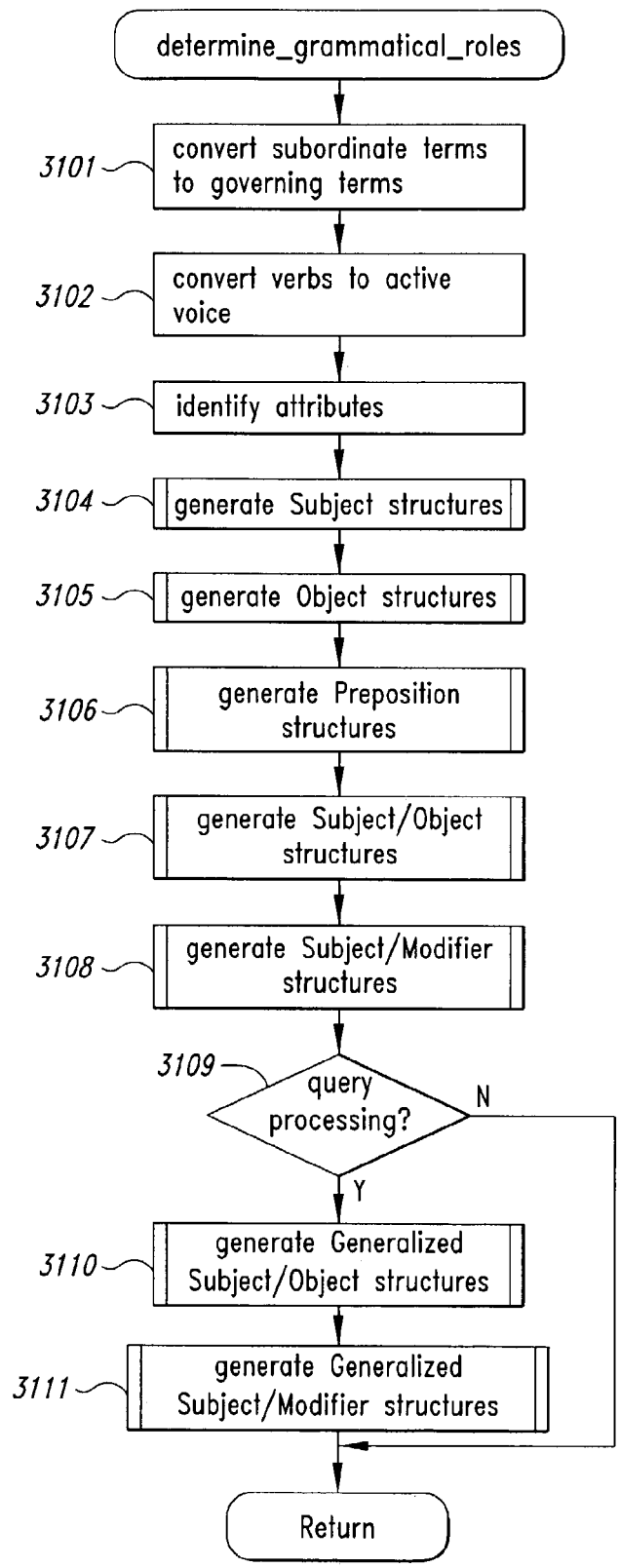
FIG. 31 is an example flow diagram of the steps performed by a determine_grammatical_roles subroutine within the parse_sentence routine of the Enhanced Natural Language Parser.

FIG. 31 is an example flow diagram of the steps performed by a determine_grammatical_roles subroutine within the parse_sentence routine of the Enhanced Natural Language Parser. In summary, the routine converts terms, as appropriate, to a standard form (e.g., converting all verbs to active voice), determines the grammatical roles of meaningful terms in the sentence, and initiates the generation of an enhanced data representation. In step 3101, the routine converts each word that is identified as a subordinate term to an associated governing term. Subordinate terms and governing terms are terms that are related in some way, similar to multiple tenses of a verb. For example, the governing term "Ireland" is associated with subordinate terms "Irish," "irish," "Irishman," "irishman," "Irishwoman," "irishwoman," and "ireland." Converting subordinate terms to an associated governing term ensures that a standard set of terms is used to represent data, for example relating multiple terms to a country, as shown in the example above, thus increasing potential contextual matches. Subordinate terms that are identified as occurring within a noun phrase, for example, "Korean," occurring with the noun phrase "Korean War," are not converted to the associated governing term to preserve the specific meaning of the noun phrase. For example, "Korean War" has a specific meaning that is not conveyed by the terms "Korea" and "war" independently. Appendix C, which is herein incorporated by reference in its entirety, is an example list of subordinate terms and their associated governing terms for an example SQE. Typically, this information is stored by the SQE as a configurable list that is related to the data set, preferably initialized when the SQE is installed, for example by a system administrator.

In step 3102, the determine_grammatical_roles routine converts the verbs within the sentence to active voice. This ensures that the SQE will identify data within the data set in response to queries regardless of verb tense. (See the example described with reference to FIG. 1.) In step 3103, the routine identifies attribute values, which can later be used to filter search results. Steps 3104-3111 are described with reference to an example query, Does Argentina import or export natural gas from the south of (Q) Patagonia?

Figure 36A:
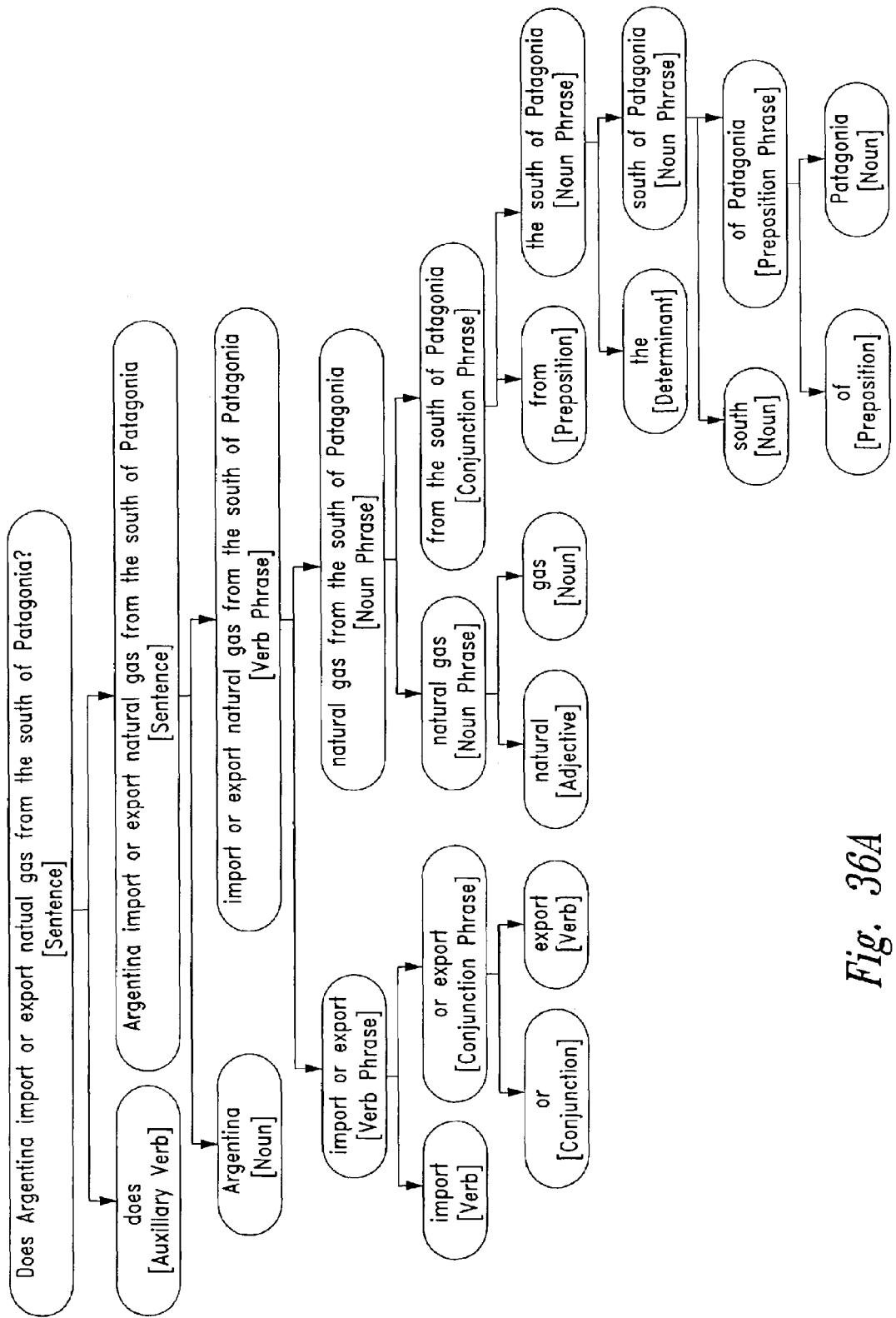
FIG. 36A is a graphical representation of an example parse tree generated by a natural language parser component of an Enhanced Natural Language Parser.

FIG. 36A is a graphical representation of an example parse tree generated by a natural language parser component of an Enhanced Natural Language Parser. The example parse corresponds to this query. An enhanced data representation of the example query is shown in FIG. 36B. The example described assumes that deep parsing techniques are used.

In steps 3104-3111, the determine_grammatical_roles routine builds the data structures that correspond to the enhanced data representation. These data structures can be thought of as portions of the enhanced data representation shown in FIG. 36B or as how they are stored in the data repository. Specifically, in step 3104, the routine generates Subject data structures identifying terms that may be the subject of the sentence (similar to the Subject table described with reference to FIG. 29). For example, given query Q above, Table 1 shows the generated Subject structures.

TABLE 1

| Subject | Verb |
| --- | --- |
| Argentina | import |
| Argentina | export |

The steps performed in generating the Subject structures are described in detail with reference to FIG. 32. If the SQE is configured to index entity tags as well, then these are accordingly indicated in an entity tag type column (not shown). In step 3105, the routine generates Object data structures identifying terms that may be the object of the sentence (similar to the Object table described with reference to FIG. 29). For example, given query Q above, Table 2 shows the generated Object structures.

TABLE 2

| Verb | Object |
| --- | --- |
| import | gas |
| import | natural gas |
| export | gas |
| export | natural gas |

The steps performed in generating the Object structures are described in detail with reference to FIG. 33. If the SQE is configured to index entity tags as well, then these are accordingly indicated in an entity tag type column (not shown). In step 3106, the routine generates Preposition structures that are similar to the structure of the Preposition table described with reference to FIG. 29. For example, given query Q above, Table 3 shows the generated Preposition structures. If the SQE is configured to index entity tags as well, then these are accordingly indicated in an entity tag column (not shown) that may be associated with the Verb Modifier.

TABLE 3

| Verb | Preposition | Verb Modifier |
| --- | --- | --- |
| import | from | south |
| import | from | Patagonia |
| export | from | south |
| export | from | Patagonia |

In step 3107, the routine generates Subject/Object structures to represent the ways in which terms that are identified as potential subjects and objects of a sentence may be related. Each subject is paired with each object that is associated with the same verb. In addition, each subject is paired with each modifier in the Preposition structure that is associated with the same verb. For example, given query Q above, Table 4 shows the generated Subject/Object structures.

TABLE 4

| Subject | Object |
| --- | --- |
| Argentina | gas |
| Argentina | natural gas |
| Argentina | south |
| Argentina | Patagonia |

If the SQE is configured to index entity tags as well, then these are accordingly indicated in an entity tag columns that are associated with the respective subjects and objects (not shown). In step 3108, the routine generates Subject/Modifier structures to describe the relationships between related nouns, noun phrases, and adjectives. The generate_subject_ modifier routine is described in detail with reference to FIG. 34.

In step 3109, the routine determines whether or not the sentence being parsed is a query (as opposed to an object of a data set being parsed for storing and indexing). If the designated sentence or phrase is a query, the routine continues in step 3110, else it returns. In steps 3110 and 3111, the routine generates Generalized Subject/Object structures and Generalized Subject/Modifier structures. These structures may be used by the Query Builder to generate additional data repository queries to return results that may be contextually relevant to the submitted natural language query and purposefully take advantage of potential ambiguities in the query as specified.

The generate_generalized_subject_object routine is described in detail with reference to FIG. 35. The Generalized Subject/Modifier structures are generated from previously generated Subject/Object structures. The object is designated as the subject in the new Generalized Subject/Modifier structure, and the subject is designated as the modifier in the new Generalized Subject/Modifier structure.

Figure 32:
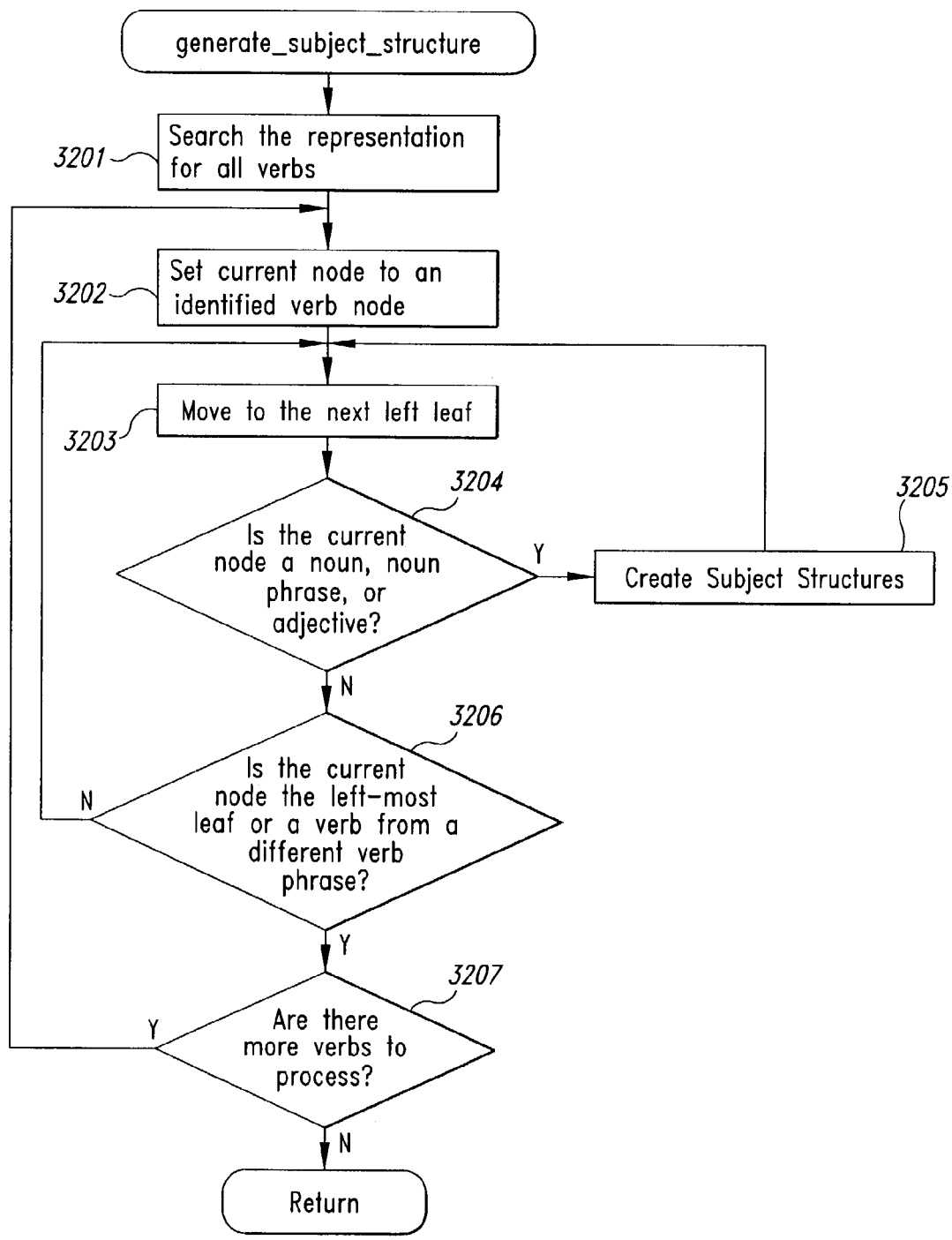
FIG. 32 is an example flow diagram of the steps performed by a generate_subject_structure subroutine of the determine_grammatical_roles routine.

FIG. 32 is an example flow diagram of the steps performed by a generate_subject_structure subroutine of the determine_ grammatical_roles routine. This routine identifies, for each verb in the sentence, each noun, noun phrase, or adjective that may be a subject associated with the designated verb and stores it in a Subject structure. In step 3201, the routine searches for all verbs in the syntactic data representation (e.g., a parse tree) generated by the natural language parser. In step 3202, the routine sets the current node to an identified verb. In steps 3203-3206, the routine loops searching for all terms that are potentially subjects related to the identified verb. Specifically, in step 3203, the routine moves toward the beginning of the sentence (e.g., to the next leaf to the left in the parse tree from the current node). In step 3204, the routine examines the node and determines whether or not it is a noun, a noun phrase, or an adjective. If the routine determines that the current node is a noun, a noun phrase, or an adjective, then it is identified as a subject and the routine continues in step 3205, else it continues in step 3206. In step 3205, the routine creates a Subject structure identifying the current node as the subject and the previously identified verb (the current verb) as the verb. Additionally, if the current node is a noun phrase, the routine creates a Subject structure identifying the tail of the noun phrase (e.g., "gas" of the noun phrase "natural gas") as a subject associated with the current verb. The routine then continues searching for additional subjects related to the current verb by looping back to step 3203. In step 3206, the routine examines the current node and determines whether or not it is the left-most leaf or a verb from a different verb phrase. If the current node is not the left-most leaf or a verb from a different verb phrase, the routine continues searching for additional subjects related to the current verb by returning to the beginning of the loop, in step 3203, else it continues in step 3207. In step 3207, the routine determines whether or not all of the identified verbs have been processed. If there are more verbs to process, the routine continues in step 3202 and begins another loop with the new verb as the current node, otherwise it returns.

Figure 33:
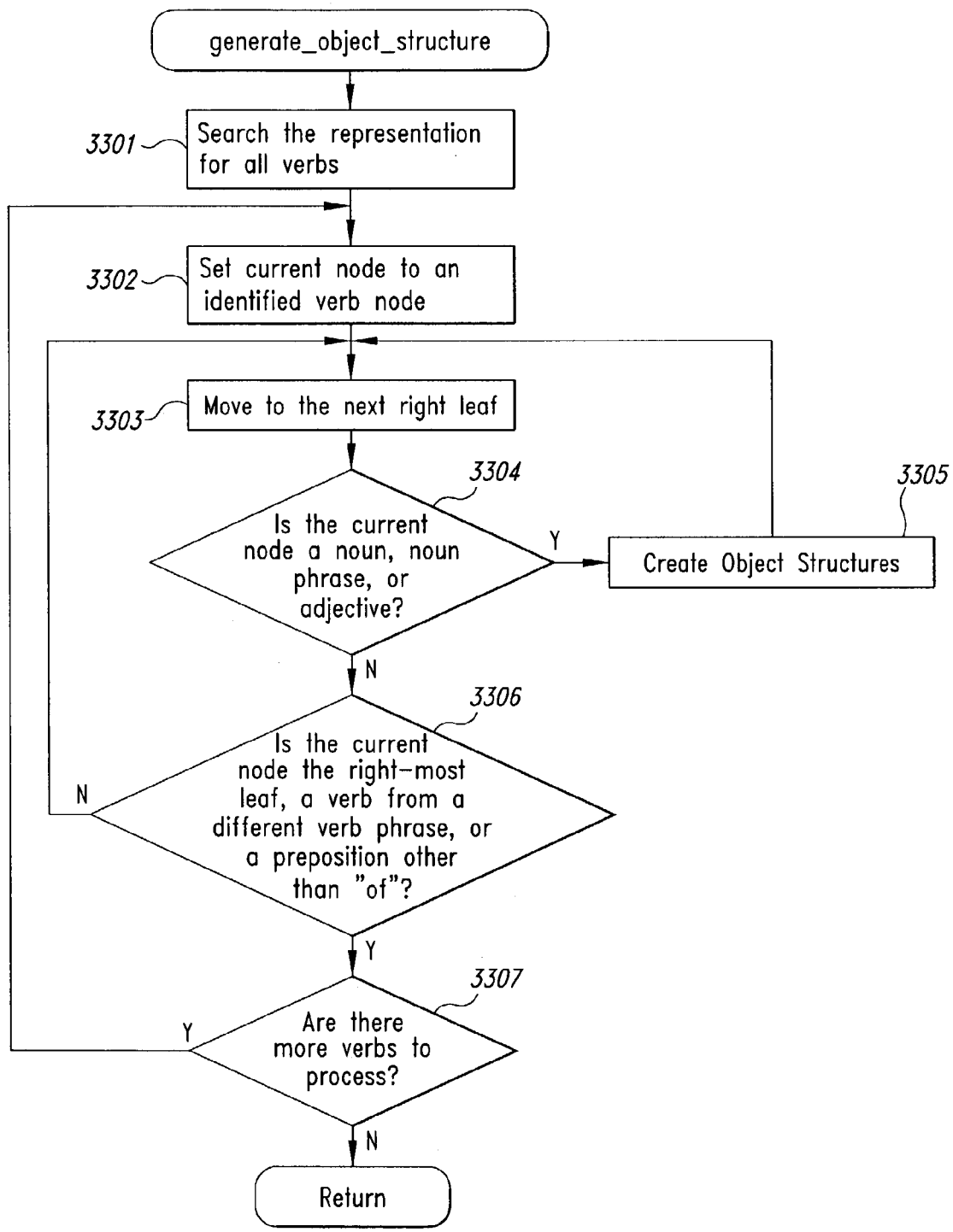
FIG. 33 is an example flow diagram of the steps performed by a generate_object_structure subroutine of the determine_grammatical_roles routine.

FIG. 33 is an example flow diagram of the steps performed by a generate_object_structure subroutine of the determine_ grammatical_roles routine. This routine identifies, for each verb in the sentence, each noun, noun phrase, or adjective that may be an object associated with the designated verb and stores it in an Object structure. In step 3301, the routine searches for all verbs in the syntactic data representation generated by the natural language parser. In step 3302, the routine sets the current node to an identified verb. In steps 3303-3306, the routine loops searching for all terms that are potentially objects related to the identified verb. Specifically, in step 3303, the routine moves toward the end of the sentence (e.g., to the next leaf to the right in the parse tree from the current node). In step 3304, the routine examines the node and determines whether or not it is a noun, a noun phrase, or an adjective. If the routine determines that the current node is a noun, a noun phrase, or an adjective, then it is identified as an object and the routine continues in step 3305, else it continues in step 3306. In step 3305, the routine creates an Object structure identifying the current node as the object and the previously identified verb (the current verb) as the verb. Additionally, if the current node is a noun phrase, the routine creates an Object structure identifying the tail of the noun phrase (e.g., "gas" of the noun phrase "natural gas") as the object associated with the current verb. The routine then continues searching for additional objects related to the current verb by looping back to step 3303. In step 3306, the routine examines the current node and determines whether or not it is the right-most leaf, a verb from a different verb phrase, or a preposition other than "of." If the current node is not the right-most leaf, a verb from a different verb phrase, or a preposition other than "of," the routine continues searching for additional objects related to the current verb by returning to the beginning of the loop in step 3303, else it continues in step 3307. In step 3307, the routine determines whether or not all of the identified verbs have been processed. If there are more verbs to process, then the routine continues in step 3302, and begins another loop with the new verb as the current node, otherwise it returns.

Figure 34:
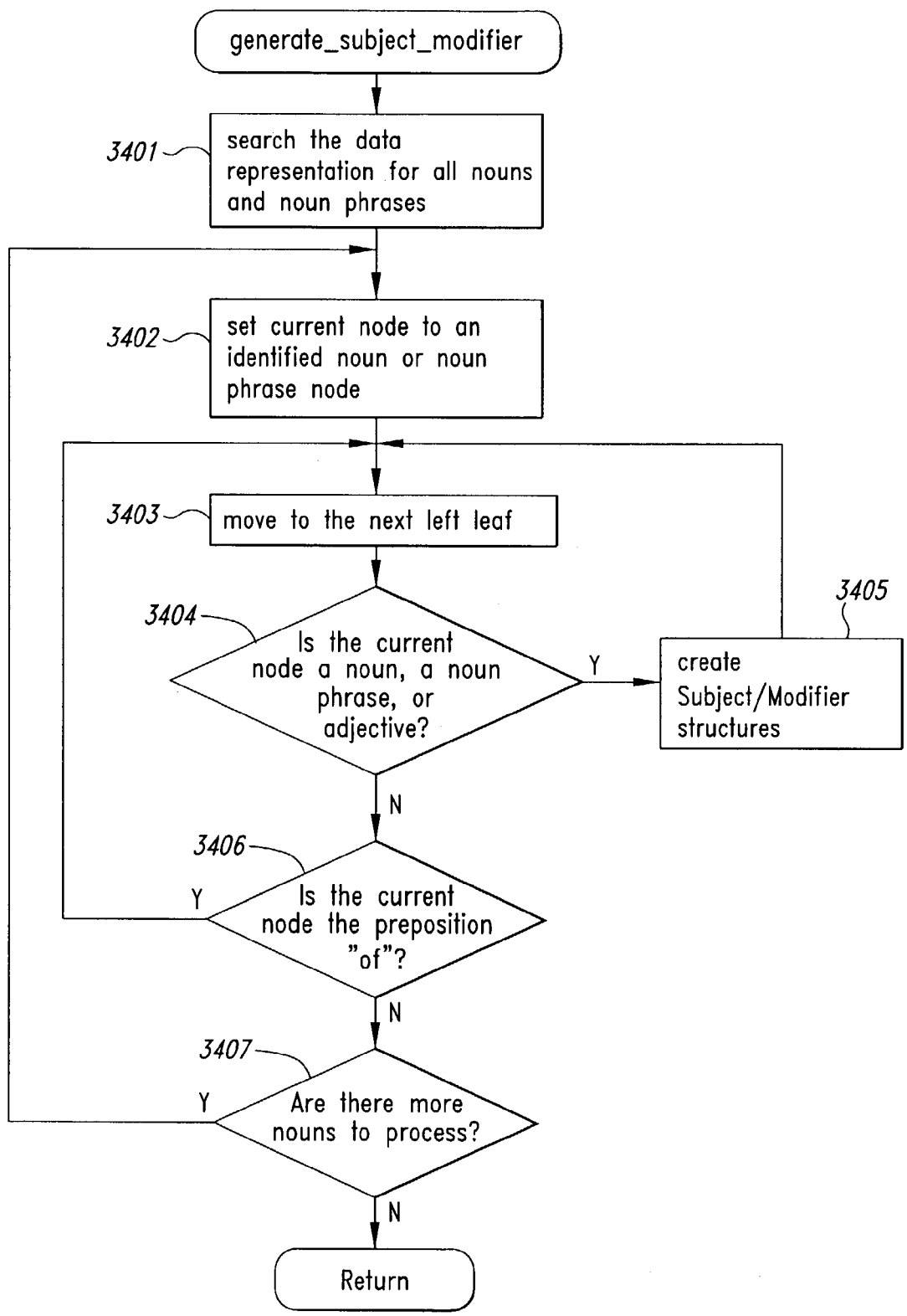
FIG. 34 is an example flow diagram of the steps performed by a generate_subject_modifier subroutine of the determine_grammatical_roles routine.

FIG. 34 is an example flow diagram of the steps performed by a generate_subject_modifier subroutine of the determine_grammatical_roles routine. This routine identifies, for each noun in the sentence, each other noun or adjective that may be related to the designated noun and stores it in a Subject/Modifier structure. In step 3401, the routine searches for all nouns and noun phrases in the syntactic data representation (e.g., a parse tree) generated by the natural language parser. In step 3402, the routine sets the current node to an identified noun or noun phrase. In steps 3403-3406, the routine loops searching for all terms that may be related to the identified noun. Specifically, in step 3403, the routine moves toward the beginning of the sentence (e.g., to the next leaf to the left in the parse tree from the current node). In step 3404, the routine examines the node and determines whether or not it is a noun, a noun phrase, or an adjective. If the routine determines that the current node is a noun, a noun phrase, or an adjective, then it is identified as a modifier and the routine continues in step 3405, else it continues in step 3406. In step 3405, the routine creates a Subject/Modifier structure identifying the current node as the modifier and the previously identified noun as the subject. Additionally, if the current node is a noun phrase, the routine creates a Subject/Modifier structure identifying the tail of the noun phrase (e.g., "gas" of the noun phrase "natural gas") as the modifier associated with the current noun. The routine then continues searching for additional modifiers related to the current noun by looping back to step 3403. In step 3406, the routine examines the current node and determines whether or not it is the preposition, "of." If the current node is the preposition "of," the routine continues searching, by returning to the beginning of the loop, in step 3403, else it continues in step 3407. In step 3407, the routine determines whether or not all of the identified nouns have been processed. If there are more nouns to process, the routine continues in step 3402 and begins another loop with the new noun as the current node, otherwise it returns.

As described with reference to FIG. 31, the determine_grammatical_roles routine calls the generate_generalized_subject_object and generate_generalized_subject_modifier subroutines (steps 3110 and 3111 of FIG. 31) when the sentence being parsed is a query instead of an object in a data set being indexed for storage.

Figure 35:
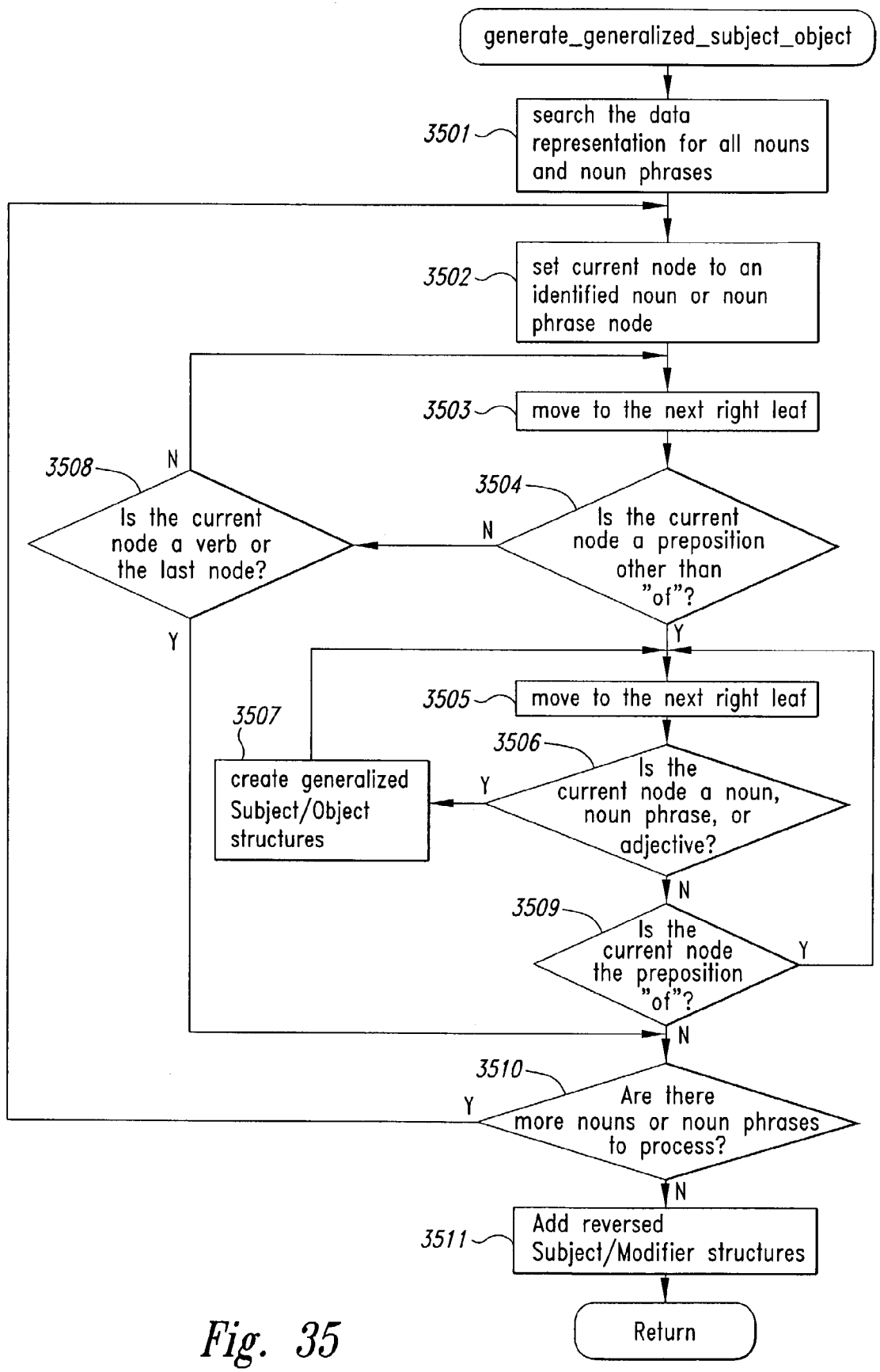
FIG. 35 is an example flow diagram of the steps performed by a generate_generalized_subject_object subroutine of the determine_grammatical_roles routine.

FIG. 35 is an example flow diagram of the steps performed by a generate_generalized_subject_object subroutine of the determine_grammatical_roles routine. This routine identifies, for each noun in the sentence, each other noun or adjective that may be an object related to the designated noun and stores it in a Subject/Object structure. In step 3501, the routine searches for all nouns and noun phrases in the syntactic data representation (e.g., a parse tree) generated by the natural language parser. In step 3502, the routine sets the current node to an identified noun (or noun phrase). In steps 3503-3509, the routine loops searching for all terms that may be an object related to the identified noun. Specifically, in step 3503, the routine moves toward the end of the sentence (e.g., to the next leaf to the right in the parse tree from the current node). In step 3504, the routine examines the node and determines whether or not it is a preposition other than "of." If the routine determines that the current node is a preposition other than "of," then it continues in step 3505, else it continues in step 3508. In step 3508, the routine examines the node and determines whether or not it is a verb or the last node. If the routine determines that the current node is a verb or the last node, then it continues in step 3510, else it continues searching, by returning to the beginning of the loop, in step 3503. In step 3505, the routine moves toward the end of the sentence (e.g., to the next leaf to the right in the parse tree from the current node). In step 3506, the routine examines the current node and determines whether or not it is a noun, a noun phrase, or an adjective. If the routine determines that the current node is a noun, a noun phrase, or an adjective, then it is identified as an object and the routine continues in step 3507, else it continues in step 3509. In step 3507, the routine creates a Generalized Subject/Object structure identifying the current node as the object and the previously identified noun as the subject. Additionally, if the current node is a noun phrase, the routine creates a Subject/Object structure identifying the tail of the noun phrase (e.g., "gas" of the noun phrase "natural gas") as the object associated with the current "subject" node. After creating one or more Generalized Subject/Object structures, the routine continues looping in step 3505, looking for any other nouns, noun phrases, or adjectives to relate to the identified "subject" noun. In step 3509, the routine determines whether or not the current node is the preposition "of." If the current node is the preposition "of," then the routine continues looping in step 3505, else it continues in step 3510. In step 3510, the routine determines whether or not all of the identified nouns and noun phrases have been processed. If there are more nouns or noun phrases to process, the routine continues in step 3502 and begins another loop with the new noun as the current node, otherwise it returns.

FIG. 36B is an illustration of an enhanced data representation of an example natural language query generated by an Enhanced Natural Language Parser. The natural language query, Does Argentina import or export natural gas from the south of Patagonia?

(query Q) is described by the roles and relationships shown in rows 1-28. Note that although entity tag types would typically be present for the deep parsing performed to generate the enhanced data representation of FIG. 36B, they are not shown for simplicity of explanation. Rows 1 and 2 are generated by the generate subject structure subroutine described with reference to FIG. 32. Rows 3-6 are generated by the generate_object_structure subroutine described with reference to FIG. 33. Rows 7-10 are generated by the generate Preposition structures routine described with reference to step 3106 of FIG. 31. Rows 11-14 are generated by the generate Subject/Object structures routine described with reference to step 3107 of FIG. 31. Row 15 is generated by the generate Subject/Modifier structures routine described with reference to step 3108 of FIG. 31. Rows 16-20 are generated by the generate_generalized_subject object routine described with reference to FIG. 35. Specifically, rows 16-19 are generated in step 3507 of FIG. 35. Row 20 is generated in step 3511 of FIG. 35.

Rows 21-28 are generated by the generate Generalized Subject/Modifier structures routine described with reference to step 3111 of FIG. 31.

At this point, the ENLP has determined the syntax, grammatical roles, entity tags, and relationships between terms of the sentence or query. The ENLP has also generated an enhanced data representation for the sentence with all of the structures described with reference to FIG. 31. The ENLP next constructs an output string (step 3004 of FIG. 30) that will be used by the Data Indexer to index and store the enhanced data representation when the SQE is processing an object of the data set, or by the Query Builder to generate data queries that will be executed against the data set repository. Note that, as discussed above, the ENLP may be implemented to directly stored the enhanced data representation contents in the data repository without the step of constructing an output string. Also, one skilled in the art will recognize that the output string is of a form that makes sense to the Query Builder and to the Data Indexer and may vary substantially from what is shown here.

An output string generated by an example ENLP is of the form:
{Parameter String};{Parameter String}; . . . ;{Parameter String}|{Doc Attribute List};{Verb List};{Word List}; {Sentence}

Each {Parameter String} is a set of six parameter pairs of single quoted parameter names and their entity tag types, separated by semi-colons, of the form:
'subject',<entity_type_ID>;
'verb';
'preposition';
'verb modifier', <entity_type_ID>;
'object',<entity_type_ID>;
'noun modifier', <entity_type_ID> where a wildcard character, for example "#" or "*" may be substituted for one or more of the parameters. The ordering of the parameter pairs implicitly contains the grammatical role association. The entity tag types (as identifiers or descriptors) are paired with the appropriate grammatical role to enable the Data Indexer or Query Builder to appropriately account for entity tag information. The {Doc Attribute List} is a list of <Attribute Name;Attribute Value> pairs, separated by semi-colons, for example:
country;France;country;Japan which represent the document level attributes present. The {Verb List} is a list of all of the identified verbs in the sentence separated by semi-colons. It includes even the verbs that appear in the {Parameter String} parameters. The {Word List} is a distinct list of all the words found in the Parameter Strings that are not also Attribute Values in the Attribute List separated by semi-colons. The {Sentence} is the sentence that the ENLP processes after any preprocessing that may include modifying the text case and correcting spelling.

Figure 37:
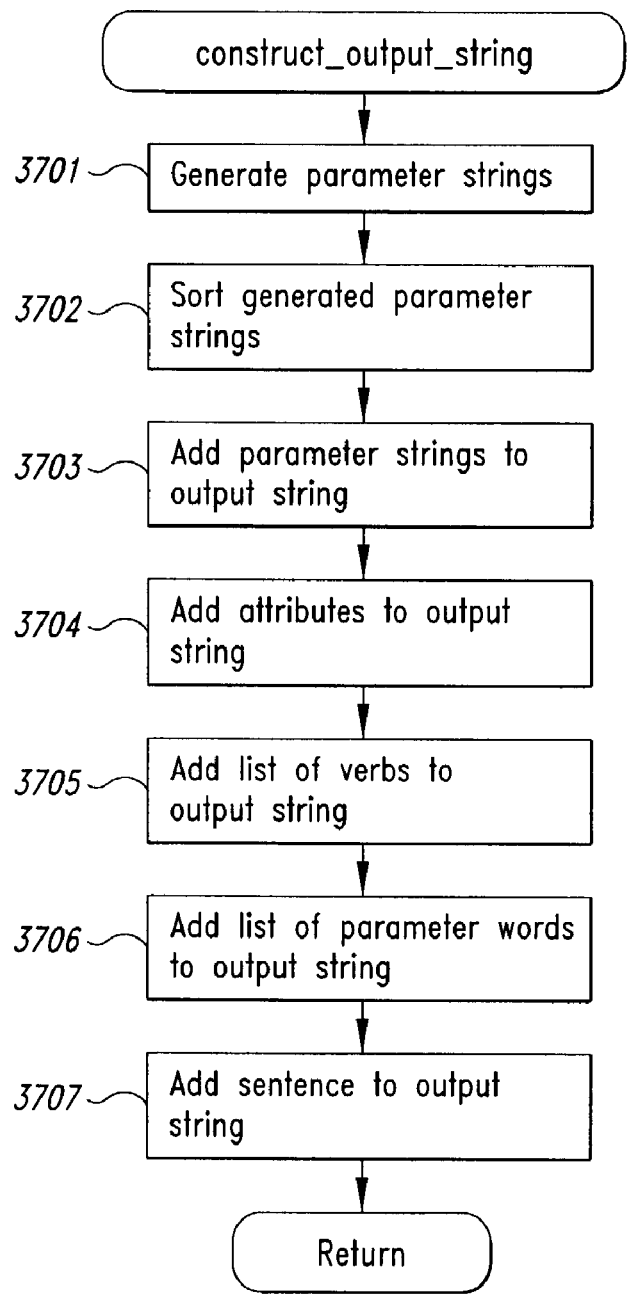
FIG. 37 is an example flow diagram of the steps performed by a construct_output_string routine of the Enhanced Natural Language Parser.

FIG. 37 is an example flow diagram of the steps performed by a construct output string routine of the Enhanced Natural Language Parser. This routine sorts the generated parameter sets that comprise the enhanced data representation of the natural language query based on which sets are most likely to generate data queries with contextually accurate results. The routine then constructs an output string of the format described. In step 3701, the routine generates parameter strings from the structures generated as described with reference to steps 3104-3111 of FIG. 31. In step 3702, the routine sorts the generated parameter strings, preferably in order of increasing ambiguity of terms, such that the parameter strings comprising terms with less ambiguity (more apt to return contextually accurate results) rank higher than those comprising terms with more ambiguity (less apt to return contextually accurate results). Although any method or combination of methods may be used to order/sort the generated parameter strings, two example sorting methods assign a weight to each generated parameter string based on a determination of term ambiguity.

Using the first method, the SQE assigns a weight to each parameter string based on a, preferably previously stored, Inverse Document Frequency ("IDF") of each parameter. The IDF of a particular parameter is equal to the inverse of the number of times that particular term appears in the data set. For example, a word that appears only one time in a data set has an IDF value of 1 (1 divided by 1), while a word that appears 100 times in a data set has an IDF value of 0.01 (1 divided by 100). In one embodiment, the weight assigned to a parameter string is equal to the sum of the IDF values of each parameter in the string. Terms that are not found in the data set are assigned an IDF of −1. In this embodiment, the parameter strings comprising the terms that appear least frequently in the data set are given a higher weight because they are most apt to return results pertinent to the natural language query.

A second method may be employed by an example SQE to weight the parameter strings according to the polysemy of each parameter. The polysemy of a term is the number of meanings that the term has. The weight assigned to each parameter string is equal to the inverse of the sum of the polysemy values for each parameter in the string. Polysemy values may be obtained for example from a dictionary service, an example of which is WordNet. One skilled in the art will recognize that any such mechanism for determining polysemy values may be used. According to convention, the minimum polysemy value is 1 (indicating that a word has only one meaning). In one embodiment of the SQE, if a polysemy value cannot be determined for a word, the SQE assigns it a polysemy value of 0.5 (indicating that the word likely has a context-specific meaning). In this embodiment, the parameter strings comprising the terms with the least ambiguity of meaning (the lower polysemy values) are given a higher weight because they are most apt to return pertinent results to the natural language query.

In step 3703, the routine adds the ordered parameter strings to the output string. When used to parse a query (not to index an object of the data set) these parameter strings are subsequently used by the Query Builder to generate data queries (e.g., SQL queries). In an alternate embodiment, in order to limit the number of data queries that will be generated, a subset of the ordered parameter strings are added to the output string. In one embodiment, the first n parameter strings are added where n is a configurable number. In another embodiment, when a weight is assigned to each parameter string, a percent value of the maximum assigned weight may be used to limit the parameter strings that are included in the output string. For example, if the highest weight assigned is 10, the SQE may use 70% as a limit, including in the output string only those parameter strings that are assigned a weight of at least 7 (i.e., 70% of the maximum assigned weight). One skilled in the art will recognize that any limiting technique may be used to restrict the number of parameter strings included in the output string if it is desirable to limit the number of data queries. In step 3704, the routine adds any identified document level attributes to the output string, according to the described output string format. The identified attribute values may be used by the Query Builder to filter the data query results. In step 3705, the routine adds a list of identified verbs to the output string, according to the described output string format. In step 3706, the routine adds to the output string a list of the words that are present in the parameter strings and are not in the list of attribute values. In step 3707, the routine adds the sentence to the output string. Steps 3705-3707 are performed when processing a query to add additional data to the output string that may be used by the Query Builder to generate additional data queries in the event that the data queries generated based on the standard parameter sets do not yield a sufficient number of results.

When syntactic parsing of the query by the ENLP is not needed, then the output string is directly constructed by the SQE search engine or a user interface that is processing the query. For example, when performing Advanced Searches or searches that use other user interfaces for indicating specific entities and/or entity tag types in certain grammatical roles (as with the search operators discussed above), the SQE translates the users entries in input fields into an output string to be forwarded to the standard Query Builder or directly into data repository queries. Thus, when a user specifies in a subject entity input field the entity name "Clinton" and specifies in an object entity input field the entity name "Afghanistan" related through any action, then an example output string is constructed as follows:

'Clinton',#;#;#,#,#;'Afghanistan',#;#,#

If the reverse relationship is also supported by the search operator, then an output string is constructed as follows:

'Afghanistan',#;#;#,#,#;'Clinton',#;#,#

In addition, if instead, the subject can be any entity so long as it is of entity tag type "person," then an output string can be constructed as follows:

,person_ID;#;#,#,#;'Afghanistan',#;#,#

One skilled in the art will recognize that a variety of combinations exist as supported by the search operators.

Figure 38:
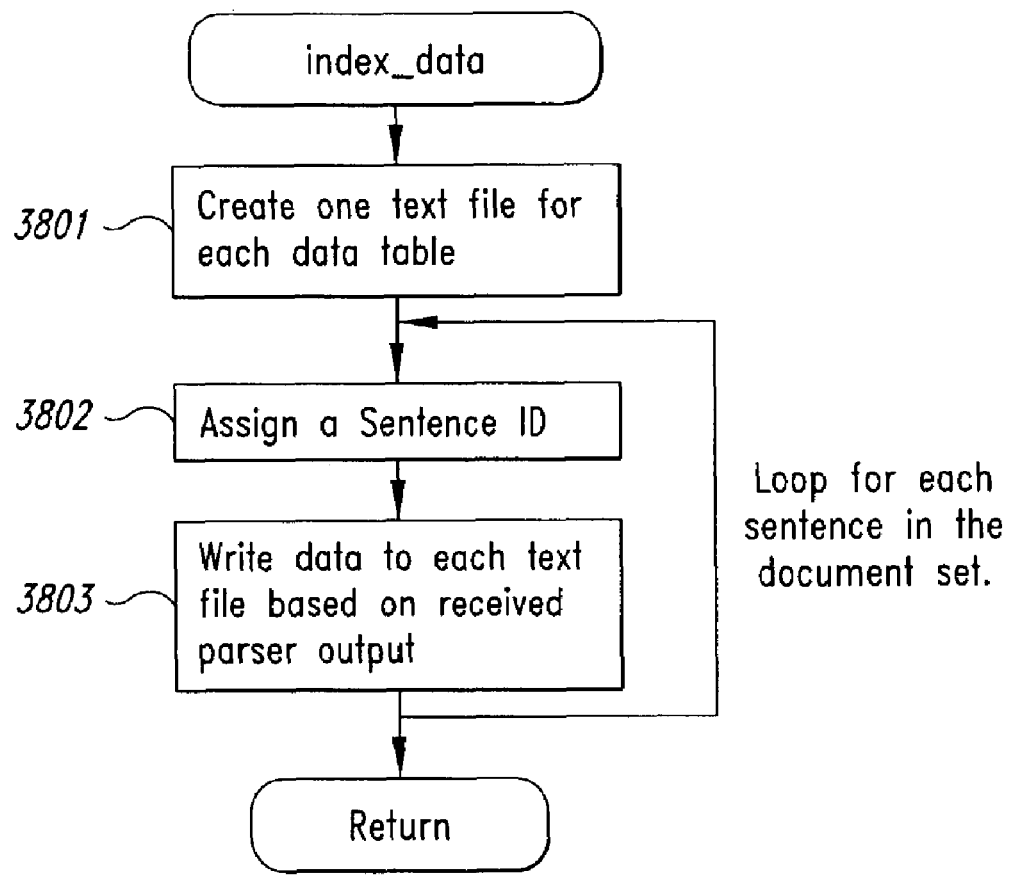
FIG. 38 is an example flow diagram of the steps performed by an index_data routine of the Data Indexer component of a Syntactic Query Engine.

In some embodiments, when the SQE is indexing a data set, the described ENLP output is forwarded to the Data Indexer Component of the SQE to be stored in the data set repository. FIG. 38 is an example flow diagram of the steps performed by an index_data routine of the Data Indexer component of a Syntactic Query Engine. In step 3801, the routine creates one text file for each table in the data set repository. In step 3802, the routine assigns a Sentence identifier (e.g. Sentence ID) to the parsed sentence. In step 3803, the routine writes data, as appropriate, to each text file based on the received ENLP output. The described output parameter strings are used to populate the text files that are bulk loaded into the data repository. Steps 3802 and 3803 are repeated for each enhanced data representation received from the ENLP. The specific format of the text files is typically dictated by the bulk loading requirements of the software used to implement the data set repository.

Figure 39A:
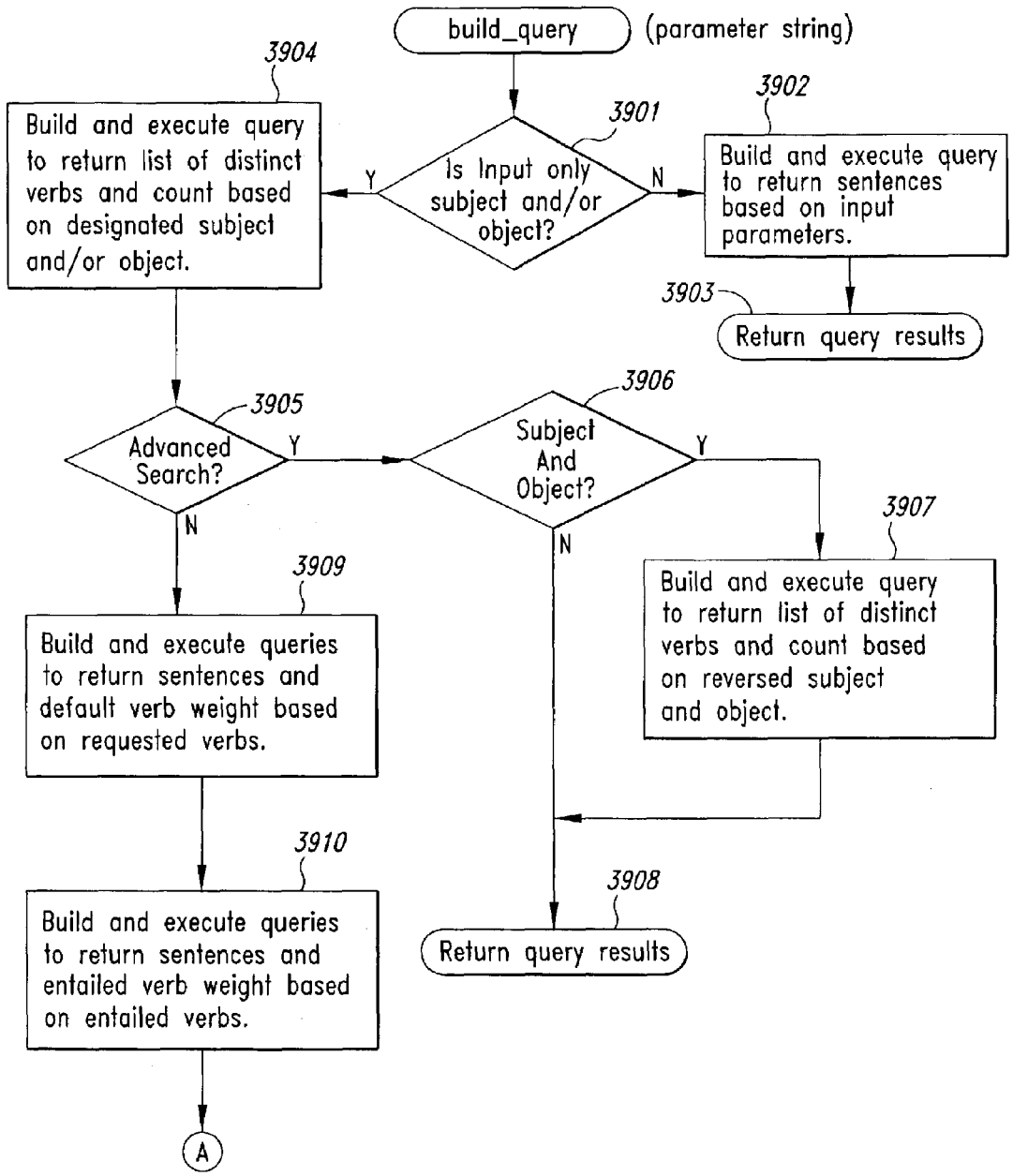
FIGS. 39A and 39B are example flow diagrams of the steps performed by a build_query routine within the Query Builder component of a Syntactic Query Engine.
Figure 39B:
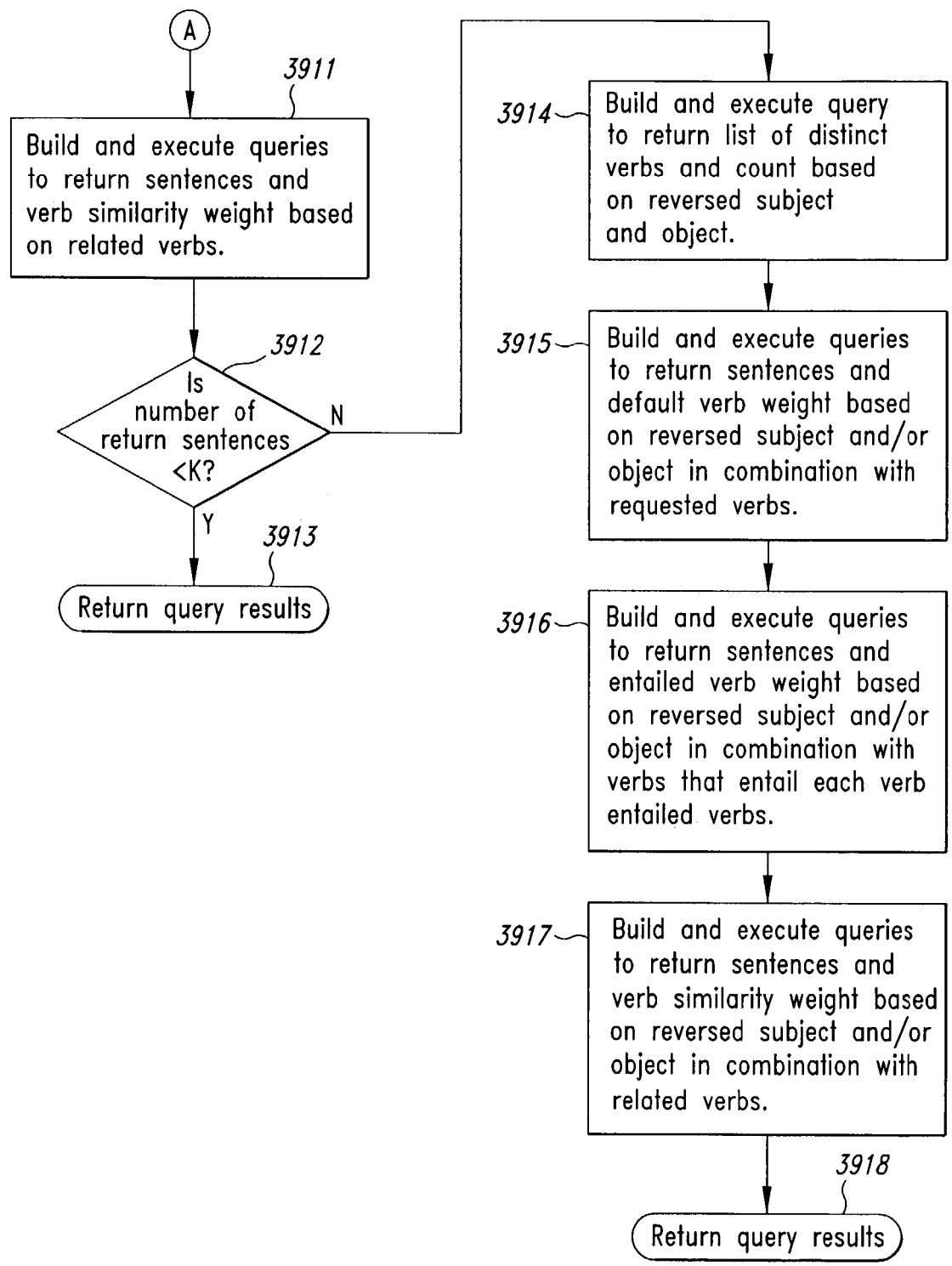

When the SQE is processing a query (as opposed to indexing a data set), after parsing the query and forwarding the ENLP out to the Query Builder, the Query Builder generates and executes data queries against the data repository. FIGS. 39A and 39B are example flow diagrams of the steps performed by a build_query routine within the Query Builder component of a Syntactic Query Engine. The routine executes once for each designated parameter string (output by the ENLP or directly by a search operator interpreter) and generates and executes one or more data queries against the data set repository based on the values of the parameters that make up the designated parameter string.

Specifically, in step 3901, the build query routine examines the designated parameters to make a preliminary determination regarding the source of the natural language query. As described with reference to FIGS. 4 and 10, respectively, the SQE supports both general searches and advanced searches. In an example embodiment, general searches and operators that specify actions (verbs) return sentences; advanced searches and the generalized search operators return a list of verbs or other designated parts of speech or grammatical roles that can be further used to search for sentences. Thus, the steps performed by the build query routine differ depending on the source of the natural language query. The advanced search functionality of the example embodiment described allows natural language queries to be submitted that designate a subject and/or an object and retrieve one or more verbs. The steps performed by the build query routine in alternate embodiments may vary depending on the syntactic and grammatical roles that can be designated within the advanced search functionality and depending upon the heuristics used by the SQE to imply relationships like certain entity tag types from query triggers. One skilled in the art will understand how to modify the routine for a specific SQE implementation. In any case, the data queries generated will reflect the level of parsing being applied to the query and the level that was applied when the data set was indexed. Thus, if the level of parsing indicates entity tag based searches only, then the build_query routine will construct and issue queries that look match the entity tag types specified in the query. If the designated parameter string has parameters that are only a subject and/or an object (with all of the other parameters wildcards), the routine continues in step 3904, else it continues in step 3902 to build and execute a data query, having determined that the natural language query originated from the general search functionality.

In step 3902, the build query routine builds and executes a single data query based on the parameters in the designated parameter string and returns resultant sentences from the data set repository. In step 3904, if the parameters of the designated string are only a subject and/or an object, then the routine builds and executes a data query, based on the subject and/or object parameters, that returns a related verb list. The related verb list comprises distinct verbs and includes a frequency count of the number of times each verb appears in sentences within the data set. The routine temporarily stores the related verb list for later use. In step 3905, the routine determines whether or not the natural language query was submitted as an advanced search, and, if so, continues in step 3906, else continues in step 3909. In step 3906, the routine determines whether or not both a subject and an object are designated. If both are designated, the routine continues in step 3907, else it returns the related verb list (the results of the query executed in step 3904). In step 3907, the routine builds and executes a data query, based on the designated subject and object in reverse roles (i.e., the designated subject as the object and the designated object as the subject), that returns a related verb list (as described in step 3904), and returns the related verb lists resulting from steps 3904 and 3907.

If, in step 3905 the routine determines that the natural language query was not submitted through an advanced search (or other search operator not so requiring), then in steps 3909-3917 the routine generates and executes a series of data queries that attempt to locate objects in the data set in a heuristic manner based upon the subject and/or object of the designated parameter string and verbs that are similar to the verbs specified in the natural language query. In particular, the routine generates and executes data queries based upon the designated subject and/or object in combination with (1) the requested verbs; (2) verbs that are entailed from the requested verbs; and (3) verbs that are related to the requested verbs, such as those produced in the related verb list resulting from step 3904. If these queries do not generate sufficient results (which is preferably modifiable), then the routine executes the same set of data queries with the subject and/or object appearing in inverse grammatical roles. In addition, weights are associated with the resultant objects (e.g., sentences) to indicate from which data query they came, so that the overall result output can be ordered in terms of what results are most likely to address the initial query. These weights are preferably configurable, for example, by a system administrator of the SQE.

Specifically, in step 3909, the routine builds and executes a data query using the designated subject and/or object and any verb that appears in the initial (natural language) query (a requested verb). Because a search was already performed for verbs that correspond to the designated subject and/or object in step 3904, the results of the step 3904 data query can be used to streamline the data query of step 3909. In particular, a query is preferably generated and executed using the verbs that appear in both the {Verb List} of the output string generated by the ENLP and the related verb list returned by the query in step 3904 (the intersection of these two lists). These comprise the verbs that are in the initial query that have also been found to be present in the data set in objects that contain a similar subject and/or object. (Since the verbs in the {Verb List} include all of the verbs present in the natural language query, any designated parameter string that also includes a verb as one of the parameters will be accounted for also in the {Verb List}.) The routine associates a default weight with the resulting sentences indicating that these sentences came from a match of verbs present in the initial query.

In step 3910, the routine builds and executes a data query using the designated subject and/or object and verbs that are entailed from the requested verbs (verbs that appear in the initial query). As in step 3909, the results of the data query of step 3904 can be used to streamline this data query. In particular, a query is preferably generated and executed using the verbs that entail each of the verbs that appear in both the {Verb List} of the output string generated by the ENLP and the related verb list returned by the query in step 3904 (the intersection of these two lists). Entailed verbs are available through existing applications, for example, WordNet, and are verbs that, based on meaning, are necessarily required prior to an action described by another verb. For example, given the verb, "snore," "sleep" is an entailed verb because (typically) sleeping occurs prior to snoring. The routine associates a weight referred to as an "entailed weight" with the resulting sentences indicating that these sentences came from a match of verbs that entail from verbs present in the initial query.

In step 3911, the routine builds and executes a data query using the designated subject and/or object and verbs that are related to the requested verbs (verbs that appears in the initial query). In one embodiment, the related verbs are verbs that appear in the related verb list returned by the query in step 3904 that are not in the {Verb List} of the output string generated by the ENLP. These are the verbs that are present in the data set in objects that contain a similar subject and/or object and that are not also requested verbs. The routine associates a weight referred to as a "verb similarity weight" with each of the resulting sentences indicating that these sentences came from a match of verb that is related to a verb present in the initial query. In one embodiment, the verb similarity weight differs with each related verb and is a configurable weighting of relative weights assigned by some external application. For example, a dictionary such as WordNet can be used to associated a "similarity measure" with all of the verbs present in a data set. These similarity measures can be further weighted by a multiplier to generate weights that indicate that the resulting sentences are less useful than those returned from data queries involving requested verbs or entailed verbs. In an alternate embodiment, the different weights for resulting sentences are determined by another application, for example, WordNet.

In step 3912, the routine determines whether or not the number of results returned by the data queries generated in steps 3909-3911 is greater than k, where k is preferably a configurable number. If the number of results is greater than k, the routine returns the results determined thus far, else it continues in step 3914. In steps 3914-3917, the routine generates and executes data queries that are the same as those of corresponding steps 3909-3911, with the exception that the roles of the designated subject and designated object are reversed. That is, the designated subject becomes the object and the designated object becomes the subject in the generated data query. Weights are also assigned accordingly to the resulting sentences. As discussed with reference to FIG. 14, querying the data set using the inverse subject/object relationship may return additional, contextually accurate, results that may not be returned when using the original subject/object relationship. After executing these queries, the resulting weighted sentences are returned.

In some embodiments, the results of the natural language query are sorted when they are returned. One skilled in the art will recognize that any sorting method may be used to sort the query results. In one embodiment, the results are first sorted based on the weights (default, entailed, and verb similarity weights) returned with the results as described with reference to FIGS. 39A and 39B. Next, the results are sorted based on document attribute values designated, for example, by a user. For example, if a user specifies the name of a country in a natural language query, resulting sentences that also contain the specified country name are ranked higher than resulting sentences that do not. Finally, the resulting sentences that are returned by data queries generated from more than one parameter string are ranked higher than those from a single data query. Other arrangements and combinations are contemplated.

Although specific embodiments of, and examples for, methods and systems of the present invention are described herein for illustrative purposes, it is not intended that the invention be limited to these embodiments. Equivalent methods, structures, processes, steps, and other modifications within the spirit of the invention fall within the scope of the invention. The various embodiments described above can be combined to provide further embodiments. Also, all of the above U.S. patents, patent applications and publications referred to in this specification, including U.S. Provisional Application No. 60/312,385, filed on Aug. 14, 2001, and entitled "Method and System for Enhanced Data Searching;" U.S. application Ser. No. 10/007,299, filed on Nov. 8, 2001, with the same title; U.S. patent application Ser. No. 09/962,798, filed on Sep. 25, 2001, and entitled "Extended Functionality for an Inverse Inference Engine Based Web Search," which is a continuation-in-part of U.S. application Ser. No. 09/532,605 filed Mar. 22, 2000, and claims priority from U.S. Provisional Application No. 60/235,255, filed on Sep. 25, 2000, are incorporated herein by reference, in their entirety. Aspects of the invention can be modified, if necessary, to employ methods, systems and concepts of these various patents, applications and publications to provide yet further embodiments of the invention. In addition, those skilled in the art will understand how to make changes and modifications to the methods and systems described to meet their specific requirements or conditions. For example, the methods and systems described herein can be applied to any type of search tool or indexing of a data set, and not just the SQE described. In addition, the techniques described may be applied to other types of methods and systems where large data sets must be efficiently reviewed. For example, these techniques may be applied to Internet search tools implemented on a PDA, web-enabled cellular phones, or embedded in other devices. Furthermore, the data sets may comprise data in any language or in any combination of languages. In addition, the user interface components described may be implemented to effectively support wireless and handheld devices, for example, PDAs, and other similar devices, with limited screen real estate. These and other changes may be made to the invention in light of the above-detailed description. Accordingly, the invention is not limited by the disclosure.

The invention claimed is:

1. A method in a computer system for transforming at least one sentence of a document or a query into a canonical representation using entity tags, comprising:
   receiving a designation of a plurality of entity tags, each entity tag having a type and a value, wherein the type of each entity tag is a possible attribute of a sentence that does not represent a part-of-speech and does not represent a grammatical role; and
   for each sentence,
      parsing the sentence to generate a parse structure having a plurality of syntactic elements that correspond to parts-of-speech;
      determining from the syntactic elements of the parse structure a set of terms that correspond to one or more of the designated entity tags; and
      for each term of one or more terms of the determined set of terms, storing in an enhanced data representation data structure a representation of an association between the term and a corresponding entity tag, the representation including the term and an indication of the type of the corresponding entity tag, wherein the term is the value of the corresponding entity tag, such that the sentence is represented in the data structure by at least one entity tag.

2. The method of claim 1 wherein the enhanced data representation stores a plurality of entity tags to represent a sentence without needing to store parts-of-speech information.

3. The method of claim 1 wherein, in each stored representation, the type of the corresponding entity tag indicates at least one of a name, a date, a location, a gene, a content identifier, a chemical, or a compound.

4. The method of claim 1, each sentence having a plurality of clauses, wherein each clause of a parsed sentence is represented in the enhanced data representation data structure by at least one entity tag.

5. The method of claim 1 wherein the stored indication of the type of the corresponding entity tag indicates that the sentence specifies a name.

6. The method of claim 5 wherein the name is at least one of a person name, a company name, an organization name, a genetic name, a pharmaceutical name, a compound name, a chemical name or a document name.

7. The method of claim 1 wherein the stored indication of the type of the corresponding entity tag indicates that the sentence specifies a location.

8. The method of claim 7 wherein the location indicates at least one of a physical location, a geographic location, a country, a city, a region, a state, a locality, a phone number, or an address.

9. The method of claim 1 wherein the stored indication of the type of the corresponding entity tag is a date specification.

10. The method of claim 1 wherein the determining from the parse structure the set of terms that correspond to one or more of the designated entity tags is performed by evaluating a tag value specification associated with each designated entity tag type.

11. The method of claim 1 wherein the designated entity tags are stored in a look-up table and wherein the determining from the parse structure the set of terms is performed by looking up terms associated with the syntactic elements of the parse structure in the stored look-up table.

12. The method of claim 1 wherein the document is part of a corpus of heterogeneous documents.

13. The method of claim 12 wherein the enhanced data representation data structure is used to index the corpus of documents.

14. The method of claim 1 wherein the enhanced data representation data structure is used to execute a query against objects in a corpus of documents.

15. The method of claim 14 wherein the enhanced data representation corresponds to the query and results are returned that satisfy the query when an object in the corpus contains the same entity tag values and corresponding entity tag types as those stored in the enhanced data representation.

16. The method of claim 14 wherein the enhanced data representation corresponds to the query and results are returned that satisfy the query when an object in the corpus contains a similar entity tag type to an entity tag type stored in the enhanced data representation.

17. The method of claim 16 wherein the objects in the corpus are sentences and indications of sentences that satisfy the query are returned.

18. The method of claim 17 wherein the returned indications of sentences indicate paragraphs.

19. The method of claim 17 wherein the returned indications of sentences indicate documents.

20. The method of claim 16, further comprising:
   receiving an indication of at least one sentence of the document; and
   returning indications of documents in the corpus that contain similar terms to terms of the indicated at least one sentence.

21. The method of claim 20 wherein the determination of indications of documents that contain similar terms is performed by determining the documents in the corpus that contain similar entity tag values and corresponding entity tag types to those found in the enhanced data representation that corresponds to the at least one indicated sentence.

22. The method of claim 20 wherein the determination of indications of documents that contain similar terms is performed using latent semantic regression techniques.

23. The method of claim 20 wherein the at least one indicated sentence is at least one of an indicated paragraph and an indicated document.

24. The method of claim 23 wherein the determination of indications of documents that contain similar terms is performed using latent semantic regression techniques.

25. A computer-readable memory medium containing content that, when executed, cause a computing system to transform at least one sentence of a document or a query into a canonical representation using entity tags by performing a method comprising:

receiving a designation of a plurality of entity tags, each entity tag having a type and a value, and wherein the type of each entity tag is a possible attribute of a sentence that does not represent a part-of-speech and does not represent a grammatical role; and for each sentence, parsing the sentence to generate a parse structure having a plurality of syntactic elements that represent syntactical attributes of the sentence;

determining from the syntactic elements of the parse structure a set of meaningful terms that correspond to one or more of the designated entity tags; and for each of one or more of the meaningful terms, storing in an enhanced data representation data structure a representation of an association between the term and a corresponding entity tag, the representation including the term and an indication of the type of the corresponding entity tag, wherein the term is the value of the corresponding entity tag, such that the sentence is represented in the data structure by at least one entity tag.

26. The computer-readable memory medium of claim 25 wherein the enhanced data representation stores a plurality of entity tags to represent a sentence.

27. The computer-readable memory medium of claim 25 wherein, in each stored representation, the type of the corresponding entity tag indicates at least one of a name, a date, a location, a gene, a content identifier, a chemical, or a compound.

28. The computer-readable memory medium of claim 25, each sentence having a plurality of clauses, wherein each clause of a parsed sentence is represented in the enhanced data representation data structure by at least one entity tag.

29. The computer-readable memory medium of claim 25 wherein the stored indication of the type of the corresponding entity tag indicates that the sentence specifies a name.

30. The computer-readable memory medium of claim 29 wherein the name is at least one of a person name, a company name, an organization name, a genetic name, a pharmaceutical name, a compound name, a chemical name, or a document name.

31. The computer-readable memory medium of claim 25 wherein the stored indication of the type of the corresponding entity tag indicates that the sentence specifies a location.

32. The computer-readable memory medium of claim 31 wherein the location indicates at least one of a physical location, a geographic location, a country, a city, a region, a state, a locality, a phone number, or an address.

33. The computer-readable memory medium of claim 25 wherein the stored indication of the type of the corresponding entity tag is a date specification.

34. The computer-readable memory medium of claim 25 wherein the determining from the parse structure the set of meaningful terms that correspond to the one or more of the designated entity tags is performed by evaluating a tag value specification associated with each designated entity tag type.

35. The computer-readable memory medium of claim 25 wherein the designated entity tags are stored in a look-up table and wherein the determining from the parse structure the set of meaningful terms is performed by using the stored look-up table.

36. The computer-readable memory medium of claim 25 wherein the document is part of a corpus of heterogeneous documents.

37. The computer-readable memory medium of claim 36 wherein the enhanced data representation data structure is used to index the corpus of documents.

38. The computer-readable memory medium of claim 25 wherein the enhanced data representation data structure is used to execute a query against objects in a corpus of documents.

39. The computer-readable memory medium of claim 38 wherein the enhanced data representation corresponds to the query and results are returned that satisfy the query when an object in the corpus contains the same entity tag values and corresponding entity tag types as those stored in the enhanced data representation.

40. The computer-readable memory medium of claim 38 wherein the enhanced data representation corresponds to the query and results are returned that satisfy the query when an object in the corpus contains a similar entity tag type to an entity tag type stored in the enhanced data representation.

41. The computer-readable memory medium of claim 40 wherein the objects in the corpus are sentences and indications of sentences that satisfy the query are returned.

42. The computer-readable memory medium of claim 41 wherein the returned indications of sentences indicate paragraphs.

43. The computer-readable memory medium of claim 41 wherein the returned indications of sentences indicate documents.

44. The computer-readable memory medium of claim 40, wherein the instructions further control the computer processor by:

receiving an indication of at least one sentence of the document; and returning indications of documents in the corpus that contain similar terms to terms of the indicated at least one sentence.

45. The computer-readable memory medium of claim 44 wherein the determination of indications of documents that contain similar terms is performed by determining the documents in the corpus that contain similar entity tag values and corresponding entity tag types to those found in the enhanced data representation that corresponds to the at least one indicated sentence.

46. The computer-readable memory medium of claim 44 wherein the determination of indications of documents that contain similar terms is performed using latent semantic regression techniques.

47. The computer-readable memory medium of claim 44 wherein the at least one indicated sentence is at least one of an indicated paragraph and an indicated document.

48. The computer-readable memory medium of claim 47 wherein the determination of indications of documents that contain similar terms is performed using latent semantic regression techniques.

49. The computer-readable memory medium of claim 25 wherein the contents are instructions that, when executed, cause the computing system to perform the method.

50. A syntactic query engine for transforming at least one sentence of a document or a query into a canonical representation using entity tags, comprising:

a memory medium containing a parser that is configured to, when executed on a computer processor, receive a designation of a plurality of entity tags, each entity tag having a type and a value, and wherein the type of each entity tag is a possible attribute of a sentence that does not represent a part-of-speech and does not represent a grammatical role; and decompose the at least one sentence to generate a parse structure for the sentence having a plurality of syntactic elements that correspond to parts-of-speech;

determine from the syntactic elements of the parse structure a set of meaningful terms that correspond to one or more of the designated entity tags; and for each of one or more of the meaningful terms, store, in an enhanced data representation data structure, a representation of an association between the term and the corresponding entity tag, the representation including the term and an indication of the type of the corresponding entity tag, wherein the term is the value of the corresponding entity tag, such that the at least one sentence is represented in the data structure by at least one entity tag.

51. The query engine of claim 50 wherein the enhanced data representation stores a plurality of entity tags to represent a sentence.

52. The query engine of claim 50 wherein, in each stored representation, the type of the corresponding entity tag indicates at least one of a name, a date, a location, a gene, a content identifier, a chemical, or a compound.

53. The query engine of claim 50, the at least one sentence having a plurality of clauses, wherein each clause of the decomposed sentence is represented in the enhanced data representation data structure by at least one entity tag.

54. The query engine of claim 50 wherein the stored indication of the type of the corresponding entity tag indicates that the sentence specifies a name.

55. The query engine of claim 54 wherein the name is at least one of a person name, a company name, an organization name, a genetic name, a pharmaceutical name, a compound name, a chemical name, or a document name.

56. The query engine of claim 50 wherein the stored indication of the type of the corresponding entity tag indicates that the sentence specifies a location.

57. The query engine of claim 56 wherein the location indicates at least one of a physical location, a geographic location, a country, a city, a region, a state, a locality, a phone number, or an address.

58. The query engine of claim 50 wherein the stored indication of the type of the corresponding entity tag is a date specification.

59. The query engine of claim 50 wherein the determining from the parse structure the set of meaningful terms that correspond to the one or more of the designated entity tags is performed by evaluating a tag value specification associated with each designated entity tag type.

60. The query engine of claim 50 wherein the designated entity tags are stored in a look-up table and wherein the determining from the parse structure the set of meaningful terms is performed using the stored look-up table.

61. The query engine of claim 50 wherein the document is part of a corpus of heterogeneous documents.

62. The query engine of claim 61 wherein the enhanced data representation data structure is used to index the corpus of documents.

63. The query engine of claim 50 wherein the enhanced data representation data structure is used to execute a query against objects in a corpus of documents.

64. The query engine of claim 63 wherein the enhanced data representation corresponds to the query and results are returned that satisfy the query when an object in the corpus contains the same entity tag values and corresponding entity tag types as those stored in the enhanced data representation.

65. The query engine of claim 63 wherein the enhanced data representation corresponds to the query and results are returned that satisfy the query when an object in the corpus contains a similar entity tag type to an entity tag type stored in the enhanced data representation.

66. The query engine of claim 65 wherein the objects in the corpus are sentences and indications of sentences that satisfy the query are returned.

67. The query engine of claim 66 wherein the returned indications of sentences indicate paragraphs.

68. The query engine of claim 66 wherein the returned indications of sentences indicate documents.

69. The query engine of claim 65, the memory further comprising:
search mechanism that is configured to, when executed,
receive an indication of at least one sentence of the document; and
return indications of documents in the corpus that contain similar terms to terms of the indicated at least one sentence.

70. The query engine of claim 68 wherein the determination of indications of documents that contain similar terms is performed by determining the documents in the corpus that contain similar entity tag values and corresponding entity tag types to those found in the enhanced data representation that corresponds to the at least one indicated sentence.

71. The query engine of claim 69 wherein the determination of indications of documents that contain similar terms is performed using latent semantic regression techniques.

72. The query engine of claim 69 wherein the at least one indicated sentence is at least one of an indicated paragraph and an indicated document.

73. The query engine of claim 72 wherein the determination of indications of documents that contain similar terms is performed using latent semantic regression techniques.

74. A method in a computer system for transforming at least one sentence of a document or a query into a canonical representation using entity tags, comprising:
receiving a designation of a plurality of entity tags and a designation of at least one grammatical role, each entity tag having a type and a value, and wherein the type of each entity tag is a possible attribute of a sentence that does not represent a part-of-speech and does not represent a grammatical role; and
for each sentence,
parsing the sentence to generate a parse structure having a plurality of syntactic elements;
determining a set of meaningful terms of the sentence from the syntactic elements of the parse structure;
determining from the structure of the parse structure and the syntactic elements a grammatical role for each meaningful term;
determining from the set of meaningful terms a first set of terms that corresponds to one or more of the designated entity tags and a second set of terms that corresponds to the designated grammatical role; and
storing in an enhanced data representation data structure a representation of an association between a term of the first set, a designated entity tag that corresponds to the term of the first set, and a term of the second set that corresponds to the designated grammatical role, the representation including the term of the first set, an indication of the type of the corresponding entity tag, wherein the term of the first set is the value of the corresponding entity tag, and the term of the second set, such that the sentence is represented by at least one entity tag and one meaningful term having a grammatical role.

75. The method of claim 74 wherein the designated grammatical role is a governing verb and the enhanced data representation stores a meaningful term that corresponds to a governing verb of the sentence and at least one entity tag.

76. The method of claim 75, each sentence comprising at least one clause, wherein there is a governing verb associated with each clause of each sentence and the stored enhanced data representation, for each clause of each sentence, stores the meaningful term that corresponds to the associated governing verb.

77. The method of claim 74 wherein the enhanced data representation for each sentence stores a plurality of meaningful terms and their corresponding grammatical roles and at least one entity tag.

78. The method of claim 74 wherein the enhanced data representation for each sentence stores a representation of an association between each meaningful term of the second set of the meaningful terms and its corresponding grammatical role and an association between each meaningful term of the first set of the meaningful terms and its corresponding designated entity tag.

79. The method of claim 74 wherein the term of the first set that is associated with the corresponding designated entity tag is the same as the term of the second set that corresponds to the designated grammatical role.

80. The method of claim 74 wherein heuristics are used to determine the grammatical role for at least one of the meaningful terms.

81. The method of claim 74 wherein the determining of a grammatical role for each meaningful term includes determining whether the term is at least one of a subject, object, verb, part of a prepositional phrase, noun modifier, or verb modifier.

82. The method of claim 74 wherein the document is part of a corpus of heterogeneous documents.

83. The method of claim 74 wherein the enhanced data representation data structure is used to index a corpus of documents.

84. The method of claim 74 wherein the enhanced data representation data structure is used to execute a query against objects in a corpus of documents.

85. The method of claim 84 wherein the enhanced data representation data structure corresponds to the query and wherein results are returned that satisfy the query when an object in the corpus contains a term associated with similar grammatical role to the term and its associated role as stored in the enhanced data representation and contains a similar entity tag type to an entity tag type stored in the enhanced data representation.

86. The method of claim 85 wherein the objects in the corpus are sentences and indications of sentences that satisfy the query are returned.

87. A computer-readable medium containing content that, when executed, controls a computing system to transform at least one sentence of a document or a query into a canonical representation using entity tags, by performing a method comprising:

receiving a designation of a plurality of entity tags and a designation of at least one grammatical role, each entity tag having a type and a value, and wherein the type of each entity tag is a possible attribute of a sentence that does not represent a part-of-speech and does not represent a grammatical role; and for each sentence,
parsing the sentence to generate a parse structure having a plurality of syntactic elements;
determining a set of meaningful terms of the sentence from these syntactic elements;
determining from the structure of the parse structure and the syntactic elements a grammatical role for each meaningful term;
determining from the set of meaningful terms a first set of terms that corresponds to one or more of the designated entity tags and a second set of terms that corresponds to the designated grammatical role; and
storing in an enhanced data representation data structure a representation of an association between a term of the first set, a designated entity tag that corresponds to the term of the first set, and a term of the second set that corresponds to the designated grammatical role, the representation including the term of the first set, an indication of the type of the corresponding entity tag, wherein the term of the first set is the value of the corresponding entity tag, and the term of the second set, such that the sentence is represented by at least one entity tag and one meaningful term having a grammatical role.

88. The computer-readable medium of claim 87 wherein the contents are instructions that, when executed, cause the computing system to perform the method.

89. A syntactic query engine for transforming at least one sentence of a document or query into a canonical representation using entity tags, comprising:
a memory containing a parser that is configured to, when executed,
receive a designation of a plurality of entity tags and a designation of at least one grammatical role, each entity tag having a type and a value, and wherein the type of each entity tag is a possible attribute of the at least one sentence that does not represent a part-of-speech and does not represent a grammatical role;
decompose the at least one sentence to generate a parse structure for the sentence having a plurality of syntactic elements that correspond to parts-of-speech;
determine a set of meaningful terms of the at least one sentence from the syntactic elements;
determine from the structure of the parse structure and the syntactic elements a grammatical role for each meaningful term;
determine from the set of meaningful terms a first set of terms that corresponds to one or more of the designated entity tags and a second set of terms that corresponds to the designated grammatical role; and
store, in an enhanced data representation data structure a representation of an association between a term of the first set, a designated entity tag that corresponds to the term of the first set, and a term of the second set that corresponds to the designated grammatical role, the representation including the term of the first set, an indication of the type of the corresponding entity tag, wherein the term of the first set is the value of the corresponding entity tag, and the term of the second set, such that the sentence is represented by at least one entity tag and one meaningful term having a grammatical role.

90. The query engine of claim 89 wherein the designated grammatical role is a governing verb and the enhanced data representation stores a meaningful term that corresponds to a governing verb of the sentence and at least one entity tag.

91. A data processing system comprising a computer processor and a memory, the memory containing structured data that stores a normalized representation of sentence data, the structured data being manipulated by the computer processor under the control of program code and stored in the memory as:
an entity table having a set of entity tag pairs, each pair having a term of a sentence that is also a value of a corresponding entity tag and an indication of an entity tag type of the corresponding entity tag, wherein the entity tag type is a possible attribute of the sentence that does not represent a part-of-speech and does not represent a grammatical role.

92. A computer-readable memory medium containing instructions that, when executed, control a computing system to store a normalized data structure representing at least one sentence of a document of a data set or a query, by performing a method comprising:

for each sentence,
determining a set of terms of the sentence that correspond to a designated set of entity tags, each entity tag having a type and a value, and wherein the type of each entity tag is a possible attribute of the sentence that does not represent a part-of-speech and does not represent a grammatical role; and
storing sets of relationships between each determined term and its corresponding entity tag type in the normalized data structure, wherein each determined term is the value of its corresponding entity tag, so as to represent the entire sentence as entity tags.

93. A computing system for storing a normalized data structure representing a document of a data set or a query having at least one sentence with a plurality of terms, comprising:

enhanced parsing mechanism that determines a set of terms of the sentence that correspond to a designated set of entity tags, each entity tag having a type and a value, and wherein the type of each entity tag is a possible attribute of the sentence that does not represent a part-of-speech and does not represent a grammatical role; and
storage mechanism structured to store sets of relationships between each determined term and its corresponding entity tag type in the normalized data structure, wherein each determined term is the value of its corresponding entity tag, so as to represent the entire at least one sentence as entity tags.

94. The system of claim 93, the storage mechanism further structured to store terms that correspond to a document level attribute.

* * * * *